(12) United States Patent
Park

(10) Patent No.: US 12,535,690 B2
(45) Date of Patent: Jan. 27, 2026

(54) LENS DRIVING DEVICE, AND CAMERA MODULE AND OPTICAL DEVICE INCLUDING SAME

(71) Applicant: LG Innotek Co., Ltd., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 281 days.

(21) Appl. No.: 18/249,266

(22) PCT Filed: Oct. 14, 2021

(86) PCT No.: PCT/KR2021/014248
§ 371 (c)(1),
(2) Date: Apr. 17, 2023

(87) PCT Pub. No.: WO2022/080895
PCT Pub. Date: Apr. 21, 2022

(65) Prior Publication Data
US 2024/0231120 A1 Jul. 11, 2024

(30) Foreign Application Priority Data

Oct. 15, 2020 (KR) .................. 10-2020-0133658
Dec. 9, 2020 (KR) .................. 10-2020-0171598

(51) Int. Cl.
*G02B 27/00* (2006.01)
*G02B 27/64* (2006.01)
*G03B 5/04* (2021.01)

(52) U.S. Cl.
CPC ............ *G02B 27/646* (2013.01); *G03B 5/04* (2013.01); *G03B 2205/0015* (2013.01); *G03B 2205/0069* (2013.01)

(58) Field of Classification Search
CPC .......... G02B 27/646; G02B 7/08; G03B 5/04; G03B 2205/0015; G03B 2205/0069;
(Continued)

(56) References Cited

U.S. PATENT DOCUMENTS

2009/0059373 A1   3/2009  Lam et al.
2011/0103784 A1*  5/2011  Hashizume ............ H04N 23/57
                                                         396/133
(Continued)

FOREIGN PATENT DOCUMENTS

EP      3 370 105 A1    9/2018
JP     2010-169841 A    8/2010
(Continued)

OTHER PUBLICATIONS

International Search Report dated Jan. 20, 2022, issued in Application No. PCT/KR2021/014248.
(Continued)

*Primary Examiner* — Euncha P Cherry
(74) *Attorney, Agent, or Firm* — Saliwanchik, Lloyd & Eisenschenk

(57) ABSTRACT

An embodiment comprises: a circuit board; a housing disposed on the circuit board; a bobbin disposed within the housing; a magnet disposed in the housing; a coil disposed on the bobbin to move the bobbin in an optical-axis direction by interaction with the magnet; an upper elastic member coupled to the bobbin and the housing; and a polymer actuator coupled at one end thereof to the upper elastic member, wherein the circuit board is electrically connected to the polymer actuator to supply a first driving signal to the polymer actuator, and the polymer actuator moves the housing in a direction perpendicular to the optical-axis direction by the first driving signal.

17 Claims, 46 Drawing Sheets

(58) Field of Classification Search
CPC .... G03B 2205/0023; G03B 3/10; G03B 5/06; H04N 23/54; H04N 23/6812; H04N 23/687; H04N 23/57
See application file for complete search history.

(56) References Cited

U.S. PATENT DOCUMENTS

| | | | |
|---|---|---|---|
| 2015/0070565 A1* | 3/2015 | Furusawa | G02B 7/08 |
| | | | 348/348 |
| 2018/0031859 A1 | 2/2018 | Gomyo et al. | |
| 2018/0246296 A1 | 8/2018 | Sugawara | |
| 2020/0192187 A1* | 6/2020 | Lee | H02K 41/0356 |

FOREIGN PATENT DOCUMENTS

| | | |
|---|---|---|
| JP | 2014153690 A | 8/2014 |
| KR | 20110058395 A | 6/2011 |
| KR | 10-2016-0049181 A | 5/2016 |
| KR | 10-2017-0024671 A | 3/2017 |
| KR | 20170071097 A | 6/2017 |
| KR | 10-2020-0114251 A | 10/2020 |

OTHER PUBLICATIONS

Supplementary European Search Report dated Aug. 6, 2024 in European Application No. 21880542.2.
Office Action dated Oct. 20, 2025 in Korean Application No. 10-2020-0133658.

* cited by examiner

FIG. 4A
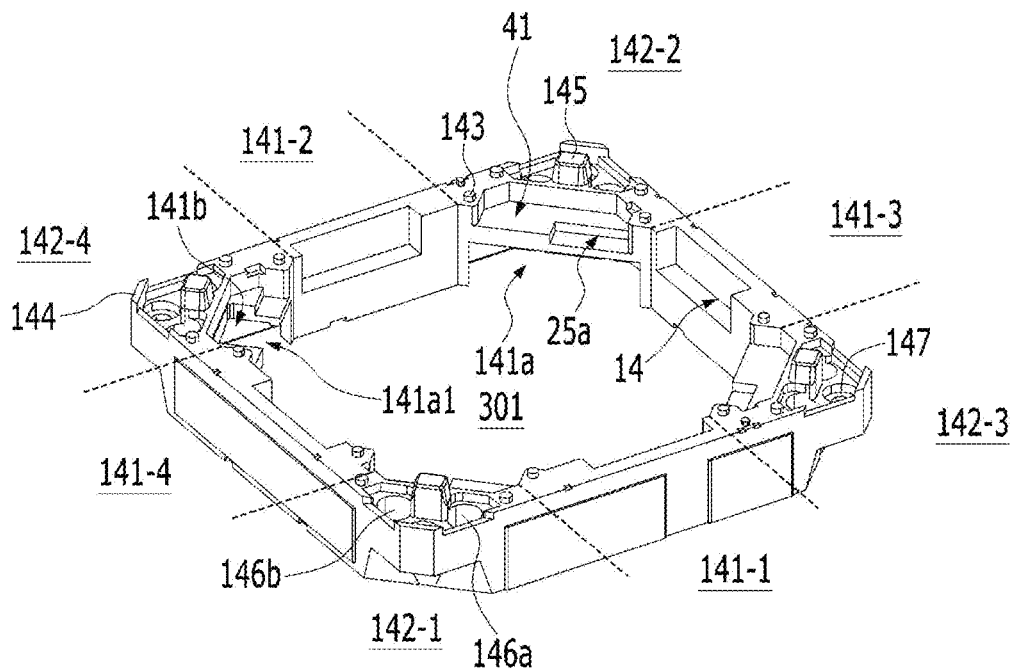
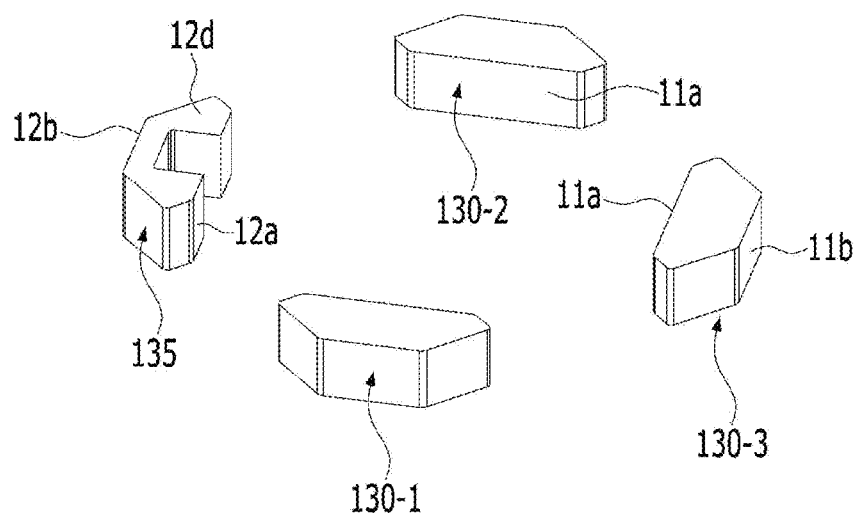

FIG. 18A

| Polymer Actuator | 1st electrode | 2nd electrode | Bending Direction | Moving Direction of OIS movable unit |
|---|---|---|---|---|
| 1st Polymer Actuator | (+) or (-) | (-) or (+) | 2nd electrode → 1st electrode or 1st electrode → 2nd electrode | 1st diagonal direction(A1) or 1st diagonal direction(A2) |
| 2nd Polymer Actuator | (-) or (+) | (+) or (-) | 1st electrode → 2nd electrode or 2nd electrode → 1st electrode | |

FIG. 18B

| Polymer Actuator | 1st electrode | 2nd electrode | Bending Direction | Moving Direction of OIS movable unit |
|---|---|---|---|---|
| 3rd Polymer Actuator | (+) or (-) | (-) or (+) | 2nd electrode → 1st electrode or 1st electrode → 2nd electrode | 2nd diagonal direction(B1) or 2nd diagonal direction(B2) |
| 4th Polymer Actuator | (-) or (+) | (+) or (-) | 1st electrode → 2nd electrode or 2nd electrode → 1st electrode | |

FIG. 19A

| Polymer Actuator | 1st electrode | 2nd electrode | Bending Direction | Moving Direction of OIS movable unit |
|---|---|---|---|---|
| 1st Polymer Actuator | (-) or (+) | (+) or (-) | 1st electrode → 2nd electrode or 2nd electrode → 1st electrode | 1st Horizontal direction(C1) or 1st Horizontal direction(C2) |
| 2nd Polymer Actuator | (+) or (-) | (-) or (+) | 2nd electrode → 1st electrode or 1st electrode → 2nd electrode | |
| 3rd Polymer Actuator | (+) or (-) | (-) or (+) | 2nd electrode → 1st electrode or 1st electrode → 2nd electrode | |
| 4th Polymer Actuator | (-) or (+) | (+) or (-) | 1st electrode → 2nd electrode or 2nd electrode → 1st electrode | |

FIG. 19B

| Polymer Actuator | 1st electrode | 2nd electrode | Bending Direction | Moving Direction of OIS movable unit |
|---|---|---|---|---|
| 1st Polymer Actuator | (-) or (+) | (+) or (-) | 1st electrode → 2nd electrode or 2nd electrode → 1st electrode | 2nd Horizontal direction(D1) or 2nd Horizontal direction(D2) |
| 2nd Polymer Actuator | (+) or (-) | (-) or (+) | 2nd electrode → 1st electrode or 1st electrode → 2nd electrode | |
| 3rd Polymer Actuator | (-) or (+) | (+) or (-) | 1st electrode → 2nd electrode or 2nd electrode → 1st electrode | |
| 4th Polymer Actuator | (+) or (-) | (-) or (+) | 2nd electrode → 1st electrode or 1st electrode → 2nd electrode | |

# LENS DRIVING DEVICE, AND CAMERA MODULE AND OPTICAL DEVICE INCLUDING SAME

CROSS-REFERENCE TO RELATED APPLICATIONS

This application is the U.S. national stage application of International Patent Application No. PCT/KR2021/014248, filed Oct. 14, 2021, which claims the benefit under 35 U.S.C. § 119 of Korean Application Nos. 10-2020-0133658, filed Oct. 15, 2020, and 10-2020-0171598, filed Dec. 9, 2020, the disclosures of each of which are incorporated herein by reference in their entirety.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a lens moving apparatus capable of reducing the length or height thereof in the optical-axis direction and of performing OIS operation using a polymer actuator, and a camera module and an optical device each including the lens moving apparatus.

Embodiments provides a lens moving apparatus capable of inhibiting drooping of an OIS operation unit caused by gravity or deterioration of performance of AF operation caused by movement and of improving resolution, and a camera module and an optical device each including the lens moving apparatus.

Furthermore, embodiments provide a camera module and an optical device each capable of inhibiting errors in AF operation or OIS operation caused by magnetic field interference.

In addition, embodiments provide a lens moving apparatus configured to perform OIS operation using a polymer actuator, and a camera module and an optical device each including the lens moving apparatus.

Technical Solution

A lens moving apparatus according to an embodiment includes a circuit board, a housing disposed on the circuit board, a bobbin disposed in the housing, a magnet disposed on the housing, a coil disposed on the bobbin and configured to move the bobbin in an optical-axis direction by interaction with the magnet, an upper elastic member coupled to the bobbin and to the housing, and a polymer actuator comprising one end coupled to the upper elastic member, wherein the circuit board is conductively connected to the polymer actuator and configured to supply a first drive signal to the polymer actuator, and the polymer actuator is configured to move the housing a direction perpendicular to the optical-axis direction by the first drive signal.

The polymer actuator may include a polymer portion and first and second electrodes disposed opposite each other with the polymer portion interposed therebetween, and the first drive signal may be input to the first and second electrodes.

The circuit board may include a first pad conductively connected to the first electrode and a second pad conductively connected to the second electrode.

The polymer actuator may be bending-deformed in a direction toward the second electrode from the first electrode or in a direction toward the first electrode from the second electrode by the first drive signal.

Each of the first and second electrodes may be made of elastic and conductive metal.

The upper elastic member may include a first upper elastic unit conductively connected to the first electrode and a second upper elastic unit conductively connected to the second electrode.

The coil may be conductively connected to the first upper elastic unit and the second upper elastic unit, and the circuit board may be configured to supply a second drive signal to the first and second electrodes to drive the coil.

The first and second electrodes may be disposed so as to face in a diagonal direction of the housing. Alternatively, the first and second electrodes may be disposed so as to face in a direction parallel to one side portion of the housing.

The one end of the first electrode may be coupled to the first upper elastic unit and another end of the first electrode may be coupled to the circuit board, and one end of the second electrode may be coupled to the second upper elastic unit and another end of the second electrode may be coupled to the circuit board.

The first upper elastic unit may include a first coupler coupled to the housing, a second coupler coupled to the first electrode, and a first connector connecting the first coupler to the second coupler, and the second upper elastic unit may include a third coupler coupled to the housing, a fourth coupler coupled to the second electrode, and a second connector connecting the third coupler to the fourth coupler.

A lens moving apparatus according to another embodiment includes a housing, a bobbin disposed in the housing, a first magnet unit disposed on a first corner portion of the housing, a second magnet unit disposed on a second corner portion of the housing which faces the first corner portion in a first diagonal direction, a third magnet unit disposed on a third corner portion of the housing, a dummy member disposed on a fourth corner portion of the housing which faces the third corner portion in a second direction, a coil configured to move the bobbin in the optical-axis direction by the interaction with the magnet, an upper elastic member coupled both to the bobbin and to the housing, a polymer actuator coupled to the upper elastic member, and a circuit board conductively connected to the polymer actuator to supply a drive signal to the polymer actuator, wherein the polymer actuator moves the housing in a direction perpendicular to the optical-axis direction in response to the drive signal.

The lens moving apparatus according to another embodiment may include a sensing magnet disposed on the bobbin, and a first position sensor opposed to the sensing magnet in the optical-axis direction.

Furthermore, the lens moving apparatus according to another embodiment may include a first sensor which overlaps the first magnet unit in the optical-axis direction and is disposed on the circuit board, and a second sensor which overlaps the third magnet unit in the optical-axis direction and is disposed on the circuit board.

The polymer actuator may include a first polymer actuator disposed on the first corner portion, a second actuator disposed on the second corner portion, a third polymer actuator disposed on the third corner portion, and a fourth polymer actuator disposed on the fourth corner portion.

The first polymer actuator and the second polymer actuator may be bending-deformed in the same direction, and the third polymer actuator and the fourth polymer actuator may be bending-deformed in the same direction.

The polymer actuator may include a polymer portion and first and second electrodes disposed opposite each other with the polymer portion interposed therebetween, and the first and second electrodes of the polymer actuator may be disposed so as to face each other in a diagonal direction of the housing.

Alternatively, the polymer actuator may include a polymer portion and first and second electrodes disposed opposite each other with the polymer portion interposed therebetween, the first and second electrodes of the polymer actuator may be disposed so as to face each other in a horizontal direction, and the horizontal direction may be a direction parallel to one side portion of the housing.

A lens moving apparatus according to a further embodiment includes a stationary unit including a circuit board, a first movable unit including a bobbin, a second movable unit including a housing configured to receive the bobbin therein, an elastic member configured to elastically support the first movable unit relative to the housing, and a polymer actuator configured to support the second movable unit relative to the stationary unit, wherein the polymer actuator includes a polymer portion, a first electrode disposed on a first surface of the polymer portion, and a second electrode disposed on a second surface of the polymer portion which is positioned opposite the first surface, and the first electrode and the second electrode are conductively connected to the circuit board, and wherein the circuit board supplies a drive signal to the first and second electrodes, and the polymer actuator moves the second movable unit relative to the stationary unit in a direction perpendicular to the optical-axis direction in response to the drive signal.

Advantageous Effects

Embodiments are capable of reducing the length or height in the optical-axis direction and of performing OIS operation using a polymer actuator.

Embodiments are capable of inhibiting drooping of an OIS operation unit caused by gravity or deterioration of performance of AF operation caused by movement and of improving resolution.

Furthermore, embodiments are capable of inhibiting errors in AF operation or OIS operation caused by magnetic field interference.

In addition, embodiments are capable of performing OIS operation using a polymer actuator.

Furthermore, since embodiments support OIS operation using the polymer actuator, the embodiments are capable of supporting OIS operation of a lens which is larger and heavier than a conventional lens using a suspension wire.

DESCRIPTION OF DRAWINGS

FIG. 4A is a perspective view of a housing, a magnet, and a dummy member;

FIG. 18A is a view illustrating an embodiment of a method of moving the OIS movable unit in a first diagonal direction;

FIG. 18B is a view illustrating an embodiment of a method of moving the OIS movable unit in a second diagonal direction;

FIG. 19A is a view illustrating an embodiment of a method of moving the OIS movable unit in a first horizontal direction;

FIG. 19B is a view illustrating an embodiment of a method of moving the OIS movable unit in a second horizontal direction;

BEST MODE

Figure 1:
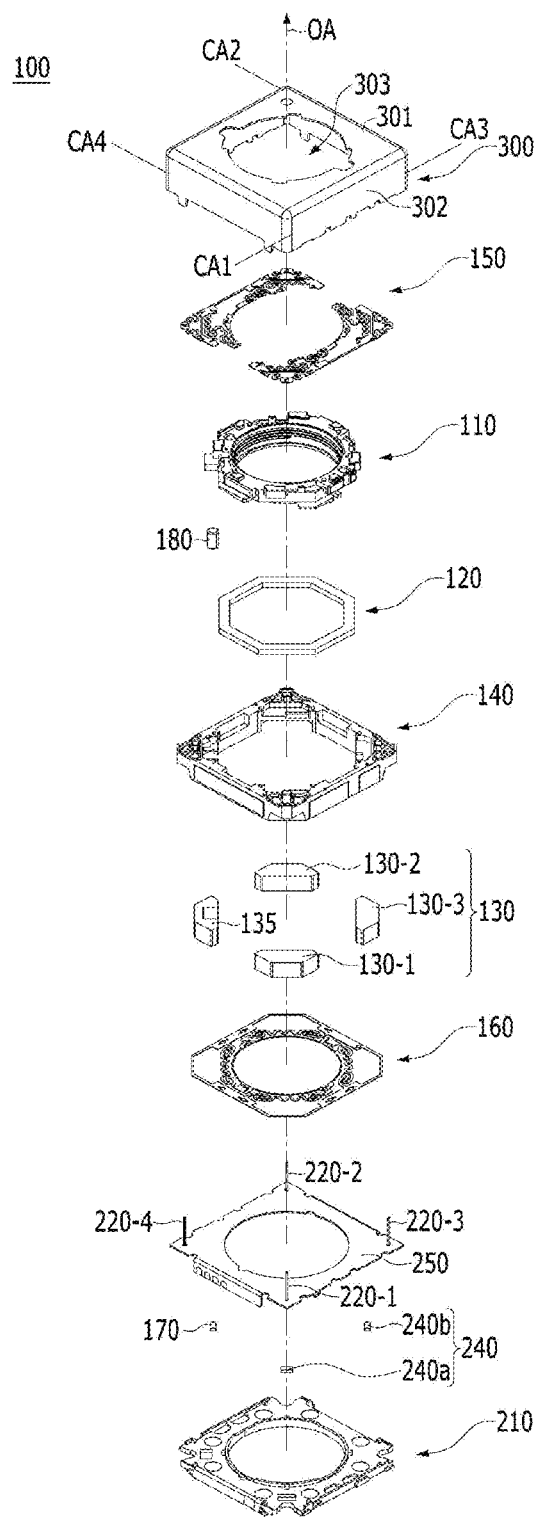
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, the lens moving apparatus may be alternatively referred to as a "lens moving unit", a "VCM (Voice Coil Motor)", an "actuator" or a "lens moving device". Hereinafter, the term "coil" may be interchangeably used with "coil unit", and the term "elastic member" may be interchangeably used with "elastic unit" or "spring".

In the follow description, the "terminal" may be alternatively referred to as a "pad", "electrode", "conductive layer" or "bonding portion".

For the convenience of description, although the lens moving apparatus according to an embodiment is described using a rectangular coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the direction of the optical axis OA, may be referred to as a "first direction", the X-axis direction may be referred to as a "second direction", and the Y-axis direction may be referred to as a "third direction".

The lens moving apparatus according to an embodiment of the present invention is capable of performing an "autofocus function". Here, the "autofocus function" serves to automatically focus an image of a subject on an image sensor surface. Here, the "autofocus (AF) function" may be defined as a function of automatically focusing on an object through control of distance to an image sensor by moving a lens in the optical-axis direction according to distance to the object so as to obtain a clear image of the object on the image sensor. Furthermore, "closed-loop auto focus (CLAF) control" may be defined as performing feedback of position of a lens in real time by detecting the distance between an image sensor and a lens in order to improve accuracy of focus control.

In addition, the lens moving apparatus according to the embodiment may perform a function of "handshake correction". Here, the function of "handshake correction" may serve to inhibit the contour line of a captured image from being blurred due to vibration caused by shaking of the user's hand when capturing a still image. Furthermore, an "optical image stabilization (OIS) function" may be defined as a function of moving or tilting a lens in a direction perpendicular to the optical axis in order to cancel out vibration (motion) of an image sensor attributable to external force.

Figure 2:
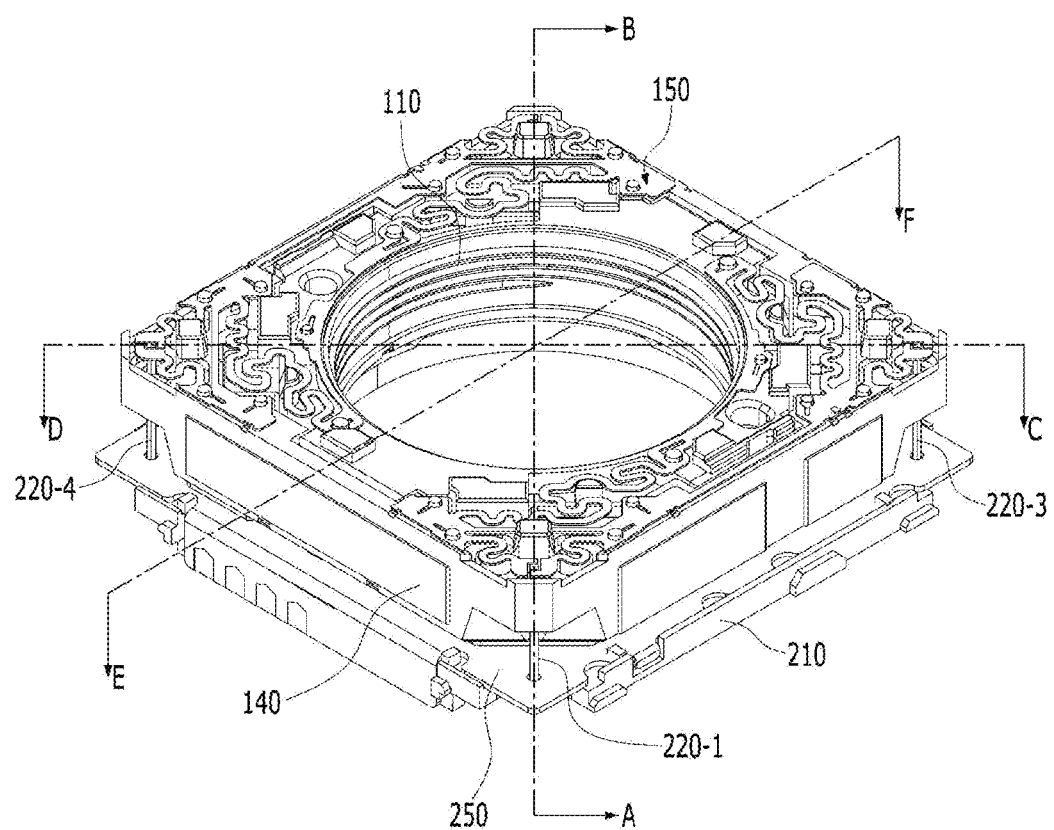
FIG. 2 is an assembled perspective view of the lens moving apparatus shown in FIG. 1, from which a cover member is removed.

FIG. 1 is an exploded perspective of the lens moving apparatus 100 according to an embodiment of the present invention. FIG. 2 is an assembled perspective view of the lens moving apparatus 100, from which a cover member 300 in FIG. 1 is removed.

Referring to FIGS. 1 and 2, the lens moving apparatus 100 may include an OIS (optical image stabilization) movable unit (or an "OIS operation unit"), a polymer actuator 220, and a stationary unit.

The polymer actuator 220 may be coupled both to the OIS movable unit and to the stationary unit so as to support the OIS movable unit with respect to the stationary unit and to move the OIS movable unit in a direction perpendicular to the optical axis. Controllers 830 and 780 may control bending of the polymer actuator 220 in response to a drive signal (or a control signal), and may thus perform the OIS function for the lens moving apparatus 100, a camera module 200 and/or an optical device 200A.

The OIS movable unit may include an AF movable unit (or an "AF operation unit"), and a housing 140. For example, the OIS movable unit may further include components (for example, a magnet 130) disposed on or coupled to the housing 140.

The AF movable unit may be referred to as a "first movable unit", and the OIS movable unit may be referred to as a "second movable unit".

The AF movable unit may include a bobbin 110. For example, the AF movable unit may further include components coupled to the bobbin 110. For example, the AF movably unit may include at least one of the bobbin 110, a coil 120, or a sensing magnet 180.

The lens moving apparatus 100 may further include an elastic member. The elastic member may include at least one of an upper elastic member 150 or a lower elastic member 160.

The lens moving apparatus 100 may include a first position sensor 170 in order to perform an AF feedback operation. Furthermore, the lens moving apparatus 100 may include a second position sensor 240 for OIS feedback operation.

The lens moving apparatus 100 may further include a dummy member 135 for weight balance of the magnet 130.

The stationary unit may be an immovable or fixed portion, compared to the AF operation unit and the OIS operation unit. For example, the stationary unit may include at least one of a base 210 or a cover member 300. The lens moving apparatus 100 may include a circuit board 250, which is conductively connected to the coil 120 and the polymer actuator 220. The circuit board 250 may be disposed on the base 210, and may be included in the stationary unit.

The lens moving apparatus 100 according to an embodiment may include the stationary unit including the circuit board 250, a first movable unit including the bobbin 110, a second movable unit including the housing 140 configured to accommodate the bobbin 110 therein, the elastic member 150 and/or 160 configured to support the first movable unit with respect to the housing 140, and the polymer actuator 220 configured to support the second movable unit with respect to the stationary unit. The polymer actuator 220 may include a polymer portion 51, a first electrode 52 disposed on a first surface of the polymer portion 51, and a second electrode 53 disposed on a second surface positioned opposite the first surface of the polymer portion. The first electrode 52 and the second electrode 53 may be conductively connected to the circuit board 250. The circuit board 250 may supply a drive signal to the first electrode 52 and the second electrode 53. In response to the drive signal, the polymer actuator 220 may move the second movable unit relative to the stationary unit in a direction perpendicular to the optical axis.

First, the bobbin 110 will be described.

The bobbin 110 may be disposed in the housing 140 so as to be movable in the optical-axis direction OA or the first direction (for example, the Z-axis direction) by the electromagnetic interaction between the coil 120 and the magnet 130.

Figure 3A:
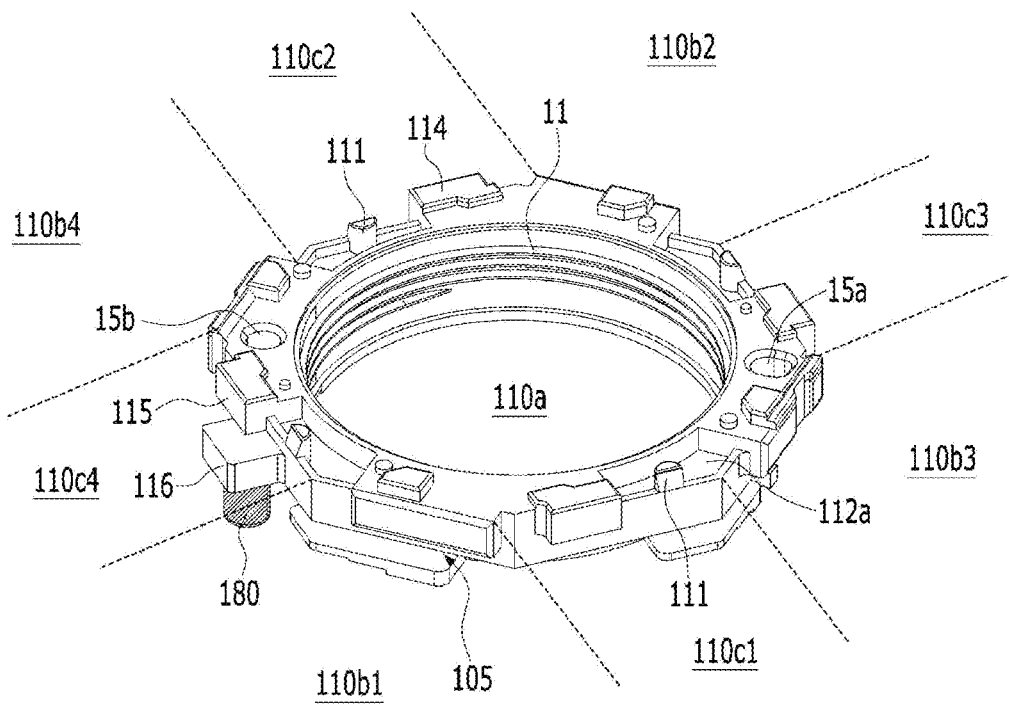
FIG. 3A is a perspective view of a bobbin and a sensing magnet.
Figure 3B:
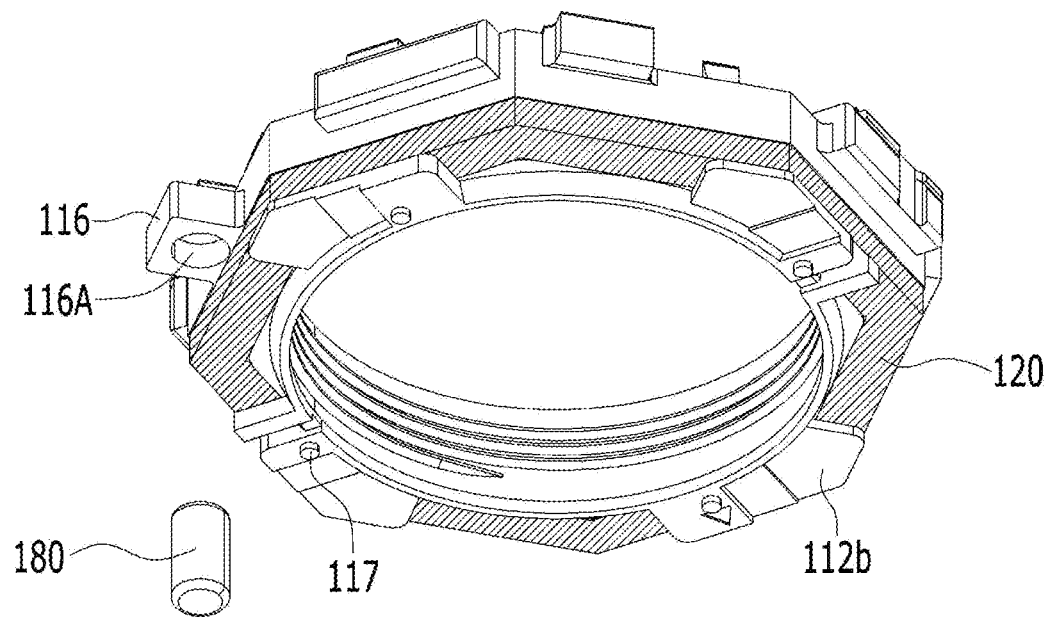
FIG. 3B is a perspective view the bobbin, a coil, and the sensing magnet.

FIG. 3A is a perspective view of the bobbin 110 and the sensing magnet 180. FIG. 3B is a perspective view of the bobbin 110, the coil 120, and the sensing magnet 180.

Referring to FIGS. 3A to 3C, the bobbin 110 may have a bore 110a in which a lens or a lens barrel is mounted. For example, the bore 110a in the bobbin 110 may be a through hole formed through the bobbin 110 in the optical-axis direction, and may have a circular shape, an elliptical shape or a polygonal shape, without being limited thereto.

A lens module 400 may be coupled or mounted in the bore 110a in the bobbin 110. The lens module 400 may include a lens and/or a lens barrel. For example, the lens may be directly mounted in the bore 110a, or the lens barrel including the lens coupled thereto may be coupled or mounted in the bore 110a in the bobbin 110.

The bobbin 110 may include first side portions 110b1 to 110b4, which are spaced apart from each other, and second side portions 110c1 to 110c4, which are spaced apart from each other. Each of the second side portions 110c1 to 110c4 may connect two adjacent first side portions to each other. For example, the horizontal or crosswise length of each of the first side portions 110b1 to 110b4 of the bobbin 110 may be different from the horizontal or crosswise length of each of the second side portions 110c1 to 110c4 of the bobbin 110, without being limited thereto.

The bobbin 110 may include a projection 115 provided on the outer lateral surface thereof. For example, although the projection 115 may be disposed on the outer lateral surface of at least one of the first and second side portions 110b1 to 110b4 or 110c1 to 110c4 of the bobbin 110, the disclosure is not limited thereto. The projection 115 may project in a direction that extends through the center of the bore 110a in the bobbin and is parallel to a line perpendicular to the optical axis OA, but the disclosure is not limited thereto.

The projection 115 of the bobbin 110 may correspond to or face a groove 25a in the housing 140, and may be disposed in the groove 25a in the housing 140. The projection 115 may suppress or inhibit the bobbin 110 from being rotated about the optical axis OA beyond a predetermined range. Furthermore, the projection 115 may serve as, for example, an upper stopper.

Furthermore, the bobbin 110 may include a projection 116, which projects from the outer lateral surface of the bobbin 110 in a direction which intersects the optical axis OA and is perpendicular to the optical axis, and on which the sensing magnet 180 is disposed.

Referring to FIG. 3B, for example, the projection 116 may be formed on the outer lateral surface of the second side portion (for example, 110c4) of the bobbin 110.

The projection 116 may have a groove or a hole 116A in which the sensing magnet 180 is disposed or seated. Although the groove 116A may have a shape which corresponds to or coincides with the shape of the sensing magnet 180, the disclosure is not limited thereto. The groove 116A may have any shape, as long as the sensing magnet 180 is capable of being coupled thereto.

Although the groove 116A may be formed in, for example, the lower surface of the projection 116, the disclosure is not limited thereto. In another embodiment, the groove may be formed in at least one of the upper surface or the side surface of the projection 116.

Because the sensing magnet 180 is mounted in the groove 116A in the projection 116, it is possible to conveniently and easily perform a process of coupling the sensing magnet 180 to the bobbin 110 after mounting the coil 120 to the bobbin 110.

Similarly to the projection 115 of the bobbin 110, the projection 116 may suppress or inhibit the bobbin 110 from being rotated about the optical axis beyond a predetermined range.

The bobbin 110 may have formed in the upper surface thereof a first escape groove 112a for avoiding spatial interference with a first frame connector 153 of the upper elastic member 150, and may have formed in the lower surface thereof a second escape groove 112a for avoiding spatial interference with a second frame connector 163 of the lower elastic member 160.

Although the first and second escape grooves 112a and 112b may be formed in the first side portions 110b1 to 110b4 of the bobbin 110, the disclosure is not limited thereto. The first and second escape grooves 112a and 112b may be formed in at least one of the first or second side portions of the bobbin 110.

The upper surface of the bobbin 110 may be provided with a guide portion 111 for guiding the mounting position of the upper elastic member 150. As illustrated in FIG. 3A, for example, the guide portion 111 of the bobbin 110 may be disposed in the first escape groove 112a in order to guide the path along which the first frame connector 153 of the upper elastic member 150 extends. For example, the guide portion 111 may project from the bottom surface of the first escape groove 112a in the optical-axis direction.

A damper for adsorbing vibration may be disposed between the guide portion 111 and the first frame connector 153 of the upper elastic member 150, and may be coupled or attached to the guide portion 111 and the first frame connector 153.

The bobbin 110 may include a stopper 114 projecting from the upper surface of the bobbin 110.

The stopper 114 of the bobbin 110 may serve to inhibit the upper surface of the bobbin 110 from directly colliding with the inner side of the upper plate of the cover member 300 even when the bobbin 110 is moved beyond a specified range due to an external impact or the like while the bobbin 110 is being moved in the first direction to perform an autofocus function.

The bobbin 110 may include first couplers 113, which are intended to be coupled and secured to the upper elastic member 150. Although each of the first couplers 113 of the bobbin 110 shown in FIG. 3A is configured to have a protrusion shape, the disclosure is not limited thereto. In another embodiment, each of the first couplers 113 of the bobbin 110 may be configured to have the shape of a groove or a flat surface.

The bobbin 110 may include second couplers 117, which are intended to be coupled and secured to the lower elastic member 160. Although each of the second couplers 117 of the bobbin 110 shown in FIG. 3B is configured to have a protrusion shape, the disclosure is not limited thereto. In another embodiment, each of the second couplers of the bobbin 110 may be configured to have a groove or flat surface shape.

The outer lateral surface of the bobbin 110 may be provided with a seating groove 105 into which the coil 120 is seated, fitted or disposed. The seating groove 105 may be configured to have the form of a groove depressed from the outer lateral surfaces of the first and second side portions 110b1 to 110b4 and 110c1 to 110c4 of the bobbin 110, and may have a closed curve shape (for example, a ring shape), which coincides with the shape of the coil 120.

In order to suppress separation of the coil 120 and to guide the two ends of the coil 120 when the coil 120 is connected to two upper elastic units 50-1 and 50-2, the lower surfaces of two side portions, which are positioned at opposite sides of the bobbin 110, may have guide grooves 116a and 116b formed therein.

Although not illustrated in FIG. 3A, an additional projection having a shape corresponding to the projection 116 may be formed at the outer lateral surface of the bobbin 110 opposite the projection 116. The additional projection may be provided with a balancing magnet for weight balance with the sensing magnet 180. In another embodiment, the additional projection may be omitted due to spatial interference with the magnet, and the bobbin may have a groove or a hole, which is formed in the outer lateral surface of the bobbin 110 opposite the projection 116 to receive the balancing magnet therein.

It is possible to cause the influence on AF driving force due to the magnetic field interference between the magnet 130 and the sensing magnet 180 to cancel out the influence on AF driving force due to the magnetic field interference between the magnet 130 and the balancing magnet, thereby improving accuracy of AF operation.

For example, the bobbin 110 may be provided on the inner peripheral surface thereof with a thread 11 for coupling to a lens or a lens barrel. The thread 11 may be formed in the inner peripheral surface of the bobbin 110 in the state in which the bobbin 110 is held by a jig or the like. The upper surface of the bobbin 110 may have jig-clamping grooves 15a and 15b formed therein. For example, although the jig-clamping grooves 15a and 15b may be formed in the upper surfaces of two side portions positioned at opposite sides of the bobbin 110, the disclosure is not limited thereto. The jig-clamping grooves 15a and 15b may serve as a contaminant collector for collecting contaminants.

Next, the coil 120 will be described.

The coil 120 may be disposed on the bobbin 110, and may be coupled to the bobbin 110.

For example, the coil 120 may be disposed on the outer lateral surface of the bobbin 110. Although the coil 120 may be disposed inside the sensing magnet 180, the disclosure is not limited thereto.

Figure 10:
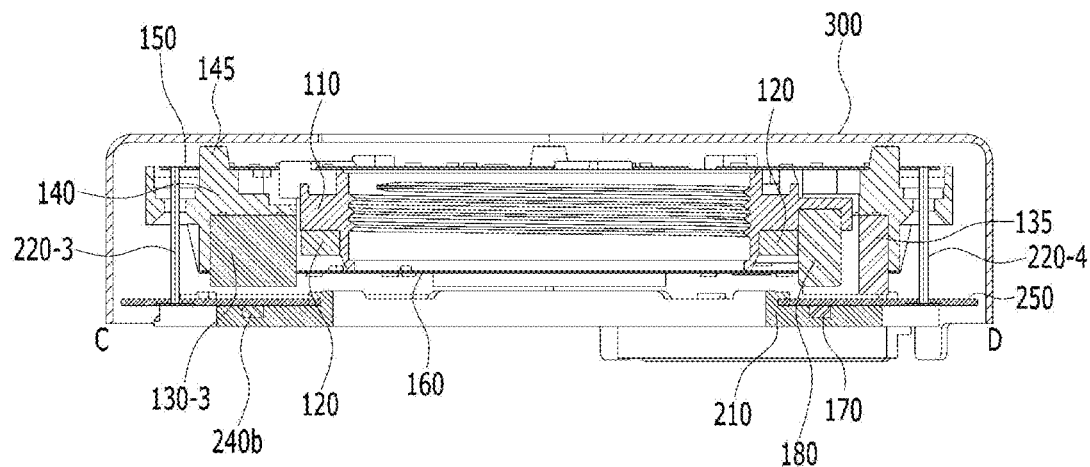
FIG. 10 is a cross-sectional view of the lens moving apparatus taken along line C-D in FIG. 2.

Referring to FIG. 10, for example, although the upper end (or the upper surface) of the coil 120 may be positioned lower than the lower surface of the projection 116 of the bobbin 110, the disclosure is not limited thereto. In another embodiment, the lower end (or the lower surface) of the coil 120 may be positioned at a level which is identical to or higher than the upper surface of the projection 116 of the bobbin 110.

For example, the coil 120 may overlap the sensing magnet 180 in a direction parallel to a straight line which is perpendicular to the optical axis OA and intersects the optical axis OA.

Referring to FIGS. 3B and 10, the lower end or the lower surface of the sensing magnet 180 may be positioned lower than the lower end or the lower surface of the coil 120.

For example, since the lower end or the lower surface of the sensing magnet 180 is lower than the lower end or the lower surface of the coil 120, the sensing magnet 180 may be disposed close to the first position sensor 170 disposed on the base 210, thereby improving sensitivity of the first position sensor 170.

For example, the lower end or the lower surface of the sensing magnet 180 may be positioned lower than the lower surface or the lower end of the bobbin 110. For example, at least a portion (for example, the lower portion) of the sensing magnet 180 may project downwards based on the lower surface of the bobbin 110.

For example, although the length of the sensing magnet 180 in the optical-axis direction may be equal to or greater than the length of the magnet 130 in the optical-axis direction, the disclosure is not limited thereto. In another embodiment, the former may be less than the latter.

For example, although the upper surface of the sensing magnet 180 may be positioned higher than the upper surface of the dummy member 135 and the lower surface of the sensing magnet 180 may be positioned higher than the lower surface of the dummy member 135, the disclosure is not limited thereto. In another embodiment, the upper surface of the sensing magnet 180 may be positioned at a level which is equal to or lower than the upper surface of the dummy member 135, and the lower surface of the sensing magnet 180 may be positioned at a level which is equal to or lower than the lower surface of the dummy member 135.

In a further embodiment, the sensing magnet may be attached to the lower surface or the bottom surface of the bobbin 110 using an adhesive rather than being disposed in the groove 116A in the bobbin 110. In other words, the magnet 130 may project downwards from the lower surface of the housing 140, and may be spaced apart from the circuit board 250, with the result that the sensing magnet may be disposed in the space between the lower end of the bobbin 110 and the circuit board 250 and/or the base 210. This offers an advantage of making it possible to assure a space in which the sensing magnet is disposed, even in an embodiment which includes four driving magnet units.

In an embodiment in which the sensing magnet is disposed on the lower surface of the bobbin 110, there may be a restriction on the length of the sensing magnet in the optical-axis direction, thereby deteriorating sensitivity of the first position sensor 170. In contrast, when the sensing magnet 180 is disposed in the groove 116A in the projection 116, as illustrated in FIG. 3B, it is possible to assure a sufficient length of the sensing magnet 180 in the optical-axis direction and thus to improve sensitivity of the first position sensor 170.

For example, the coil 120 may be disposed in the seating groove 105 in the bobbin 110, and the sensing magnet 180 may be inserted into or disposed in the groove 116A in the bobbin 110.

The sensing magnet 180 disposed on the bobbin 110 may be positioned outside the coil 120 disposed on the bobbin 110. The outside of the coil 120 may be the side opposite the center of the bobbin 110 based on the coil 120.

For example, the distance between the center of the bobbin 110 (or the center of the bore 110a in the bobbin 110) and the sensing magnet 180 may be greater than the distance between the center of the bobbin 110 (or the center of the bore 110a in the bobbin 110) and the coil 120.

In order to improve sensitivity of the first position sensor 170 configured to detect a magnetic field of the sensing magnet 180, the first position sensor 170 may overlap the sensing magnet 180 in the optical-axis direction. Because the sensing magnet 180 is disposed outside the coil 120, it is possible to alleviate the restriction on the size of the bore 110a in the bobbin 110 and thus to design the embodiment capable of accommodating a lens of a large diameter therein.

Although the sensing magnet 180 disposed on the bobbin 110 may be in contact with the coil 120, the disclosure is not limited thereto. In another embodiment, the sensing magnet 180 may be spaced apart from the coil 120 in a direction perpendicular to the optical-axis direction.

Furthermore, the sensing magnet 180 may overlap at least a portion of the coil 120 in a horizontal direction.

For example, the sensing magnet 180 may include a first portion, which overlaps the coil 120 in a direction which is perpendicular to the optical axis OA and intersects the optical axis, and a second portion, which does not overlap the coil 120 in a direction which is perpendicular to the optical axis OA and intersects the optical axis. The second portion of the sensing magnet 180 may be positioned beneath the first portion of the sensing magnet 180.

Although the coil 120 may surround the outer lateral surface of the bobbin 110 in a rotational direction about the optical axis OA, the disclosure is not limited thereto.

Although the coil 120 may be directly wound around the outer lateral surface of the bobbin 110, the disclosure is not limited thereto. In another embodiment, the coil may be embodied as a coil ling or a coil block, and may be coupled or attached to the bobbin 110.

In another embodiment, the coil 120 may include a plurality of coil units corresponding to the magnets 130. For example, the coil 120 may include two coil units corresponding to two magnet units 130-1 and 130-2, and each of the coil units may have the shape of a ring or the shape of a coil block, which is wound about an axis perpendicular to the optical axis.

A power or drive signal may be supplied to the coil 120. The power or drive signal supplied to the coil 120 may be a DC signal, an AC signal or a signal containing both DC and AC components, and may be of a voltage type or a current type. When a drive signal (for example, drive current) is supplied to the coil 120, it is possible to create electromagnetic force resulting from the electromagnetic interaction with the first magnet, thereby moving the bobbin 110 in the direction of the optical axis OA by virtue of the created electromagnetic force.

At the initial position of the AF operation unit, the bobbin 110 may be moved upwards or downwards, which is referred to as bidirectional driving of the AF operation unit. Alternatively, at the initial position of the AF operation unit, the bobbin 110 may be moved upwards, which is referred to as unidirectional driving.

At the initial position of the AF operation unit, the coil 120 may be disposed so as to correspond to the magnet 130 disposed on the housing 140 in a direction parallel to a line which is perpendicular to the optical axis OA and extends through the optical axis.

For example, the initial position of the AF operation unit may be the original position of the AF operation unit in the state in which no electric power is applied to the coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

Next, the sensing magnet 180 will be described.

The sensing magnet 180 may be disposed on or coupled to the bobbin 110. The sensing magnet 180 may provide a magnetic field to be detected by the first position sensor 170. For example, the sensing magnet 180 may be disposed on or coupled to the projection 116 of the bobbin 110.

For example, at least a portion of the sensing magnet 180 may be disposed in the groove 116A in the projection 116, and may be coupled to the groove 116A using an adhesive or the like. The sensing magnet 180 may be disposed so as to correspond to or to face the first position sensor 170 in the direction of the optical-axis OA.

Although the sensing magnet 180, which correspond to the first position sensor 170, may be exposed at at least a portion of one surface (for example, the lower surface) thereof from the groove 116A in the bobbin 110, the disclosure is not limited thereto. In another embodiment, the sensing magnet 180, which faces the first position sensor 170, may not be exposed at one surface thereof from the bobbin 110.

For example, the sensing magnet 180 disposed on the bobbin 110 may be configured such that the interface between the N pole and the S pole is parallel to a direction perpendicular to the optical axis OA. For example, although the N pole and the S pole of the sensing magnet 180 may face each other in the optical-axis direction, the disclosure is not limited thereto.

In another embodiment, the sensing magnet may be disposed such that the N pole and the S pole face each other in a direction perpendicular to the optical-axis direction. For example, the interface between the N pole and the S pole of the sensing magnet 180 disposed on the bobbin 110 may be parallel to the optical axis OA.

For example, although the sensing magnet 180 may be a monopolar magnetized magnet having one N pole and one S pole, the disclosure is not limited thereto. In another embodiment, the sensing magnet 180 may be a bipolar magnetized magnet, which has two N poles and two S poles, or a tetrapolar magnetized magnet.

Although the sensing magnet 180 may have the form of a solid cylinder, a tube, a semicircular cylinder, or a polyhedron, the disclosure is not limited thereto.

For example, the length of the sensing magnet 180 in the optical-axis direction may be greater than the length of the sensing magnet 180 in a direction perpendicular to the optical-axis direction, whereby the sensing magnet 180 may be easily inserted into or coupled to the groove 116A in the bobbin 110. In another embodiment, the length of the sensing magnet in the optical-axis direction may be equal to or less than the length of the sensing magnet in a direction perpendicular to the optical-axis direction.

When the sensing magnet 180 has the form of a cylinder or a cylindrical tube, distribution of a magnetic field of the sensing magnet 180, which is detected by the first position sensor 170, may be uniform, thereby improving sensitivity of the first position sensor 170.

For example, although the cross-section of the sensing magnet 180, which is obtained by cutting the sensing magnet in a direction perpendicular to the optical-axis direction, may have a circular shape, an elliptical shape, or a polygonal shape (for example, a triangular shape or a quadrilateral shape), the disclosure is not limited thereto.

In another embodiment, the sensing magnet may be disposed on the stationary unit, for example, the circuit board 250 or the base 210, and the first position sensor may be disposed on the AF movable unit, for example, the bobbin 110.

Next, the housing 140 will be described.

The housing 140 may be disposed in the cover member 300, and may be disposed between the cover member 300 and the bobbin 110. The housing 140 may accommodate at least a portion of the bobbin 110 therein, and may be support the magnet 130 and the dummy member 135.

The outer lateral surface of the housing 140 may be spaced apart from the inner surface of the side plate 302 of the cover member 300. Consequently, the OIS movable unit and the stationary unit may be spaced apart from each other in a direction perpendicular to the optical-axis direction, and a space in which the OIS movable unit is movable for OIS operation may be assured.

Figure 4B:
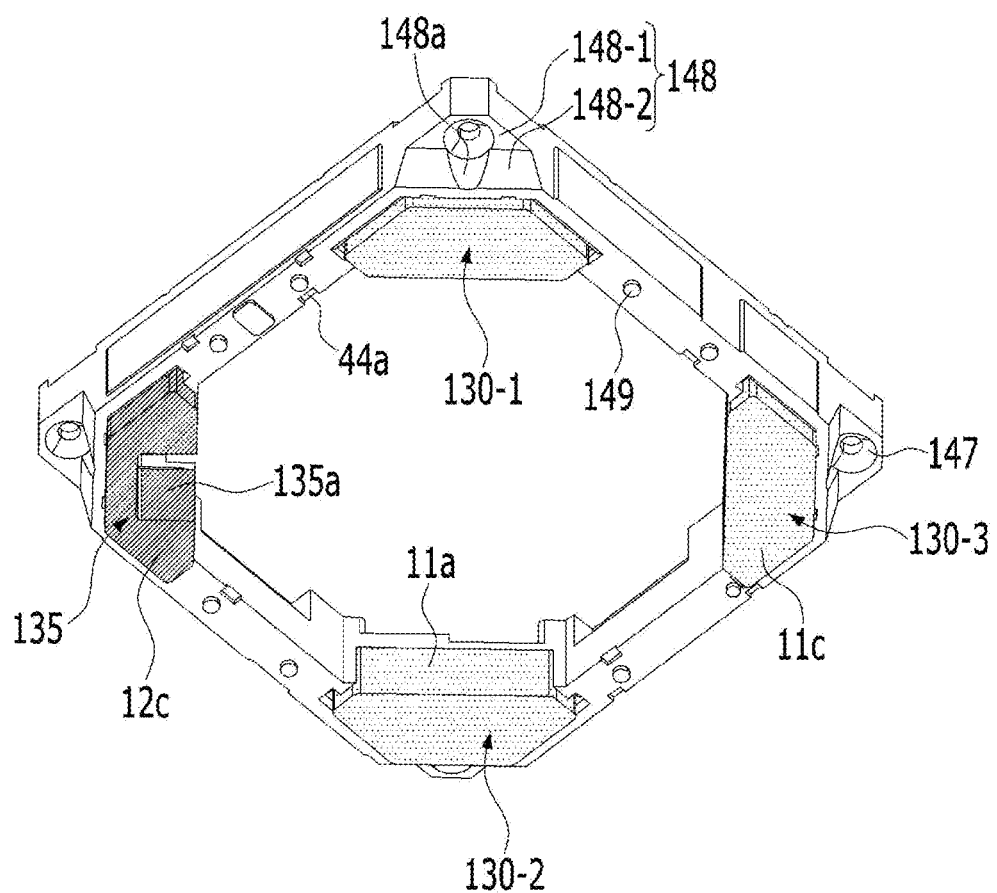
FIG. 4B is an assembled perspective view of the housing, the magnet, and the dummy member.
Figure 5:
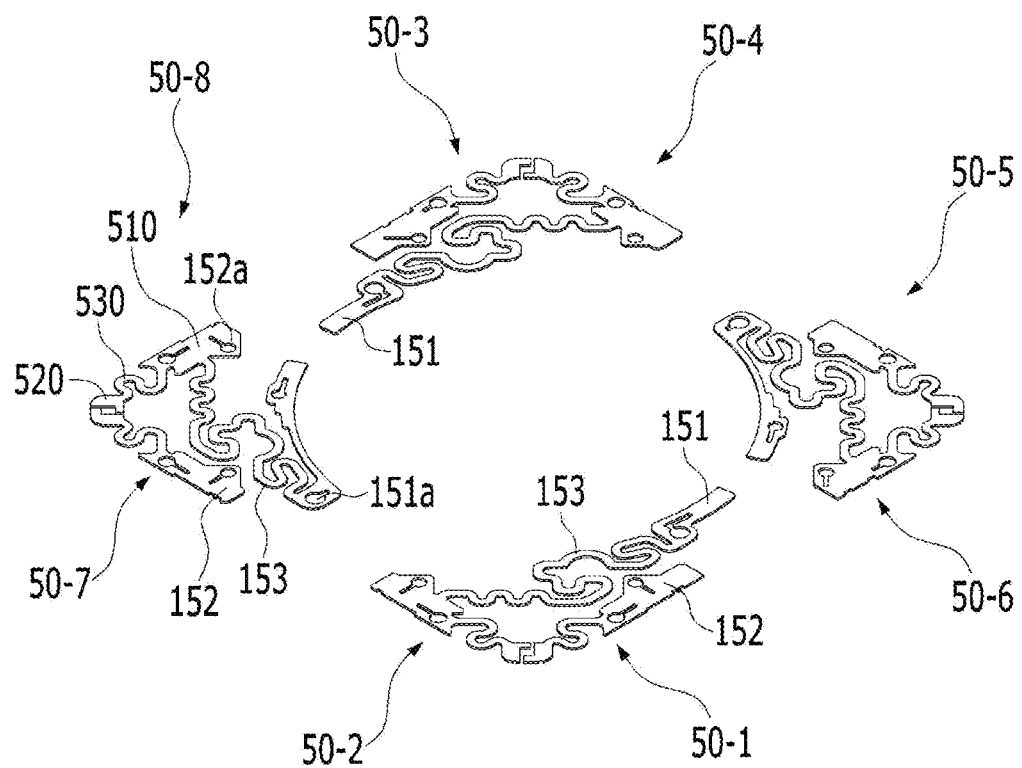
FIG. 5 is a perspective view of an upper elastic member.
Figure 6:
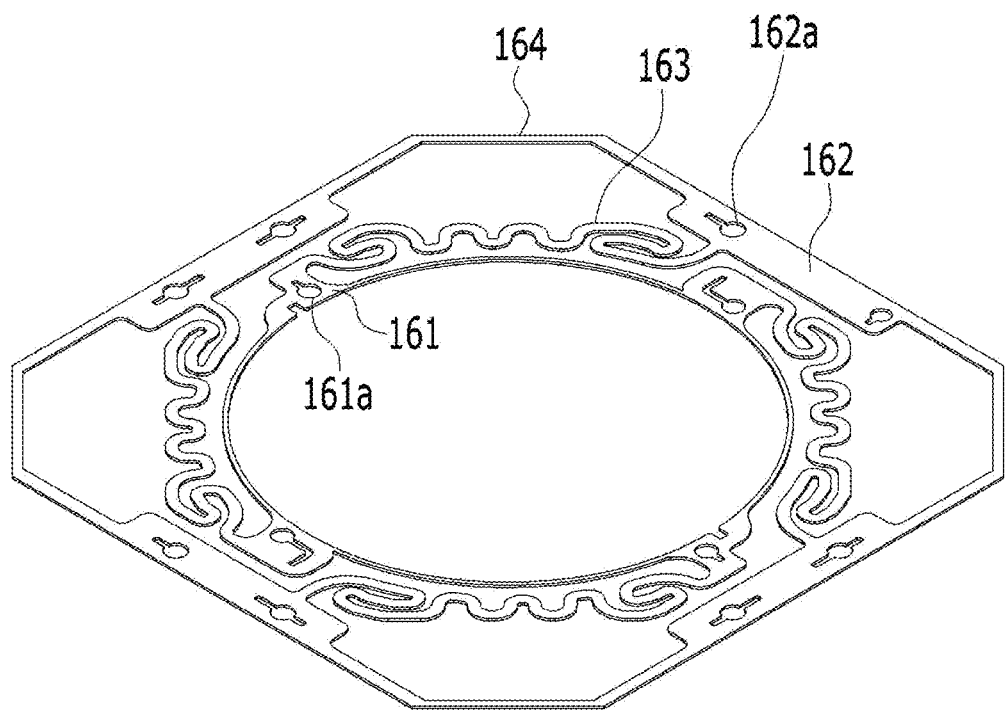
FIG. 6 is a perspective view of a lower elastic member.
Figure 7:
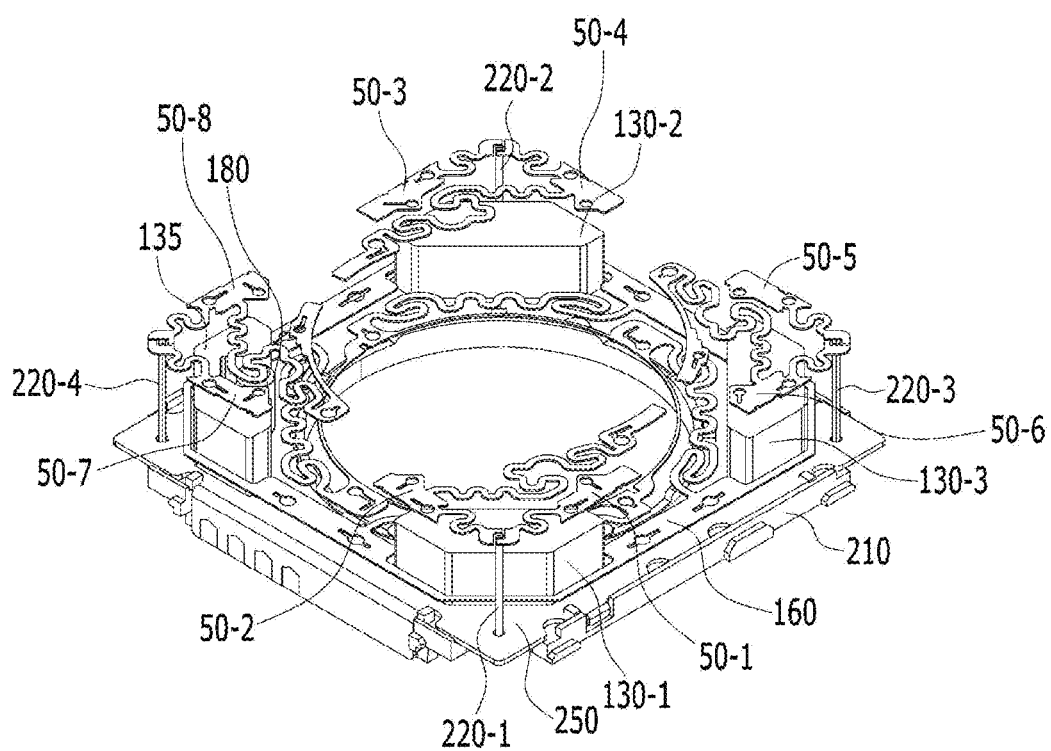
FIG. 7 is a view explaining the electrical connection relationships among the upper elastic member, a polymer actuator, and a circuit board.
Figure 8:
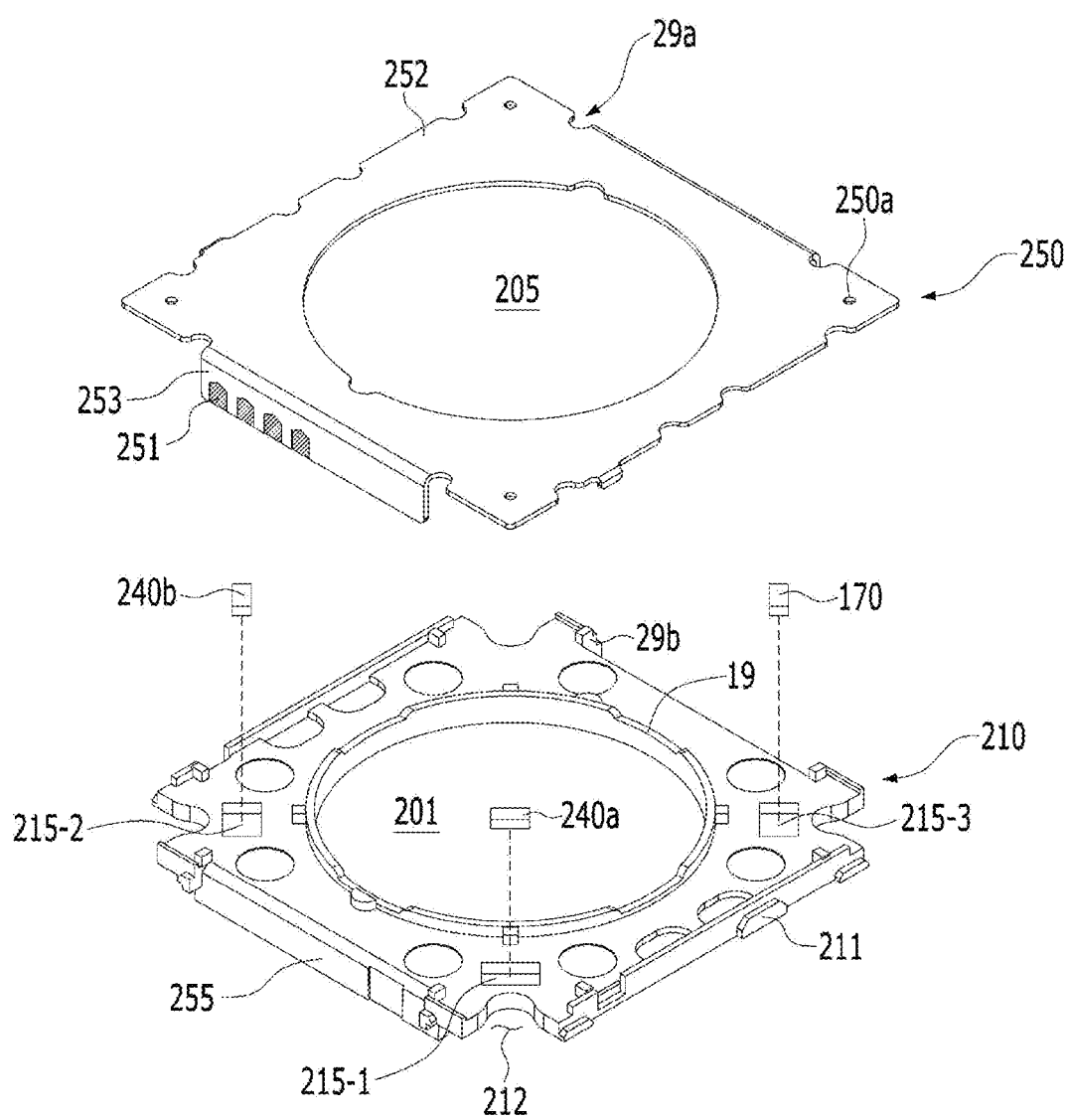
FIG. 8 is an exploded perspective view of the circuit board, a second position sensor, and a base.
Figure 9:
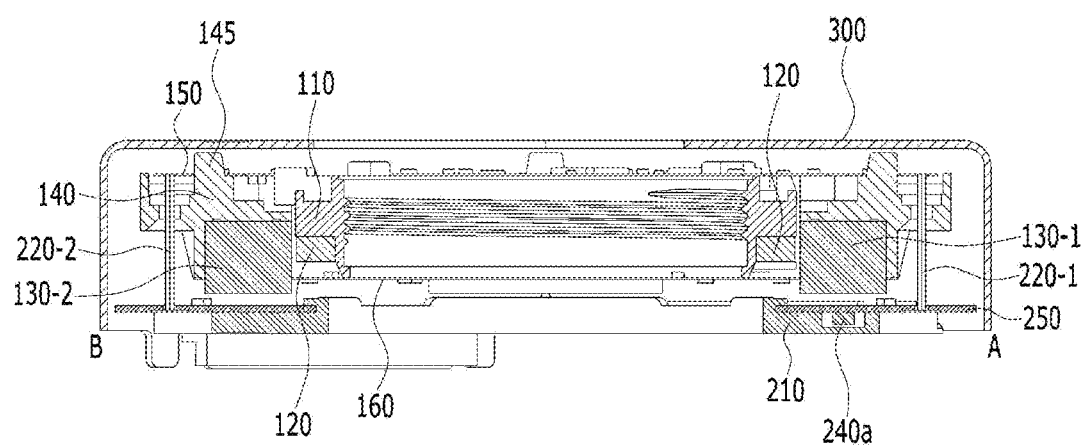
FIG. 9 is a cross-sectional view of the lens moving apparatus taken along line A-B in FIG. 2.
Figure 11:
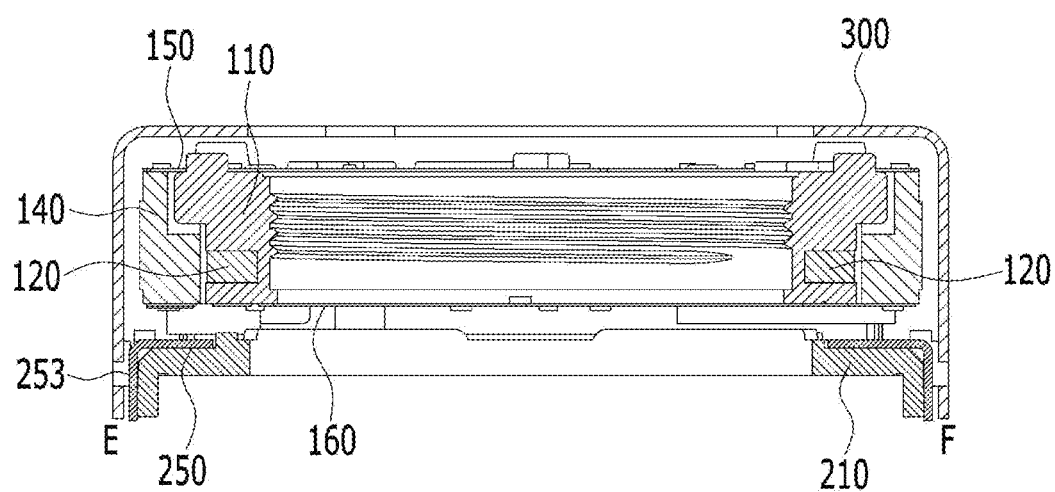
FIG. 11 is a cross-sectional view of the lens moving apparatus taken along line E-F in FIG. 2.
Figure 12:
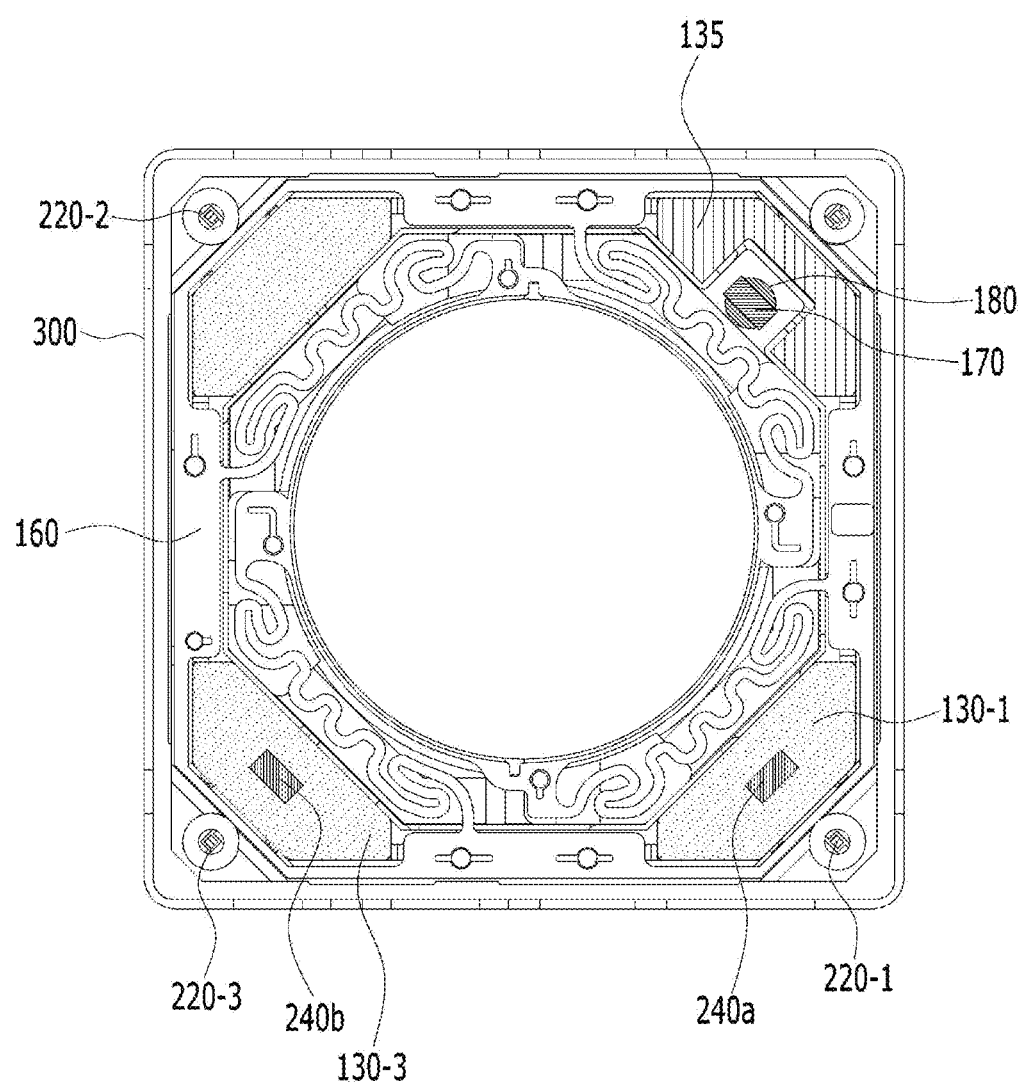
FIG. 12 is a plan view of a magnet, the dummy member, the sensing magnet, and first and second sensors when viewed from below.

FIG. 4A is a perspective view of the housing 140, the magnet 130, and the dummy member 135. FIG. 4B is an assembled perspective view of the housing 140, the magnet 130, and the dummy member 135. FIG. 5 is a perspective view of the upper elastic member 150. FIG. 6 is a perspective view of the lower elastic member 160. FIG. 7 is a view explaining the electrical connection relationships among the upper elastic member 150, the polymer actuator 220, and the circuit board 250. FIG. 8 is an exploded perspective view of the circuit board 250, the second position sensor 240, and the base 210. FIG. 9 is a cross-sectional view of the lens moving apparatus 100, taken in a direction of A-B in FIG. 2. FIG. 10 is a cross-sectional view of the lens moving apparatus 100, taken in a direction C-D in FIG. 2. FIG. 11 is a cross-sectional view of the lens moving apparatus 100, taken in a direction of E-F in FIG. 2. FIG. 12 is a plan view of the magnet 130, the dummy member 135, the sensing magnet 180, and the first and second position sensors 170 and 240, when viewed from below.

Referring to FIGS. 4A and 4B, the housing 140 may be disposed in the cover member 300, and may be configured to have a hollow column overall. For example, the housing 140 may have a polygonal (for example, a rectangular or octagonal) or circular bore 301, and the bore 301 in the housing 140 may be a through hole, which is formed through the housing 140 in the optical-axis direction.

The housing 140 may include a plurality of side portions 141-1 to 141-4 and a plurality of corner portions 142-1 to 142-4.

For example, the housing may include first to fourth side portions 141-1 to 141-4, which are spaced apart from each other, and first to fourth corner portions 142-1 to 142-4, which are spaced apart from each other.

Each of the corner portions 142-1 to 142-4 of the housing 140 may be disposed or positioned between two adjacent side portions so as to connect the side portions to each other.

For example, the corner portions 142-1 to 142-4 may be positioned at the corners of the housing 140. For example, although the number of side portions of the housing 140 is four and the number of corner portions is four, the disclosure is not limited thereto. The number of side portions or corner portions may be five or more.

Each of the side portions 141-1 to 141-4 of the housing 140 may be disposed parallel to a corresponding one of side plates 302 of the cover member 300.

For example, the side portions 141-1 to 141-4 of the housing 140 may respectively correspond to the first side portions 110b1 to 110b4 of the bobbin 110, and the corner portions 142-1 to 142-4 of the housing 140 may respectively correspond to or face the second side portions 110c1 to 110c4 of the bobbin 110.

The magnet 130 and the dummy member 135 may be disposed or mounted on the corner portions 142-1 to 142-4 of the housing 140.

For example, each of the corners or the corner portions 142-1 to 142-4 of the housing 140 may be provided with a seating portion 141a for receiving the magnet 130 therein and a seating portion 141a1 for receiving the dummy member 135.

The seating portions 141a and 141a1 of the housing 140 may be formed in the lower portion or the lower end of at least one of the corner portions 142-1 to 142-4 of the housing 140.

For example, the seating portion 141a in the housing 140 may be provided at the lower portion or the lower end of each of the three corner portions 142-1 to 142-3 of the housing 140, and the seating portion 141a1 in the housing 140 may be provided at the lower portion or the lower end of the on corner portion 142-4 of the housing 140.

Although each of the seating portions 141a in the housing 140 may have a groove, for example, a recessed groove having a shape corresponding to the magnet 130, the disclosure is not limited thereto. Although the seating portion 141a1 in the housing 140 may be embodied as a groove, for example, a depressed groove, which has a shape corresponding to the dummy member 135, the disclosure is not limited thereto.

For example, a first opening may be formed in a side surface of the seating portion 141a in the housing 140, which corresponds to or faces the first coil 120, and a second opening may be formed in the lower surface of the seating portion 141a in the housing 140, which corresponds to or faces the upper surface of the circuit board 250, in order to facilitate mounting of the magnet 130.

A first opening may be formed in a side surface of the seating portion 141a1 in the housing 140, which corresponds to or faces the coil 120, and a second opening may be formed in the lower surface of the seating portion 141a1 in the housing 140, which faces the upper surface of the circuit board 250.

For example, a first surface 11a of the magnet 130, which is fixed to or disposed in the seating portion 141a in the housing 140, may be exposed through the first opening in the seating portion 141a. Furthermore, a lower surface 11c of the magnet 130, which is fixed to or disposed in the seating portion 141a of the housing 140, may be exposed through the second opening of the seating portion 141a.

For example, one side surface of the dummy member 135, which is fixed to or disposed on the seating portion 141a in the housing 140, may be exposed through the first opening of the seating portion 141a1. The lower surface of the dummy member 135, which is fixed to or disposed on the seating portion 141a1 in the housing 140, may be exposed through the second opening of the seating portion 141a1.

In another embodiment, the seating portions 141a and 141a1 in the housing 140 may not have at least one of the first opening or the second opening.

The housing 140 may have an escape groove 41 formed in the upper surface thereof in order to avoid spatial interference with the first frame connector 153 of the upper elastic member 150. For example, although the escape groove 41 in the housing 140 may be formed in each of the upper surfaces of the corner portions 142-1 to 142-4, the disclosure is not limited thereto. In another embodiment, the escape groove 41 may be formed in each of the upper surfaces of the side portions of the housing 140.

For example, the escape groove 41 in the housing 140 may be depressed from the upper surface of the housing 140, and may be positioned closer to the center of the housing 140 than is a stopper 145 or an adhesive injection hole 147 of the housing 140. For example, the escape groove 41 may be positioned further inwards than the stopper 145 of the housing 140 in a direction toward the center of the housing 140, and the adhesive injection holes 146a and 146b may be positioned opposite the escape groove 41 with respect to the stopper 145.

Each of the corner portions 142-1 to 142-4 of the housing 140 may have therein the groove 25a, which corresponds to or faces the projection 115 of the bobbin 110. The groove 25a in the housing 140 may be positioned at the seating portions 141a and 141a1 in the housing 140. For example, the groove 25a in the housing 140 may be formed in the bottom surface of the escape groove 41.

For example, the bottom surface of the groove 25a may be positioned lower than the bottom surface of the escape groove 41. Furthermore, the seating grooves 141a and 141a1 in the housing 140 may be positioned lower than the bottom surface of the escape groove 41 and the bottom surface of the groove 25a.

Although the first magnet 130 may be fixed or attached to the seating portion 141a by means of an adhesive, and the dummy member 135 may be fixed or attached to the seating portion 141a1 by means of an adhesive, the disclosure is not limited thereto.

For example, each of the corner portions 142-1 to 142-4 of the housing 140 may be provided with one or more adhesive injection holes 146a and 146b through which an adhesive is injected. The one or more adhesive injection holes 146a and 146b may be depressed from the upper surface of corresponding corner portions 142-1 to 142-4. Each of the adhesive injection holes 146a and 146b may have a through hole, which is formed through a corresponding one of the corner portions 142-1 to 142-4, and may be connected to or communicate with the seating groove 141a in the housing 140.

The adhesive injection holes 146a and 146b may expose at least a portion of the magnet 130 (for example, at least a portion of the upper surface of the magnet 130) and at least a portion of the dummy member 135 (for example, at least a portion of the upper surface of the dummy member 135) therethrough.

Because the adhesive injection holes 146a and 146b expose at least a portion of the magnet 130 and at least a portion of the dummy member 135, an adhesive may be efficiently applied to the magnet 130 and the dummy member 135, thereby increasing coupling force between the magnet 130 and the housing 140 and coupling force between the dummy member 135 and the housing 140.

In order to inhibit the lower surface of the housing 140 from colliding with the base 210 and/or the circuit board 250, the housing 140 may further include a stopper (not shown) projecting from the lower surface thereof.

The corner portions 142-1 to 142-4 of the housing 140 may be respectively provided with polymer actuators 220-1 to 220-4.

The corner portions 142-1 to 142-4 of the housing 140 may be respectively provided therein with holes 147, which define paths through which the polymer actuators 220-1 to 220-4 extend. For example, the housing 140 may include the holes 147, which are respectively formed through the upper portions of the corner portions 142-1 to 142-4 of the housing 140.

In another embodiment, each of the holes formed in the corner portions 142-1 to 142-4 of the housing 140 may be depressed from the outer lateral surface of the corner portion, and at least a portion of the hole may be open at the outer lateral surface of the corner portion. The number of holes 147 in the housing 140 may be the same as the number of polymer actuators.

In another embodiment, the coil 120, which is an AF operation coil, may be disposed on the housing 140, and the magnet 130 may be disposed on the bobbin 110.

One end of each of the polymer actuators 220 may be connected or bonded to the upper elastic member 150 through the hole 147. For example, one end of the polymer actuator 220 may be coupled and conductively connected to the upper elastic member 150 using solder or a conductive adhesive.

For example, although the diameter of the hole 147 may gradually increase in a direction toward the lower surface from the upper surface of the housing 140 in order to allow a damper to be easily applied, the disclosure is not limited thereto. In another embodiment, the diameter of the hole 147 may be constant.

The housing 140 may have a groove 148 depressed from each of the outer lateral surfaces of the corner portions 142-1 to 142-4. The groove 148 may include a first surface 148-1 in which the hole 147 is formed and a second surface 148-2 positioned between the first surface 148-1 and the lower surface of each of the corner portions 142-1 to 142-4.

In order not only to define the paths through which the polymer actuators 220-1 to 220-4 extend but also to avoid spatial interference between the polymer actuators 220-1 to 220-4 and the corner portions 142-1 to 142-4 of the housing 140, escape grooves 148a may be respectively formed in the outer lateral surfaces of the corner portions 142-1 to 142-4, for example, the second surface 149-2 of the groove 148.

For example, although each of the escape grooves 148a may be connected to the hole 147 in the housing 140 and may have a semicircular or semi-elliptical section, the disclosure is not limited thereto. Furthermore, for example, the lower portion or the lower end of the escape groove 148a may be connected to the lower surface of the housing 140. For example, although the diameter of the escape groove 148a may gradually decrease downwards, the disclosure is not limited thereto.

In order to inhibit the housing 140 from directly colliding with the inner surface of the upper plate 302 of the cover member 300, the housing 140 may be provided at the upper portion, the upper end or the upper surface thereof with the stoppers 145. For example, although the stoppers 145 may respectively be disposed on at least one upper surface of the corner portions 142-1 to 142-4 of the housing 140, the disclosure is not limited thereto. In order to inhibit the lower surface of the housing 140 from colliding with the base 210 and/or the circuit board 250, the housing 140 may further be provided at the lower portion, the lower end or the lower surface thereof with stoppers (not shown).

Furthermore, the corners of the upper surfaces of the corner portions 142-1 to 142-4 of the housing 140 may be respectively provided with guide projections 144 in order to inhibit the damper from overflowing. For example, each of the holes 147 in the housing 140 may be positioned between the corner (for example, the guide projection 144) and the stopper 145 on the upper surface of a corresponding one of the corner portions 142-1 to 142-4 of the housing 140.

The upper portion, the upper end or the upper surface of the housing 140 may be provided with at least one coupler 143, which is coupled to the first outer frame 152 of the upper elastic member 150. The first coupler 143 of the housing 140 may be disposed on at least one of the side portions 141-1 to 141-4 or the corner portions 142-1 to 142-4 of the housing 140.

The lower portion, the lower end or the lower surface of the housing 140 may be provided with a second coupler 149, which is coupled or secured to the second outer frame 162 of the lower elastic member 160. Although each of the first and second couplers 143 and 149 of the housing 140 may have a protrusion shape, the disclosure is not limited thereto. In another embodiment, the coupler may have a groove or flat surface shape.

For example, the first coupler 143 of the housing 140 may be coupled to the hole 152a in the first outer frame 152 of the upper elastic member 150 using an adhesive member or heat fusion, and the second coupler 149 of the housing 140 may be coupled to the hole 162a in the second outer frame 162 of the lower elastic member 160 using an adhesive member (for example, solder) or heat fusion.

In order to avoid spatial interference with the portions at which the second outer frames 162-1 to 162-3 of the lower elastic member 160 meet second frame connectors 163, an escape groove 44a may be formed in the lower surface of at least one of the side portions 141-1 of the housing 140.

Referring to FIGS. 4A and 4B, in order to avoid spatial interference with the projection 116 of the bobbin 110, the housing 140 may have a groove or an opening 141b which corresponds to or faces the projection 116.

For example, the groove 141b may be formed in the fourth corner portion 142-4 of the housing 140, may be open at the upper and lower surfaces of the fourth corner portion 142-4 of the housing 140, and may be open at the inner surface of the fourth corner portion 142-4 of the housing 140. For example, the groove 141b may communicate with or be connected to the seating groove 141a1 in the housing 140.

The projection 116 of the bobbin 110 may be disposed in or inserted into the groove 141b in the housing 140. For example, the sensing magnet 180 may be disposed in the groove 141b in the housing 140 and the seating groove 141a in the housing 140.

For example, at least a portion of the upper portion or the upper end of the sensing magnet 180 may be exposed from the upper surface of the housing 140 through the groove 141b, and at least a portion of the lower portion or the lower end of the sensing magnet 180 may be exposed from the lower surface of the housing 140 through the seating groove 141a. The reason for this is to improve sensitivity with which the first position sensor 170 detects intensity of the magnetic field of the sensing magnet 180.

In another embodiment, the upper portion or the lower portion of the sensing magnet 180 may not be exposed from the upper surface or the lower surface of the housing 140.

Referring to FIG. 4B, although the magnet 130 and the dummy member 135 may project downwards from the lower surface of the housing 140, the disclosure is not limited thereto. In another embodiment, the magnet 130 and the dummy member 135 may not project downwards from the lower surface of the housing 140. For example, the downward direction may be a direction toward the lower surface from the upper surface of the housing 140.

Next, the magnet 130 and the dummy member 135 will be described.

The magnet 130 and the dummy member 135 may be disposed on or coupled to the housing 140.

For example, the magnet 130 may include three magnet units 130-1 to 130-3, which are respectively disposed on three corners (or three corner portions) 142-1 to 142-3 of the housing 140.

For example, the housing 140 may include an upper plate and a side plate, and the magnet 130 may be disposed on the side plate of the housing 140.

For example, the magnet 130 may include a first magnet unit 130-1, a second magnet unit 130-2, and a third magnet unit 130-2, which are disposed on the housing 140 in the state of being spaced apart from one another.

For example, each of the first to third magnet units 130-1 to 130-3 may be disposed between the bobbin 110 and the housing 140.

For example, the first magnet unit 130-1, the second magnet unit 130-2, and the third magnet unit 130-3 may be respectively disposed on the three corner portions 142-1 to 142-3 of the housing 140.

For example, the first magnet unit 130-1 and the second magnet unit 130-2 may be respectively disposed on two corner portions 142-1 and 142-2 of the housing 140 which are positioned opposite each other. Furthermore, the third magnet unit 130-3 may be disposed on one (for example, 142-3) among the remaining two corner portions 142-3 and 142-4 of the housing 140 which are positioned opposite each other, and the dummy member 135 may be disposed on the other one (for example, 142-4) among the remaining two corner portions 142-3 and 142-3.

In the embodiment shown in FIG. 1, the first to third magnet units 130-1 to 130-3 and the dummy member 135 may be respectively disposed on the corner portions 142-1 to 142-4 of the housing 140. The corner portions 142-4 of the housing 140 may provide a space sufficient to allow the dummy member 135 and the projection 116 of the bobbin 110 to which the sensing magnet 180 is mounted to be disposed thereon.

In another embodiment, each of the first to third magnet units may be disposed on a corresponding one among the three side portions 141-1 to 141-3 of the housing 140, and the dummy member may be disposed on the remaining one side portion 141-4 of the housing 140.

In a further embodiment, the lens moving apparatus may include a magnet-mounting member. Although the magnet-mounting member may be provided independently of the housing 140, the disclosure is not limited thereto. In another embodiment, the magnet-mounting member may be integrally formed with the housing 140.

For example, the magnet-mounting member may be of a frame type, and the frame may be coupled to the housing 140. The magnet 130 may be mounted or coupled to the frame.

In another embodiment, a fourth magnet unit, which has a shape corresponding to or identical to the first magnet unit 130-1, may be provided, in place of the dummy member 135. In this case, the sensing magnet 180 may be omitted, and the first position sensor 170 may output a output signal corresponding to the result of detection of intensity of the magnetic field of the magnet disposed on the fourth corner portion of the housing 140. Alternatively, in this case, the sensing magnet may be disposed on one side portion of the bobbin 110 overlapping one side portion of the housing 140, and the first position sensor may be disposed on the base 210 so as to correspond to, face or overlap the sensing magnet in the optical-axis direction.

Each of the first to third magnet units 130-1 to 130-3 may have the form of a polyhedron, which is easily seated on a corresponding one of the corner portions 142-1 to 142-3 of the housing 140. In another embodiment, each of the first to third magnet units may have the form of a polyhedron, which is easily seated on a corresponding one of the side portions of the housing 140.

Each of the first to third magnet units 130-1 to 130-3 may include a first surface 11a, which corresponds to or faces one surface of the coil 120 (or the outer lateral surface of the bobbin 110), and a second surface 11b, which is positioned opposite the first surface 11a. For example, although the first surface 11a may be parallel to the second surface 11b, the disclosure is not limited thereto. In another embodiment, the first surface 11a and the second surface 11b may not be parallel to each other.

For example, the surface area of the first surface 11a of each of the first to third magnet units 130-1 to 130-3 may be larger than the surface area of the second surface 11b. Alternatively, for example, the crosswise length of the second surface 11b of each of the first to third magnet units 130-1 to 130-3 may be smaller than the crosswise length of the first surface 11a.

For example, each of the first to third magnet units 130-1 to 130-3 may include a portion which decreases in crosswise length moving toward the second surface 11b from the first surface 11a. For example, the crosswise length may be a length in a direction parallel to the first surface 11a of the magnet 130.

Each of the first to third magnets 130-1 to 130-3 may be integrally formed, and each of the first to third magnet units 130-1 to 130-3, which face the coil 120, may be provided on the first surface 11a thereof with an S pole and on the second surface 11b thereof with an N pole. However, the disclosure is not limited thereto, and each of the first to third magnets 130-1 to 130-3 may be provided on the first surface 11a thereof with an N pole and on the second surface 11b thereof with an S pole in another embodiment.

For example, the planar shape of each of the first to third magnet units 130-1 to 130-3, which is viewed from above, may be polygonal, for example, triangular, pentagonal, hexagonal, rhomboid or trapezoidal.

Although each of the first to third magnet units 130-1 to 130-3 may be a monopolar magnetized magnet, the disclosure is not limited thereto. In another embodiment, each of the first to third magnet units 130-1 to 130-3 may be a bipolar magnetized magnet, which has two N poles and two S poles, or a tetrapolar magnetized magnet.

Referring to FIGS. 9 to 11, although the sensing magnet 180 may not overlap the coil 120 in the direction of the optical axis OA, the disclosure is not limited thereto. In another embodiment, the sensing magnet may overlap the coil in the optical-axis direction.

At the initial position of the AF operation unit, the first position sensor 170 may not overlap the sensing magnet 180 and the magnet 130 in a direction parallel to a straight line which is perpendicular to the optical axis and intersects the optical axis.

The dummy member 135 may be disposed on the housing 140 so as to correspond to or face the third magnet unit 130-3. The dummy member 135 may be alternatively referred to as a "weight-balancing member", a "balancing member", a "weight compensation member", or a "weight member".

When the dummy member 135 is not provided, unintended tilting and rotation or shift of the OIS movable unit may occur during the OIS operation, thereby causing deterioration of frequency characteristics and/or oscillation.

Although the dummy member 135 may be made of a material, which is not affected by the magnet, or a non-magnetic material, or may be a non-magnetic body, the disclosure is not limited thereto. In another embodiment, the dummy member 135 may be a magnetic body, or may include a magnetic body.

The dummy member 135 is intended to maintain the weight balance with the three magnet units 130-1 to 130-3 disposed on the housing 140.

For example, although the dummy member 135 may have the same mass as the mass of the third magnet unit 130-3, the disclosure is not limited thereto. In another embodiment, the weight of the dummy member 135 may have a tolerance for the weight of the third magnet unit 130-3, as long as the weight imbalance does not cause error in OIS operation.

For example, the dummy member 135 may be disposed on the fourth corner portion 142-4 of the housing 140, which is positioned opposite the third corner portion 142-3 of the housing 140 on which the third magnet unit 130-3 is disposed, for weight balance.

At the initial position of the AF operation unit, although the dummy member 135 may overlap the coil 120 in a direction parallel to a straight line which is perpendicular to the optical axis and intersects the optical axis, the disclosure is not limited thereto. In another embodiment, the dummy member 135 may not overlap the coil 120.

The dummy member 135 may overlap the third magnet unit 130-3 in a direction which is perpendicular to the optical axis and is directed toward the fourth corner portion 142-4 from the third corner portion 142-3. For example, the dummy member 135 may not overlap the sensing magnet 180 in the optical-axis direction.

Since the dummy member 135 is designed to increase the length in the optical-axis direction and the weight, it is possible to design the dummy member 135 to have a reduced length in a direction perpendicular to the optical-axis direction and thus to increase the spatial distance between the dummy member 135 and the sensing magnet 180. Furthermore, it is possible to inhibit damage or breakage of the sensing magnet 180 attributable to impact by inhibiting collision between the dummy member and the sensing magnet.

When the dummy member 135 includes a magnetic body, the intensity of the magnetism of the dummy member 135 may be smaller than the intensity of the magnetism of the third magnet unit 130-3.

For example, although the dummy member 135 may include tungsten and the tungsten may account for 95% or more of the total weight, the disclosure is not limited thereto. For example, the dummy member 135 may be a tungsten alloy.

Although the dummy member may have the form of a polyhedron, for example, the form of a rectangular parallelepiped, the disclosure is not limited thereto, and the dummy member 135 may be formed so as to have various forms. For example, the dummy member 135 may include a round portion or a curved portion at an edge of the side surface thereof.

The dummy member 135 may have a groove 135 for avoiding spatial interference with the sensing magnet 180. For example, the sensing magnet 180 may be disposed in the groove 135a in the dummy member 135.

For example, the dummy member 135 may include a first surface 12a, which corresponds to or face one surface of the coil 120 (or the outer lateral surface of the bobbin 110), and a second surface 12b, which is positioned opposite the first surface 12a. The dummy member 135 may include a lower surface 12c and an upper surface 12d. For example, the lower surface 12c may connect the lower portion of the first surface 12a to the lower portion of the second surface 12b of the dummy member 135, and the upper surface 12d may connect the upper portion of the first surface 12a to the upper portion of the second surface 12b.

For example, the dummy member 135 may include a portion, which decreases in crosswise length in a direction toward the second surface 12b from the first surface 12a. For example, the crosswise length of the dummy member 135 may be the length in a direction parallel to the first surface 12a of the dummy member 135.

For example, the groove 135a may be formed in the first surface 12a, and may be depressed from the first surface 12a. For example, the groove 135a may have a first opening which is formed in the lower surface 12c of the dummy member 135. Furthermore, the groove 135a may have a second opening which is formed in the upper surface 12d of the dummy member 135. At least a portion of the sensing magnet 180 may be disposed in the groove 135a in the dummy member 135. Furthermore, at least a portion of the projection 116 of the bobbin 110 may be disposed in the groove 135a in the dummy member 135.

Next, the upper elastic member 150, the lower elastic member 160, and the polymer actuator 220 will be described.

Referring to FIG. 5, each of the upper elastic member 150 and the lower elastic member 160 may be coupled both to the housing 140 and to the AF movable unit (for example, the bobbin 110), and may elastically support the bobbin 110 with respect to the housing 140.

The upper elastic member 150 may be coupled to the upper portion, the upper end or the upper surface of the bobbin 110, and the lower elastic member 160 may be coupled to the lower portion, the lower end or the lower surface of the bobbin 110.

For example, the upper elastic member 150 may be coupled both to the upper portion, the upper end or the upper surface of the bobbin 110 and to the upper portion, the upper end or the upper surface, and the lower elastic member 160 may be coupled both to the lower portion, the lower end or the lower surface of the bobbin 110 and to the lower portion, the lower end or the lower surface of the housing 140.

The polymer actuator 220 may support the OIS movable unit (for example, the housing 140) relative to the stationary unit such that the OIS movable unit is movable in a direction perpendicular to the optical axis.

The polymer actuator 220 may conductively connect at least one of the upper or lower elastic members 150 or 160 to the circuit board 250. For example, one end of the polymer actuator 220 may be coupled to the upper elastic member 150, and may be conductively connected to the upper elastic member 150. Furthermore, the other end of the polymer actuator 220 may be coupled to the stationary unit (for example, the circuit board 250 or the base 210), and may be conductively connected to the circuit board 250.

Referring to FIG. 5, the upper elastic member 150 may include a plurality of upper elastic units 50-1 to 50-8, which are conductively isolated from each other and spaced apart from each other. Although FIG. 5 illustrates eight upper elastic units, which are spaced apart from each other, the number of upper elastic units is not limited thereto, and may be two or more in another embodiment.

For example, the upper elastic member 150 may include first to eighth upper elastic units 50-1 to 50-8.

At least one of the upper elastic units 50-1 to 50-8 may include the first outer frame 152 coupled to the housing 140. For example, at least one of the upper elastic units 50-1 to 50-8 may further include the first inner frame 151, coupled to the bobbin 110, and the first frame connector 153, connecting the first inner frame 151 to the first outer frame 152.

For example, although each of the first inner frame 151 of the upper elastic member 150 may be provided with a hole 151*a* coupled to the first coupler 113 of the bobbin 110, the disclosure is not limited thereto. For example, the hole 152*a* in the first inner frame 151 may have at least one slit, through which an adhesive member enters, between the first coupler 113 and the hole 151*a*.

The first outer frames 152 of the upper elastic member 150 may have therein a hole 152*a* coupled to the first coupler 143 of the housing 140.

The first outer frame 151 of each of the upper elastic member 150 may include a first coupler 510 coupled to the housing 140, a second coupler 520 coupled to the polymer actuator 220, and a connector 530 connecting the first coupler 510 to the second coupler 520.

The first coupler 510 may include at least one coupling region coupled to the housing (for example, the corner portions 142-1 to 142-4). For example, the coupling region of the first coupler 510 may have at least one hole 152*a* coupled to the first coupler 143 of the housing 140.

For example, each of the coupling regions 5*a* and 5*b* may have therein at least one hole, and each of the corner portions 142-1 to 142-4 of the housing 140 may be correspondingly provided with at least one first coupler. In the embodiment shown in FIG. 5, although each of the coupling regions 5*a* and 5*b* of the first coupler 510 is embodied as having the hole 152*a* therein, the disclosure is not limited thereto. In another embodiment, each of the coupling regions may be embodied as having various shapes, for example, a groove shape, suitable for coupling to the housing 140.

The second coupler 520 may have a groove 20-1 through or in which at least a portion of the polymer actuator 220 extends or is disposed. The one end of the polymer actuator 220, which has passed through the groove 20-1, may be directly coupled to the second coupler 520 using an adhesive member, and the second coupler 520 and the polymer actuator 220 may be conductively connected to each other.

For example, the second coupler 520 may be a region in which an adhesive is disposed for coupling to the polymer actuator 220. Here, the adhesive may be a conductive adhesive (for example, solder) or a non-conductive adhesive.

The connector 530 may connect the first coupler 510 to the second coupler 520. For example, the connector 530 may connect the second coupler 520 to the coupling regions of the first coupler 510. Although the connector 530 may include a bent portion, which is bent at least once, or a curved portion, which is curved at least once, the disclosure is not limited thereto. In another embodiment, the connector may be linear.

For example, the first coupler 510 may be in contact with the upper surfaces of the corner portions 142-1 to 142-4 of the housing 140, and may be supported thereby. For example, the connector 530 and/or the second coupler 520 may not be supported by the upper surface of the housing 140, and may be spaced apart from the housing 140.

Furthermore, in order to inhibit oscillation due to vibration, a damper (not shown) may be disposed in the space between the connector 530 and the housing 140.

Referring to FIG. 6, although the lower elastic member 160 may be embodied as a single integral elastic unit, the disclosure is not limited thereto. In another embodiment, the lower elastic member 160 may include a plurality of lower elastic units which are separated from each other.

For example, the lower elastic member 160 may include the second inner frame 161 coupled or fixed to the lower portion, the lower surface or the lower end of the bobbin 110, the second outer frame coupled or fixed to the lower portion, the lower surface or the lower end of the housing 140, and the second frame connector 163 connecting the second inner frame 161 to the second outer frames 162-1 to 162-3.

The second inner frame 161 may have therein a hole 161*a* for coupling to the second coupler 117 of the bobbin 110, and the second outer frames may have therein holes 162*a* for coupling to the second coupler 149 of the housing 140.

For example, the second inner frame 161 may include a plurality of inner portions and an inner frame connector connecting the inner portions to each other, and the second outer frame 161 may include a plurality of outer portions and an outer frame connector 164 connecting the outer portions to each other.

Each of the upper elastic member 150 and the lower elastic member 160 may be embodied as a leaf spring. However, each of the upper elastic member and the lower elastic member are not limited thereto, and may be embodied as a coil spring or the like.

The above-mentioned elastic unit (for example, 150-1 and 150-2) may be alternatively referred to as a "spring", and the outer frame (for example, 152 or 162) may be alternatively referred to as an "outer portion". Furthermore, the inner frame (for example, 151 or 161) may be alternatively referred to as an inner portion.

Next, the polymer actuator 220 will be described.

The polymer actuator 220 may be disposed on the corner portion of the housing 140. For example, the polymer actuator 220 may include a plurality of polymer actuators 220-1 to 220-4, which are respectively disposed on the corner portions 141-1 to 141-4 of the housing 140. In another embodiment, the polymer actuator 220 may be disposed on the side portion of the housing 140.

Each of the plurality of polymer actuators 220-1 to 220-4 may be disposed on a corresponding one among the corner portions 142-1 to 142-4 of the housing 140, and may be connected to a corresponding one of the upper elastic units 50-1 to 50-8.

Although one polymer actuator is disposed on one corner portion of the housing 140 in FIG. 7, the disclosure is not limited thereto. In another embodiment, two or more polymer actuators may be disposed on one corner portion of the housing 140.

Figure 13:
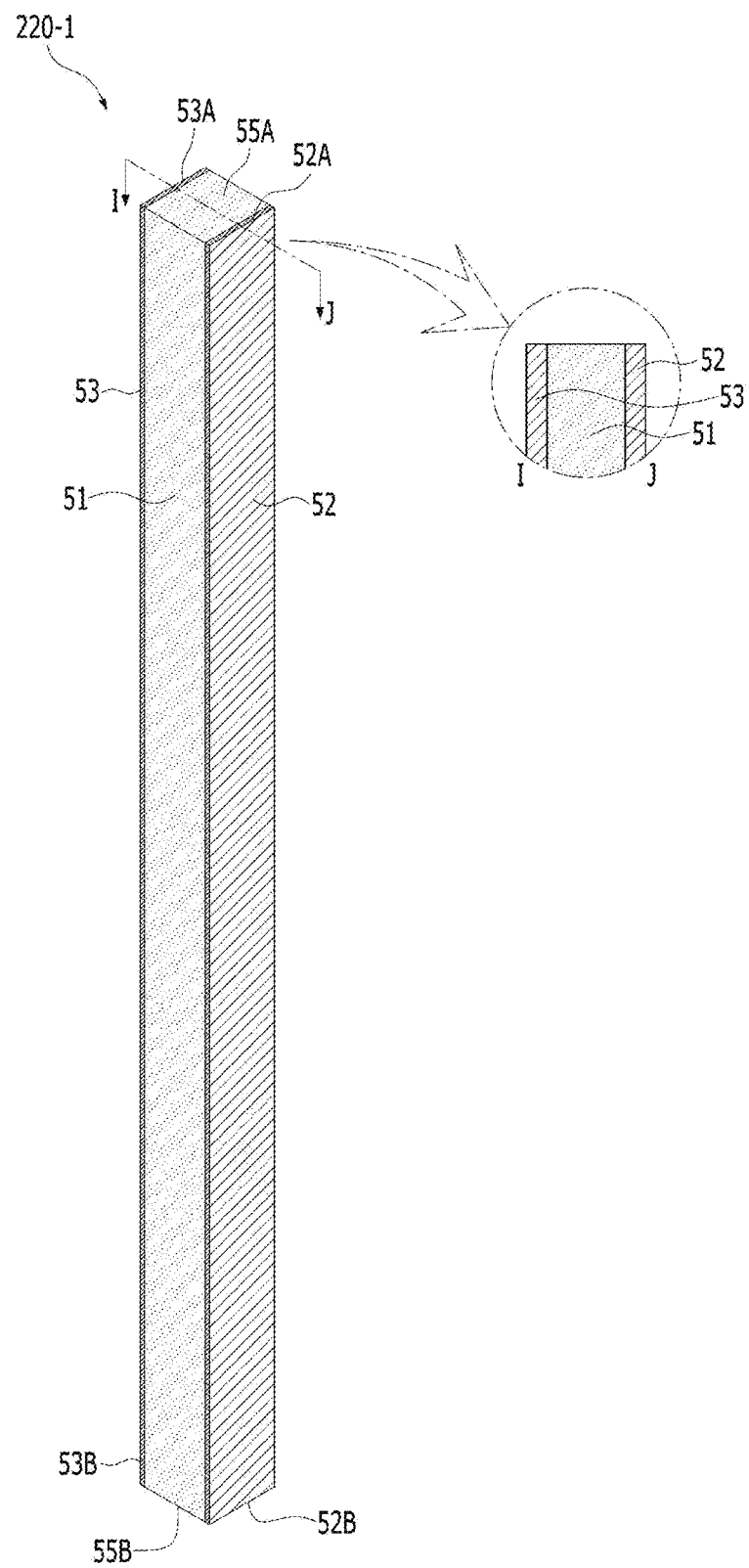
FIG. 13 is an enlarged view of a first polymer actuator.
Figure 14:
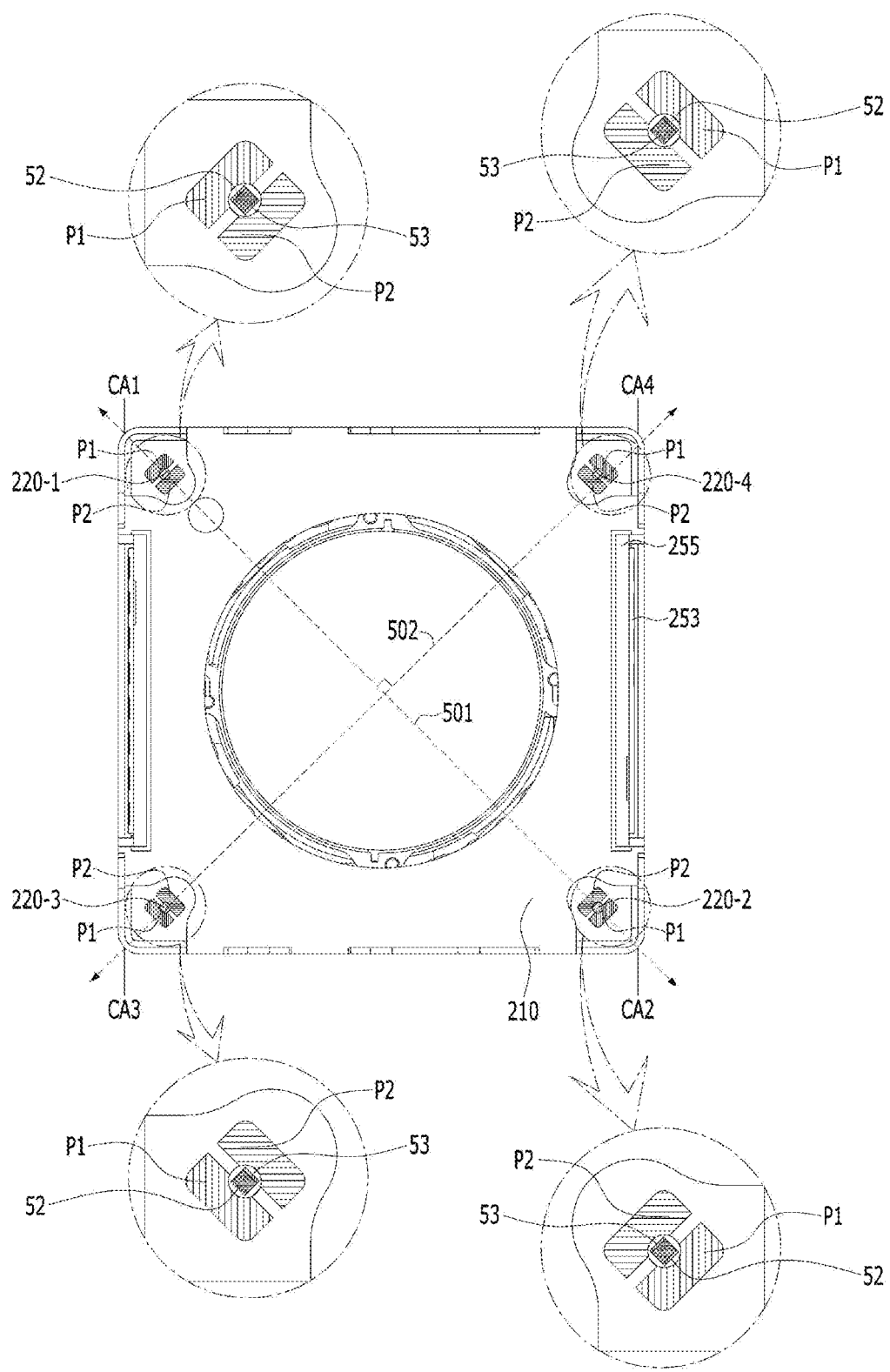
FIG. 14 is a bottom view of the lens moving apparatus.
Figure 15:
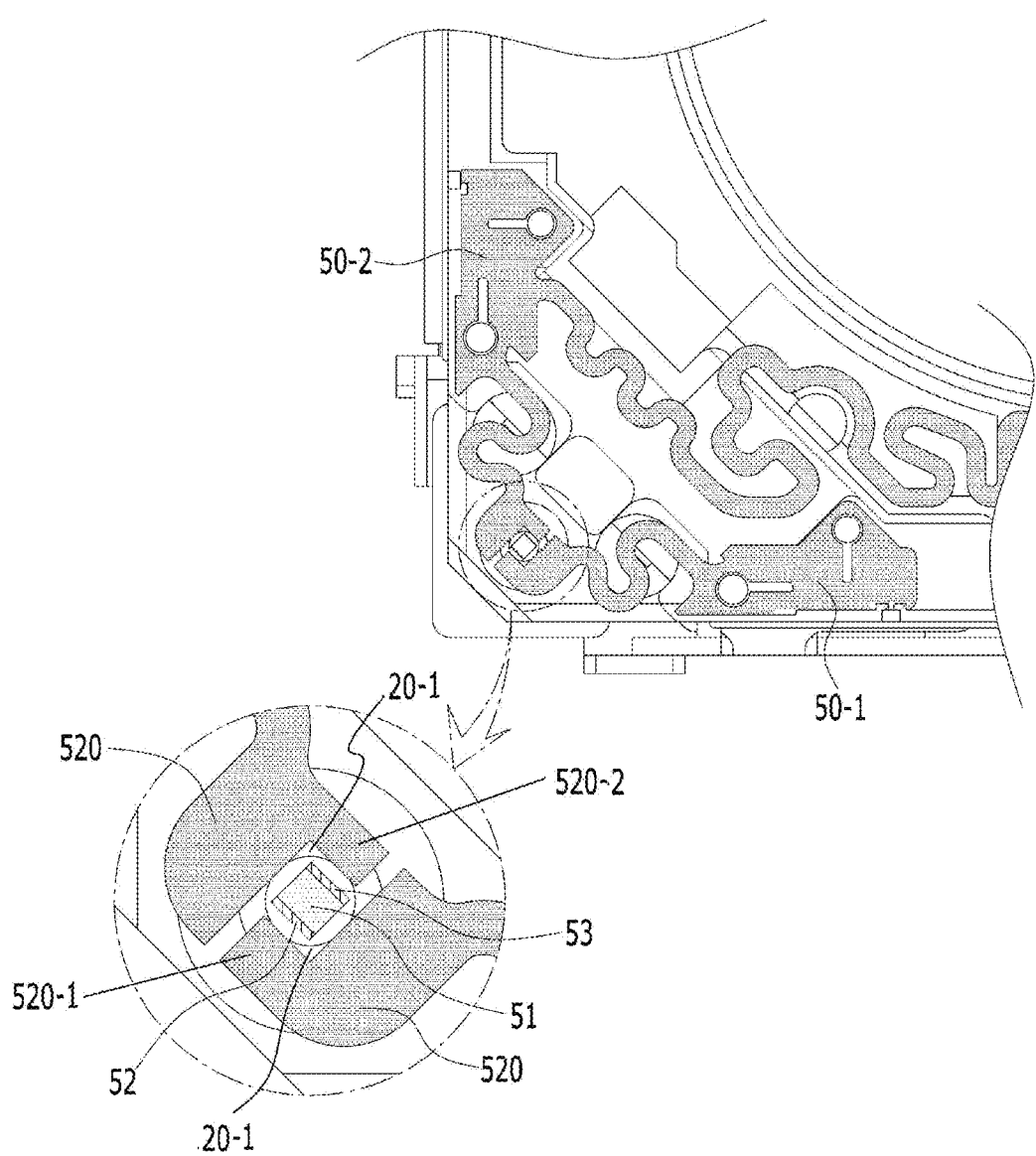
FIG. 15 is a fragmentary enlarged view of the first polymer actuator and first and second upper elastic units.
Figure 16A:
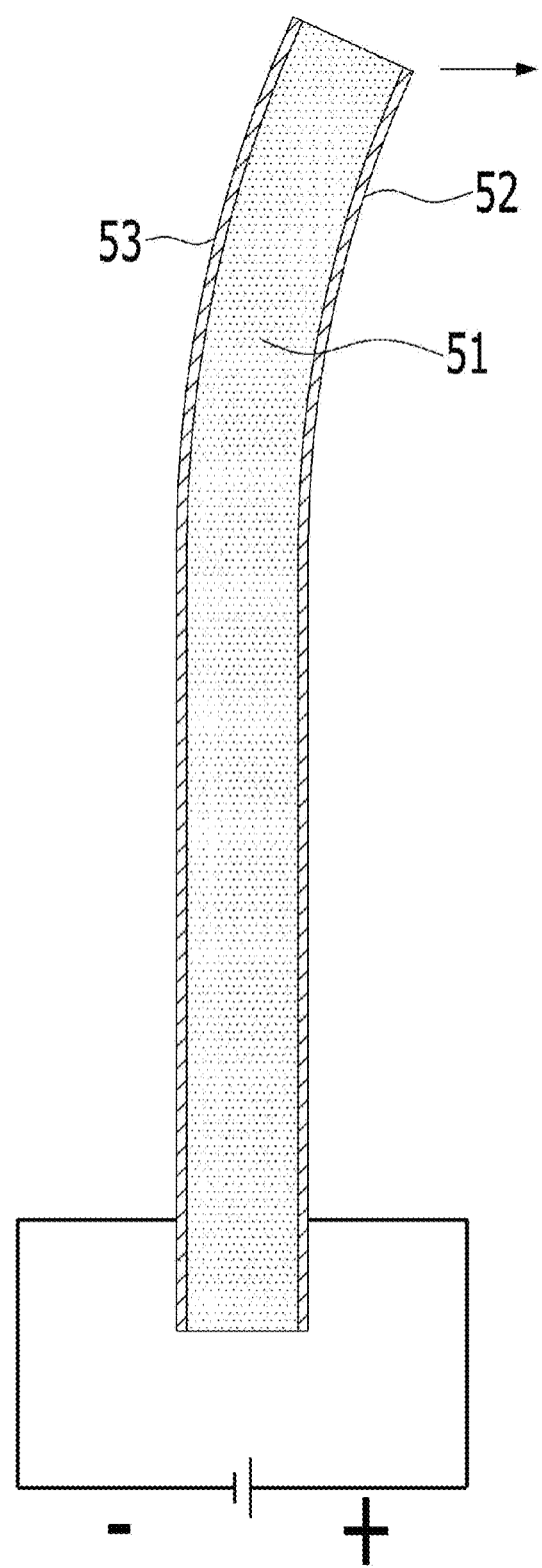
FIGS. 16A to 16C are views explaining operation of the first polymer actuator.
Figure 16B:
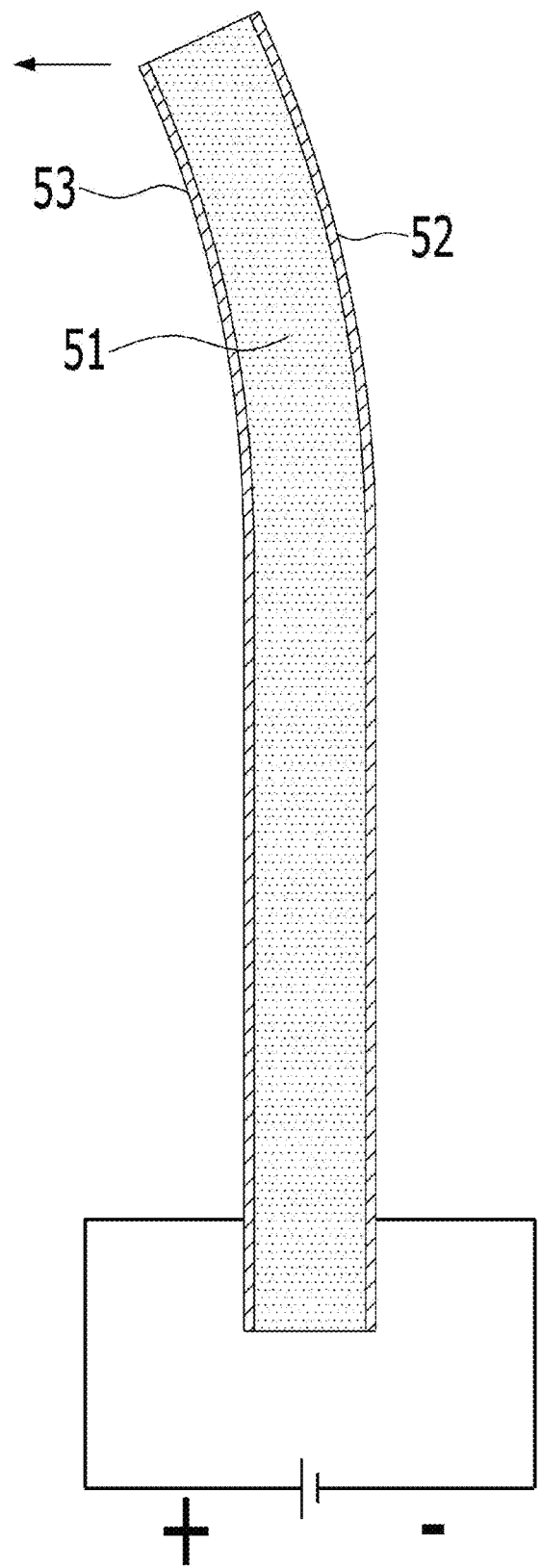
Figure 17:
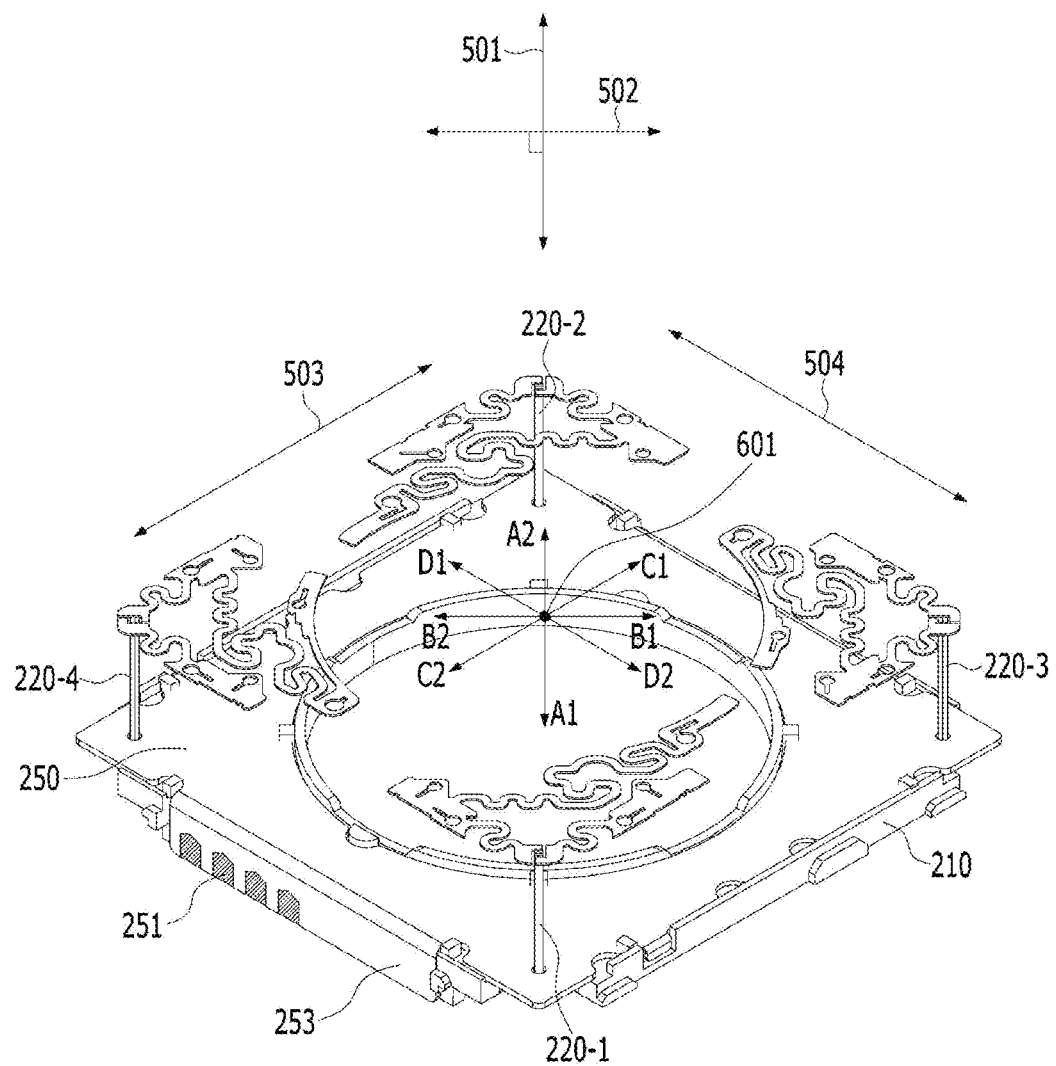
FIG. 17 is view illustrating a direction of movement of an OIS movable unit by operation of polymer actuators.

FIG. 13 is an enlarged view of a first polymer actuator. FIG. 14 is a bottom view of the lens moving apparatus 100. FIG. 15 is a partially enlarged view of the first polymer actuator 220-1 and the first and second upper elastic units 50-1 and 50-2. FIGS. 16A and 16B are views explaining an operation of the first polymer actuator 220-1. FIG. 17 is view illustrating a direction in which the OIS movable unit is moved by operation of the polymer actuators 220-1 to 220-4. A description of the first polymer actuator may be applied to the remaining polymer actuators 220-2 to 220-4 with or without modification.

Referring to FIGS. 13 to 17, the polymer actuator 220-1 may include an electroactive polymer (EPA), which is curved or bent in response to a drive signal, for example, current or voltage.

For example, the electroactive polymer may be an "ionic EAP" which is subjected to contraction-expansion deformation by movement and diffusion of ions. Alternatively, the electroactive polymer may be an electronic EAP which is deformed by an electrical polarization phenomenon of electrical dipoles attributable to application of an electrical field from the outside.

The ionic EAP may include at least one of electrorheological fluid (ERP), a carbon tube (CNT), a conductive polymer (CP), an ionic polymer-metal composite (IPMC), or ionic polymer gels (IPG).

When voltage is applied to an electrode, ions of the ionic electroactive polymer, which are surrounded by solvent, move to an electrode which carries opposite electric charges and thus difference in volume between the two electrodes occurs, thereby causing mechanical bending deformation of the ionic electroactive polymer.

The electronic EAP may include at least one of liquid crystal elastomers (LCE), electro-viscoelastic elastomer, electrostrictive paper, electrostrictive graft elastomers, dielectric elastomers, or ferroelectric polymers.

In the electronic EAP, electronic polarization phenomenon of dipoles occurs by an electrical field applied from the outside and thus mechanical deformation of the polymer is caused by electrostatic attraction of electrical charges gathered to two electrodes.

For example, the polymer actuator 220-1 may include the polymer portion (or a polymer body) 51, the first electrode 52, and the second electrode 53.

Referring to FIG. 13, for example, the first electrode 52 may be disposed on a first surface (or a first outer film) 2A, and the second electrode 53 may be disposed on a second surface (or a second outer film) 2B, which is positioned opposite the first surface 2A.

The first electrode 52 and the second electrode 53 may be disposed opposite each other with the polymer portion 51 interposed therebetween. For example, the first electrode 52 and the second electrode 53 may be positioned opposite each other based on the polymer portion 51.

For example, the first electrode 52 and the second electrode 53 may be disposed so as to face each other in a diagonal direction of the housing 140. In another embodiment, the first electrode 52 and the second electrode 53 may be disposed so as to face each other in a direction parallel to one side portion 141-1 or 141-3 of the housing 140.

Each of the first electrode 52 and the second electrode 53 may be made of conductive metal. For example, each of the first electrode 52 and the second electrode 53 may be made of conductive and elastic metal. Each of the first electrode 52 and the second electrode 53 may be made of a spring material, for example, a copper alloy or steel use stainless (SUS).

For example, the first electrode 52 may be alternatively referred to as a "first conductive elastic body" or a "first conductive elastic member", and the second electrode 53 may be alternatively referred to as a "second conductive elastic body" or a "second conductive elastic member".

Referring to FIGS. 13 and 14, the lower portion (the lower end or the lower surface) 52A of the first electrode 52 may be in contact with or abut the lower portion (the lower end or the lower surface) of the polymer portion 51. The reason for this is to facilitate soldering for conductive connection to a first pad P1 of the circuit board 250. For example, the first electrode 52 may be coupled and conductively connected to the first pad P1 of the circuit board 250 using solder or a conductive adhesive.

Furthermore, the lower portion (the lower end or the lower surface) 53A of the second electrode 53 may be in contact with or abut the lower portion 55B (the lower end or the lower surface) 55B of the polymer portion 51. The reason for this is to facilitate soldering for conductive connection to a second pad P2 of the circuit board 250. For example, the lower portion of the second electrode 53 may be coupled and conductively connected to the second pad P2 of the circuit board 250 using solder or a conductive adhesive.

The upper portion (the upper end or the upper surface) 52B of the first electrode 52 may be in contact with or abut the upper portion (the upper end or the upper surface) of the polymer portion 51. The reason for this is to facilitate soldering for conductive connection to the first upper elastic unit 50-1. For example, the upper portion 52B of the first electrode 52 may be coupled and conductively connected to the first upper elastic unit 50-1 (for example, the second coupler 520) using solder or a conductive adhesive.

The upper portion (the upper end or the upper surface) 53B of the second electrode 53 may be in contact with or abut the upper portion (the upper end or the upper surface) 55A of the polymer portion 51. The reason for this is to facilitate soldering for conductive connection to the second upper elastic unit 50-2. For example, the upper portion 53B of the second electrode 53 may be coupled and conductively connected to the second upper elastic unit 50-2 (for example, the second coupler 520) using solder or a conductive adhesive.

Referring to FIG. 15, the second coupler 520 of one (for example, 50-1) among two upper elastic units 50-1 and 50-2, which are disposed on one corner (for example, 142-1) of the housing 140, may include a first extension 520-1. The first extension 520-1 may be coupled and conductively connected to the first electrode 52 of the polymer actuator (for example, 220-1) disposed on one corner of the housing 140 using a conductive adhesive or solder.

For example, the first extension 520-1 may face the first electrode 52 of the polymer actuator (for example, 220-1) in a diagonal direction (for example, 501).

The second coupler 520 of the other (for example, 50-2) among the two upper elastic units 50-1 and 50-2 disposed on one corner (for example, 142-1) of the housing 140 may include a second extension 520-2.

The second extension 520-2 may be coupled and conductively connected to the second electrode 53 of the polymer actuator (for example, 220-1) disposed on one corner of the housing 140 using a conductive adhesive or solder.

For example, the second extension 520-2 may face the second electrode 53 of the polymer actuator (for example, 220-1) in a diagonal direction (for example, 501).

For example, in order to facilitate soldering or conductive connection, the first and second electrodes 52 and 53 of the polymer actuator (for example, 220-1) may be positioned between the first extension 520-1 and the second extension 520-2.

For example, the first and second extensions 520-1 and 520-2 may be disposed so as to surround one end of the polymer actuator (for example, 220-1). For example, the first and second extensions 520-1 and 520-2 may be disposed around one end (for example, a first end of each of the first and second electrodes 52 and 53) of the polymer actuator (for example, 220-1) so as to surround the first and second electrodes 52 and 53 of the polymer actuator (for example, 220-1).

For example, the description, which has been given with reference to FIG. 15, may be applied to the connection relationships between the first and second extensions of two upper elastic units 50-3 and 50-4 disposed on the second corner portion 142-2 of the housing 140 with or without modification.

Furthermore, the description, which has been given with reference to FIG. 15, may also be applied to the connection relationships between the first and second extensions of two upper elastic units 50-3 and 50-4 or 50-7 and 50-8 disposed on the third or fourth corner portion 142-3 or 142-4 of the housing 140 with or without modification. Here, the direction in which the extensions face the electrodes of the polymer actuator may be a second diagonal direction 502.

For example, the first electrode 52 may be positioned farther than the second electrode 53 from the center 601 (see FIG. 17) or the optical axis OA. For example, the center 601 may be the center of the OIS movable unit. For example, the center 601 may be the center of the housing 140 or the bobbin 110. Alternatively, for example, the center 601 may be the spatial center of the polymer actuators 220-1 to 220-4, or may be the point which is spaced apart from all of the polymer actuators 220-1 to 220-4 by the same distance. Alternatively, for example, the center 601 may be the center of the bore 301 in the housing 140 or the bore 110a in the bobbin 110.

For example, the distance between the optical axis OA and the first electrode 52 may be greater than the distance between the optical axis OA and the second electrode 53.

Referring to FIG. 16A, a drive signal (for example, drive voltage) may be supplied to the first electrode 52 and the second electrode 53. For example, when a positive (+) voltage is applied to the first electrode 52 while a negative (−) voltage is applied to the second electrode 53, the first polymer actuator 220-1 may be deformed such that the length of the first electrode 52 decreases while the length of the second electrode 53 increases.

Referring to FIG. 16B, for example, when a negative (−) voltage is applied to the first electrode 52 while a positive (+) voltage is applied to the second electrode 53, the first polymer actuator 220-1 may be deformed such that the length of the first electrode 52 increases while the length of the second electrode 53 decreases.

Figure 16C:
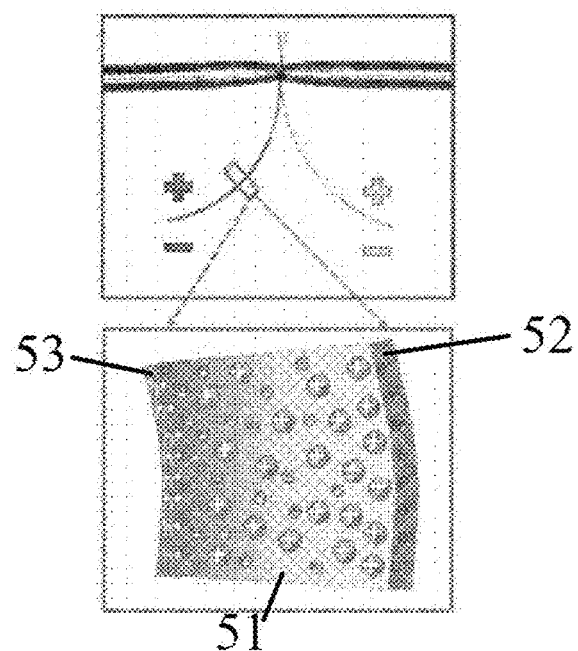

Referring to FIG. 16C, owing to electronic polarization of electrical dipoles attributable to an electric field caused by a drive signal (for example, a drive voltage) supplied to the first electrode 52 and the second electrode 52, ions, which are surrounded by solvent molecules included in the polymer portion 51, move to an electrode which carries the opposite electric charges, whereby relative difference in volume occurs in the polymer portion 51, thereby causing bending deformation.

Because the upper portion of the first polymer actuator 220-1 is coupled to the upper elastic member 150 coupled to the OIS movable unit and the lower portion of the first polymer actuator 220-1 is coupled to the pads P1 and P2 of the circuit board 250, the upper portion of the first polymer actuator 220-1 may be bent and moved in response to the drive signal, as illustrated in FIGS. 16A and 16B.

For example, the upper portion of the first polymer actuator 220-1 may be bent and moved in a direction (hereinafter, referred to as a "bending direction") from one electrode among the first and second electrodes 52 and 53 to which a negative (−) voltage is applied toward the other electrode to which a positive (+) voltage is applied, whereby the OIS operation unit may also be moved in the "bending direction".

The bending direction of the polymer actuator 220-1 may be determined by disposition of the first and second electrodes 52 and 53. For example, the bending direction may be a direction in which the first and second electrodes 52 and 53 face each other. For example, the bending direction may be a direction toward the second electrode 53 from the first electrode 52 and/or a direction toward the first electrode 52 from the second electrode 53.

Each of the polymer actuators 220-1 to 220-4 may correspond to two upper elastic units among the upper elastic units 50-1 to 50-8. For example, two upper elastic units may be disposed on each of the corner portions of the housing 140, and each of the polymer actuators may be coupled to two upper elastic units disposed on a corresponding one of the corner portions 142-1 to 142-4 of the housing 140.

For example, the first polymer actuator 220-1 may be coupled to the first and second upper elastic units 50-1 and 50-2. The second polymer actuator 220-2 may be coupled to the third and fourth upper elastic units 50-3 and 50-4. The third polymer actuator 220-3 may be coupled to the fifth and sixth upper elastic units 50-5 and 50-6. The fourth polymer actuator 220-4 may be coupled to the seventh and eighth upper elastic units 50-7 and 50-8.

For example, the polymer actuators 220-1 to 220-4 may be spaced apart from the housing 140, rather than being fixed to the housing 140. One end of each of the polymer actuators 220-1 to 220-4 may be directly connected or coupled to the second coupler 520 of the upper elastic member 150, and the other end of each of the polymer actuators 220-1 to 220-4 may be directly connected or coupled to the stationary unit, for example, the circuit board 250.

For example, although at least some of the polymer actuators 220 may extend through the holes 147 formed in the corner portions 142-1 to 142-4 of the housing 140, the disclosure is not limited thereto. In another embodiment, the polymer actuators may be disposed adjacent to the boundary line between the side portions 141-1 to 141-4 and the corner portions 142-1 to 142-4 of the housing 140, and may not extend through the corner portions 142-1 to 142-4 of the housing 140.

By means of solder or a conductive adhesive, one end of the coil 120 may be coupled and conductively connected to the first upper elastic unit 50-1. Furthermore, by means of solder or a conductive adhesive, the other end of the coil 120 may be coupled and conductively connected to the second upper elastic unit 50-2.

The coil 120 may be conductively connected to the circuit board 250 via the first and second electrodes 52 and 53 of one polymer actuator (for example, 220-1) connected to the first and second upper elastic units 50-1 and 50-2, and a drive signal or power may be supplied to the coil 120 from the circuit board 250 via the first and second electrodes 52 and 53.

For example, a first drive signal for bending deformation of the first polymer actuator 220-1 and a second drive signal for driving the coil 120 may be simultaneously supplied to the first polymer actuator 220-1.

For example, the first drive signal may include at least one of a DC signal or an AC signal, and the second drive signal may include at least one of a DC signal or an AC signal. Here, although the AC signal may be a PWM signal, the disclosure is not limited thereto. The AC signal may be a sine wave.

For example, each of the first drive signal and the second drive signal may be of a voltage type or a current type. For example, the first drive signal and the second drive signal may be supplied in time division.

In order to space the magnet 130 apart from the circuit board 250, the other end of the polymer actuator 220 may be coupled to the stationary unit (for example, the circuit board 250 and the base 210) at a level lower than the lower surface 11c of the magnet 130. For example, the other end of the polymer actuator 220 may be coupled to the lower surface of the circuit board 250 or the pads P1 and P2 disposed on the lower surface of the circuit board 250.

Although two upper elastic units, which are to be coupled to the first and second electrodes 52 and 53 of each of the first to fourth polymer actuators 200-1 to 200-4, are disposed on each of the corner portions of the housing 140 in the embodiment, the disclosure is not limited thereto.

In order to supply a second drive signal to the coil 120 via the first polymer actuator 220-1, there is need for conductive connection between the first and second electrodes of the first polymer actuator 220-1 and two upper elastic units but there is no need to provide conductive connection between the second to fourth polymer actuators 220-2 to 220-4 and the upper elastic units. Accordingly, one upper elastic unit may be disposed on each of the corner portions of the housing 140 in another embodiment. For example, two or more of the second to eighth upper elastic members shown in FIG. 5 may be connected to each other in another embodiment. In the polymer actuator which does not need to be conductively connected to the upper elastic unit, the first and second electrodes may not be formed up to the upper portion 55A of the polymer portion 51, unlike the embodiment shown in FIG. 13. In this case, for example, the upper ends of the first and second electrodes may be positioned lower than the upper portion 55A of the polymer portion 51. For example, the first and second electrodes of the polymer actuator which does not need to be conductively connected to the upper elastic unit may not be conductively connected to the upper elastic member.

Although the coil 120 is conductively connected to the circuit board 250 via the first polymer actuator 220-1 in the embodiment shown in FIG. 1, the disclosure is not limited thereto.

In the lens moving apparatus according to another embodiment, for example, the first to fourth polymer actuators 220-1 to 220-4 may not be conductively connected to the upper elastic member 150.

In the lens moving apparatus according to another embodiment, for example, the polymer actuators 220-1 to 220-4 may not be coupled to the upper elastic member 150 but one end of each of the polymer actuators 220-1 to 220-4 may be coupled or fixed to the housing 140 (for example, a corresponding one of the corner portions of the housing 140). In the lens moving apparatus according to another embodiment, for example, one end of the polymer actuator 220 may be coupled to the upper elastic member 150 but the first electrode 52 and the second electrode 53 of the polymer actuator 220 may be spaced apart from or conductively separated from the upper elastic member 150.

In the lens moving apparatus according to another embodiment, for example, the upper elastic member may include one upper elastic unit coupled to the plurality of polymer actuators 220-1 to 220-4 or may include a plurality of upper elastic units which are respectively coupled to the plurality of polymer actuators.

The lens moving apparatus according to another embodiment in which the polymer actuator is not conductively connected to the upper elastic member may include two upper elastic units conductively connected to the coil 120, and two additional wires coupled to the two upper elastic units. The two wires may be conductive wires, and may conductively connect the two upper elastic units to the circuit board 250.

In order to absorb or attenuate vibration of the bobbin 110, the lens moving apparatus 100 may further include a damper (not shown) disposed between each of the upper elastic units 50-1 to 50-8 and the bobbin 110 (or the housing 140). For example, a first damper (not shown) may be disposed in the space between the first frame connector 153 of each of the upper elastic units 50-1 to 50-8 and the bobbin 110. For example, the lens moving apparatus 100 may further include a second damper (not shown) disposed between the second frame connector 163 of the lower elastic member 160 and the bobbin 110 (or the housing 140).

For example, the lens moving apparatus 100 may further include a third damper (not shown) disposed on and the second coupler 520 and one end of the polymer actuator 220, and a fourth damper (not shown) disposed on the other end of the polymer actuator 220 and the circuit board 250.

Next, the base 210 and the circuit board 250 will be described.

Referring to FIG. 8, the base 210 may be disposed below the bobbin 110 (and/or the housing 140). For example, the base 210 may be disposed below the circuit board 250.

The base 210 may have a bore 201 which corresponds to the bore 110a in the bobbin 110 and/or the bore 301 in the housing 140. The base 210 may have a shape corresponding to or coinciding with that of the cover member 300, for example, a polygonal shape (for example, a square shape). For example, the bore 201 in the base 210 may be a through hole, which is formed through the base 210 in the optical-axis direction.

The base 210 may include a step 211, to which an adhesive is applied when the cover member 300 is secured to the base 210 via adhesion. For example, the step 211 may be formed on the outer lateral surface of the base 210. Here, the step 211 may guide the side plate of the cover member 300, which is coupled to the upper side of the base, and the lower end of the side plate 302 of the cover member 300 may be in contact with the step 211. The step 211 of the base 210 may be bonded or fixed to the lower end of the side plate 302 of the cover member 300 via an adhesive or the like.

The region of the base 210 that faces the terminal member 253 of the circuit board 250 may be provided with a support 255. The support 255 of the base 210 may support the terminal member 253 of the circuit board 250. For example, the support 255 may be formed on at least one outer lateral surface of the base 210. For example, although a portion of the support 255 may be depressed from the outer lateral surface of the base 210, the disclosure is not limited thereto. Furthermore, although the lower portion or the lower end of the support 255 may project downwards based on the lower surface of the base 210, the disclosure is not limited thereto. In another embodiment, the lower portion or the lower end of the support 255 may not project.

The base 210 may have a depressed groove 212 formed in the corner thereof in order to avoid spatial interference with the other end of each of the polymer actuators 220-1 to 220-4 coupled to the circuit board 250. The depressed groove 212 may be formed so as to correspond to the corner of the cover member 300.

Furthermore, the base 210 may be provided on the upper surface thereof around the bore 201 with a projection 19 to be coupled in the bore 205 in the circuit board 250. For example, the lower surface of the base 210 may be provided with a seating portion (not shown) to which the filter 610 of the camera module 200 is mounted.

The base 210 may include a first seating groove 215-1 in which the first position sensor 170 is disposed, seated or received, a second seating groove 215-2 in which a first sensor 240a of the second position sensor 240 is disposed, seated or received, and a third seating groove 215-3 in which a second sensor 240b of the second position sensor 240 is disposed, seated or received. The first to third seating grooves 215-1 to 215-3 may be depressed from the upper surface of the base 210.

The first position sensor 170 and the second position sensor 240 may be disposed below the circuit board 250. For example, the first position sensor 170 and the second position sensor 240 may be disposed between the lower surface of the circuit board 250 and the upper surface of the base 210.

For example, the first position sensor 170 and the second position sensor 240 may be disposed, mounted or coupled to the lower surface of the circuit board 250.

In another embodiment, the first position sensor may be disposed or coupled to the housing.

In a further embodiment, the sensing magnet may be disposed or coupled to the housing, and the first position sensor may be disposed or coupled to the bobbin 110.

The circuit board 250 may be disposed on the upper surface of the base, and may have the bore 205 which corresponds to the bore 110a in the bobbin 110, the bore 301 in the housing 140 and/or the bore 201 in the base 210. The bore 205 in the circuit board 250 may be a through hole. The circuit board 250 may have a shape which coincides with or corresponds to the upper surface of the base 210, for example, a quadrilateral shape.

The circuit board 250 may include a body 252, which is disposed on the upper surface of the base 210, and at least one terminal member 253, which is bent at a side of the body 252 and receives electrical signals from the outside. For example, although the circuit board 250 may include two terminal members, which are bent at two sides among the sides of the upper surface of the body 252, which are opposed to each other, the disclosure is not limited thereto.

Although the circuit board 250 may be an FPCB (Flexible Printed Circuit Board), the disclosure is not limited thereto. In another embodiment, the terminals of the circuit board 250 may be directly formed on the surface of the base 210 through surface electrode technology or the like.

The circuit board 250 may have a hole 250a, through which at least a portion of each of the polymer actuators 220-1 to 220-4 extends, in order to avoid spatial interference with the polymer actuators 220-1 to 220-4. In another embodiment, the circuit board 250 may have an escape groove formed in each of the corners, in place of the hole 250a.

For example, although the polymer actuators 220-1 to 220-4 may be conductively connected to the pads P1 and P2, disposed on the lower surface of the circuit board 250, through the holes 250a in the circuit board 250 using solder or the like, the disclosure is not limited thereto.

In another embodiment, the circuit board 250 may not have the hole, and the polymer actuators 220-1 to 220-4 may be conductively connected to the pads formed on the upper surface of the circuit board 250 via solder or the like.

In a further embodiment, in place of the pads P1 and P2, additional terminals corresponding to the electrodes of the polymer actuators 220-1 to 220-4 may be disposed on or coupled to the base 210. Each of the two electrodes of each of the polymer actuators 220-1 to 220-4 may be coupled and conductively connected to a corresponding one of the terminals disposed on the base 210.

For example, the polymer actuator 220 may include a first horizontal actuator and a second horizontal actuator.

Here, the first horizontal actuator is capable of moving the OIS movable unit in a "first horizontal direction" in response to the drive signal, which is described with reference to FIGS. 16A and 16B, and the second horizontal actuator is capable of move the OIS movable unit in a "second horizontal direction" in response to the drive signal, which is described with reference to FIGS. 16A and 16B.

For example, the bending direction of the polymer actuator 220-1 may be determined depending on a direction in which the first and second electrodes of the polymer actuator 220 face each other.

As illustrated in FIG. 14, the first polymer actuator 220-1 and the second polymer actuator 220-2 may be disposed so as to face each other in the first diagonal direction 501, and the third polymer actuator 220-3 and the second polymer actuator 220-4 may be disposed so as to face each other in the second diagonal direction 502. The first diagonal direction 501 and the second diagonal direction 502 may be perpendicular to each other.

For example, the first diagonal direction may be a direction toward the second corner portion 142-2 (or the first corner portion 142-1) from the first corner portion 142-1 (or the second corner portion 142-2) of the housing 140, and the second diagonal direction 502 may be a direction toward the fourth corner portion 142-4 (or the third corner portion 142-3) from the third corner portion 142-3 (or the fourth corner portion 142-4) of the housing 140.

Alternatively, for example, the first diagonal direction 501 may be a direction toward a second corner CA2 (or a first corner CA1) from the first corner CA1 (or the second corner CA2) of the side plate 302 of the cover member 300, and the second diagonal direction may be a direction toward a fourth corner CA4 (or a third corner CA3) from the third corner CA3 (or the fourth corner CA4) of the side plate 302 of the cover member 300.

For example, the first and second electrodes 52 and 53 of each of the first and second polymer actuators 220-1 and 220-2 may be disposed so as to be opposed to or face each other in the first diagonal direction 501, and the first and second electrodes 52 and 53 of each of the third and fourth polymer actuators 220-3 and 220-4 may be disposed so as to be opposed to or face each other in the second diagonal direction 502.

For example, the bending direction of each of the first and second polymer actuators 220-1 and 220-2 shown in FIG. 14 may be a direction in which the first and second electrodes 52 and 54 of each of the first and second polymer actuators 220-1 and 220-2 face each other or are opposed to each other. For example, the bending direction may be a direction toward the second electrode 53 from the first electrode 52 and/or a direction toward the first electrode 52 from the second electrode 53. Accordingly, the bending direction of each of the first and second polymer actuators 220-1 and 220-2 may be the first diagonal direction 501.

Furthermore, for example, the bending direction of each of the third and fourth polymer actuators 220-3 and 220-4 may be a direction in which the first and second electrodes 52 and 53 of each of the third and fourth polymer actuators 220-3 and 220-4 face each other or are opposed to each other. Accordingly, the bending direction of each of the third and fourth polymer actuators 220-3 and 220-4 shown in FIG. 14 may be the second diagonal direction 502.

The circuit board 250 may include the first pad P1 corresponding to the first electrode 52 of each of the first to fourth polymer actuators 220-1 to 220-4, and the second pad P2 corresponding to the second electrode 53 of each of the first to fourth polymer actuators 220-1 to 220-4. For example, the pads P1 and P2 may be formed so as to be in contact with or abut the hole 250a in the circuit board 250.

The first and second polymer actuators 220-1 and 220-2 may be driven such that the bending directions of the first and second actuators 220-1 and 220-2 are identical to each other, and the third and fourth polymer actuators 220-3 and 220-4 may be driven such that the bending directions of the third and fourth polymer actuators 220-3 and 220-4 are identical to each other. For example, a "first OIS drive signal" (or a "first signal") may be supplied to each of the first and second polymer actuators 220-1 and 220-2, and a "second OIS drive signal" (or a "second signal") may be supplied to each of the third and fourth polymer actuators 220-3 and 220-4. The first OIS drive signal and the second OIS drive signal may be different from each other and may be independent of each other.

For example, the circuit board 250 may include first and second terminals to which the first OIS drive signal is supplied from the outside, and third and fourth terminals to which the second OIS drive signal is supplied. For example, the first pad PA of the circuit board 250, which is conductively connected to the first electrode 52 of each of the first polymer actuator 220-1 and the second polymer actuator 220-1, may be conductively connected to the first terminal of the circuit board 250, and the second pad P2 of the circuit board 250, which is conductively connected to the second electrode 53 of each of the first polymer actuator 220-1 and the second polymer actuator 220-2, may be conductively connected to the second terminal of the circuit board 250.

For example, the first pad P1 of the circuit board 250, which is conductively connected to the first electrode of each of the third polymer actuator 220-3 and the fourth polymer actuator 220-4, may be conductively connected to the third terminal of the circuit board 250, and the second pad P2 of the circuit board 250, which is conductively connected to the second electrode 53 of each of the third polymer actuator 220-3 and the fourth polymer actuator 220-4, may be conductively connected to the fourth terminal of the circuit board 250.

In another embodiment, for example, the "first OIS drive signal" (or the "first signal") may be supplied to the first polymer actuator 220-1, and the "second OIS drive signal" (or the "second signal") may be supplied to the second polymer actuator 220-2. Furthermore, the "third OIS drive signal" (or the "third signal") may be supplied to the third polymer actuator (220-3), and the "fourth OIS drive signal" (or the "fourth signal") may be supplied to the fourth polymer actuator 220-4. The first to fourth OIS drive signals may be different from one another and may be independent of one another.

In another embodiment, the circuit board 250 may include eight terminals, which correspond to the four first pads P1 and the four second pads P2 which correspond to the first to fourth polymer actuators 220-1 to 220-4. Furthermore, the circuit board 250 may include eight terminals, which correspond to the four first pads P1 and the four second pads P2. Four respective OIS drive signals may be supplied to the eight terminals of the circuit board 250, and each of the four OIS drive signals may be supplied to a corresponding one of the first to fourth polymer actuators 220-1 to 220-4 to independently drive the corresponding polymer actuator.

For example, the corner portions or the corner regions of the lower surface of the circuit board 250 may be provided with the two pads P1 and P2 corresponding to the first and second electrodes 52 and 53 of each of the polymer actuators 220-1 to 220-4. By means of solder or a conductive adhesive, each of the two pads P1 and P2 may be coupled or conductively connected to a corresponding one of the two electrodes 52 and 53.

For example, for easy soldering operation, the pads P1 and P2 of the circuit board 250, which correspond to the first and second electrodes 52 and 53 of the first and second polymer actuators 220-1 and 220-2, may be disposed so as to be opposed to each other or may face each other, the pads P1 and P2 of the circuit board 250, which correspond to the first and second electrodes 52 and 53 of the third and fourth polymer actuators 220-3 and 220-4, may be disposed so as to be opposed to each other or may face each other.

In another embodiment, pads or terminals, which correspond to the first and second pads 52 and 53 of each of the polymer actuators 220-1 to 220-4, may be formed on the base 210, and may be coupled or conductively connected thereto using solder or a conductive adhesive. The pads or terminals disposed on the base 210 may be conductively connected to the circuit board 250.

FIG. 18A is a view illustrating an embodiment of a method of performing movement of the OIS movable unit in the first diagonal direction. FIG. 18B is a view illustrating an embodiment of a method of performing movement of the OIS movable unit in the second diagonal direction.

Referring to FIGS. 16A to 18A, when drive signals are supplied to the first and second electrodes 52 and 53 of the first and second polymer actuators 220-1 and 220-2, as shown in FIG. 18A, the OIS movable unit may be moved in the first diagonal direction A1 or A2.

Furthermore, when drive signals are supplied to the first and second electrodes 52 and 53 of the third and fourth polymer actuators 220-3 and 220-4, as shown in FIG. 18B, the OIS movable unit may be moved in the second diagonal direction B1 or B2.

FIG. 19A is a view illustrating an embodiment of a method of performing movement of the OIS movable unit in the first horizontal direction. FIG. 19B is a view illustrating an embodiment of a method of performing movement of the OIS movable unit in the second horizontal direction. FIG. 19B is a view illustrating an embodiment of a method of performing movement of the OIS movable unit in the second horizontal direction.

Referring to FIG. 19A, when drive signals are supplied to the first and second electrodes 52 and 53 of the first to fourth polymer actuators 220-1 to 220-4, as shown in FIG. 19A, the OIS movable unit may be moved in the horizontal direction C1 or C2.

Referring to FIG. 19B, when drive signals are supplied to the first and second electrodes 52 and 53 of the first to fourth polymer actuators 220-1 to 220-4, as shown in FIG. 19B, the OIS movable unit may be moved in the second horizontal direction D1 or D2.

For example, the first horizontal direction may be a direction toward the third corner portion 142-3 (or the first corner portion 142-1) from the first corner portion 142-1 (or the third corner portion 142-3) of the housing 140. Alternatively, for example, the first horizontal direction may be a direction toward the third polymer actuator 220-3 (or the first polymer actuator 220-1) from the first polymer actuator 220-1 (or the third polymer actuator 220-3).

For example, the second horizontal direction may be a direction toward the fourth corner portion 142-4 (or the first corner portion 142-1) from the first corner portion 142-1 (or the fourth corner portion 142-4) of the housing 140. Alternatively, for example, the second horizontal direction may be a direction toward the fourth polymer actuator 220-4 (or the first polymer actuator 220-1) from the first polymer actuator 220-1 (or the fourth polymer actuator 220-4). For example, the second horizontal direction may be a direction perpendicular to the first horizontal direction. For example, the first direction may be the x-axis direction, and the second direction may be the y-axis direction.

The circuit board 250 may supply drive signals for driving the first to fourth polymer actuators 220-1 to 220-4. The drive signals supplied to the first to fourth polymer actuators 220-1 to 220-4 may be DC signals or AC signals, may include DC signals and AC signals, and may be of current type or voltage type.

In another embodiment, at least one of the first position sensor 170 and the first and second sensors 240a and 240b may be disposed on the upper surface of the circuit board 250.

Each of the first position sensor 170 and the first and second sensors 240a and 240b may be conductively connected to the circuit board 250. For example, each of the first position sensor 170 and the first and second sensors 240a and 240b may be conductively connected to the terminals 251 of the circuit board 250.

The first position sensor 170 may be an "AF position sensor", and the second position sensor 240 may be an "OIS position sensor". The second position sensor 240 may include the first sensor 240a and the second sensor 240b.

By virtue of the electromagnetic force resulting from the interaction between the coil 120 and the magnet 130, the AF operation unit (for example, the bobbin 110 and the sensing magnet 180) may be moved in the optical-axis direction, and the first position sensor 170 may detect the intensity of the magnetic field or the magnetic force of the sensing magnet 180, which is moved in the optical-axis direction, and may output an output signal corresponding to the result of detection.

For example, in accordance with displacement of the bobbin 110 in the optical-axis direction, the intensity or magnetic force of the magnetic field detected by the first position sensor 170 may vary. Consequently, the first position sensor 170 may output an output signal proportional to the detected intensity of the magnetic field, and the displacement of the bobbin 110 in the optical-axis direction may be detected using the output signal from the first position sensor 170.

As a result of the bending deformation of the first to fourth polymer actuators 220-1 to 220-4, the OIS operation unit (for example, the housing 140 and the magnet 130) may be moved in a direction perpendicular to the optical-axis direction, and each of the first and second sensors 240a and 240b may detect the intensity of the magnetic field of the magnet 130, which is moved in a direction perpendicular to the optical-axis direction, and may output the output signal corresponding to the result of detection.

At least one of the first position sensor 170 and the first and second sensor 240a and 240b may be embodied as a Hall sensor alone.

Alternatively, at least one of the first position sensor 170 and the first and second sensors 240a and 240b may be embodied as a driver IC (integrated circuit) including a Hall sensor.

In an embodiment in which at least one of the first position sensor 170 and the first and second sensor 240a and 240b may be embodied as a Hall sensor alone, the Hall sensor 170, 240a or 240b may include two input terminals and two output terminals. The two input terminals of the Hall sensor may be conductively connected to two terminals of the circuit board 250, thereby providing a drive signal. Furthermore, the two output terminals of the Hall sensor may be conductively connected to two other terminals of the circuit board 250, thereby outputting the output signal of the Hall sensor.

In an embodiment in which at least one of the first position sensor 170 and the first and second sensor 240a and 240b may be embodied as a driver IC including a Hall sensor, a drive signal may be directly supplied to the coil 120 from the first position sensor 170. For example, the first position sensor 170 may be conductively connected to the first and second upper elastic members 150-1 and 15-2 via two polymer actuators (for example, 220-1 and 220-3), and may directly provide the coil 120 with a drive signal.

Furthermore, in the embodiment in which at least one of the first position sensor 170 and the first and second sensors 240a and 240b is embodied as a driver IC including a Hall sensor, a drive signal may be directly supplied to the first and second polymer actuators 220-1 and 220-2 from the first sensor 240a, and a drive signal may be directly supplied to the third and fourth polymer actuators 220-3 and 220-4 from the second sensor 240b.

Furthermore, in the embodiment in which at least one of the first position sensor 170 and the first and second sensors 240a and 240b is embodied as a driver IC including a Hall sensor, signals for data communication with the driver IC via the terminals of the circuit board 250 may be transmitted and received. The signals for data communication may include a clock signal, a data signal, and a power signal.

The cover member 300 may accommodate the bobbin 110, the coil 120, the magnet 130, the housing 140, the upper elastic member 150, the lower elastic member 160, the first position sensor 170, the sensing magnet 180, the polymer actuator 220, the second position sensor 240, and the circuit board 150 in the space defined between the cover member 300 and the base 210.

The cover member 300 may be configured to have a box shape, which is open at the lower face thereof and includes the upper plate 301 and the side plates 302. The lower portion of the cover member 300 may be coupled to the upper portion of the base 210. The upper plate 301 of the cover member 300 may have a polygonal shape, for example, a square shape, an octagonal shape, or the like.

The cover member 300 may have a bore, which exposes a lens (not shown) coupled to the bobbin 110 to external light. Although the cover member 300 may be made of made of a nonmagnetic material such as stainless steel so as to inhibit a phenomenon in which the cover member 300 is attracted to the first magnet 130, the disclosure is not limited thereto. The cover member 300 may also be made of a magnetic material so as to serve as a yoke for increasing the electromagnetic force between the coil 120 and the magnet 130.

Referring to FIG. 12, at the initial position of the OIS operation unit, the first sensor 170 may overlap the sensing magnet 180 in the optical-axis direction. Although the first position sensor 170 may not overlap the dummy member 135 in the optical-axis direction, the disclosure is not limited thereto. In another embodiment, at least a portion of the first position sensor 170 may overlap the dummy member 135 in the optical-axis direction.

Here, the initial position of the OIS operation unit may be the initial position of the OIS operation unit which is supported by the polymer actuator 220 and the upper and lower elastic members 150 and 160 in the state in which a drive signal is not provided to the polymer actuator 220. Furthermore, the initial position of the OIS operation unit may be the position of the OIS operation unit when gravity acts toward the base 210 from the bobbin 110 or when gravity acts toward the bobbin 110 from the base 210.

The first sensor 240a may overlap the first magnet unit 130-1 in the optical-axis direction, and the second sensor 240b may overlap the third magnet unit 130-3 in the optical-axis direction.

Although the first cross-sectional area of the sensing magnet 180 in a direction perpendicular to the optical-axis direction may be larger than the second cross-sectional area of the first position sensor 170 in a direction perpendicular to the optical-axis direction, the disclosure is not limited thereto. In another embodiment, the first cross-sectional area may be equal to or larger than the second cross-sectional area.

Figure 20:
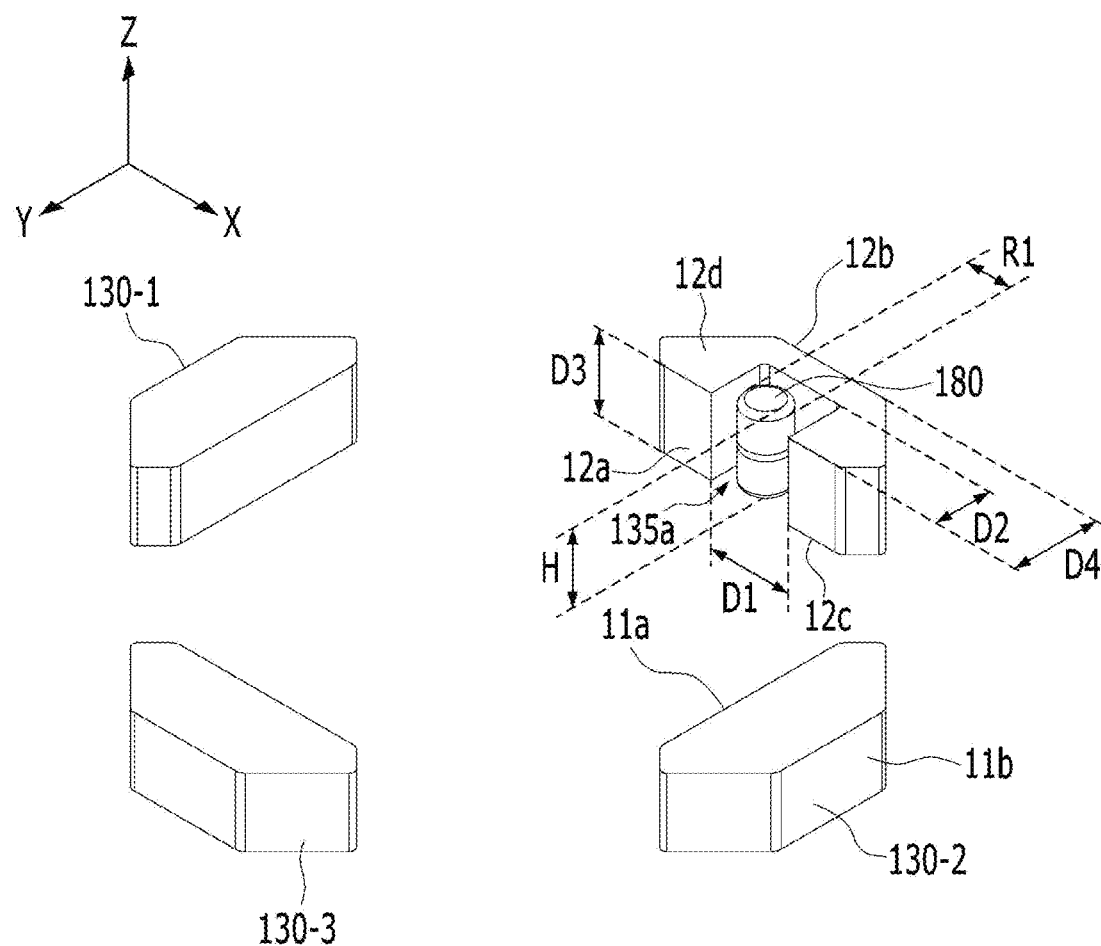
FIG. 20 is a view illustrating disposition of first to third magnet units, the dummy member, and the sensing magnet.
Figure 21:
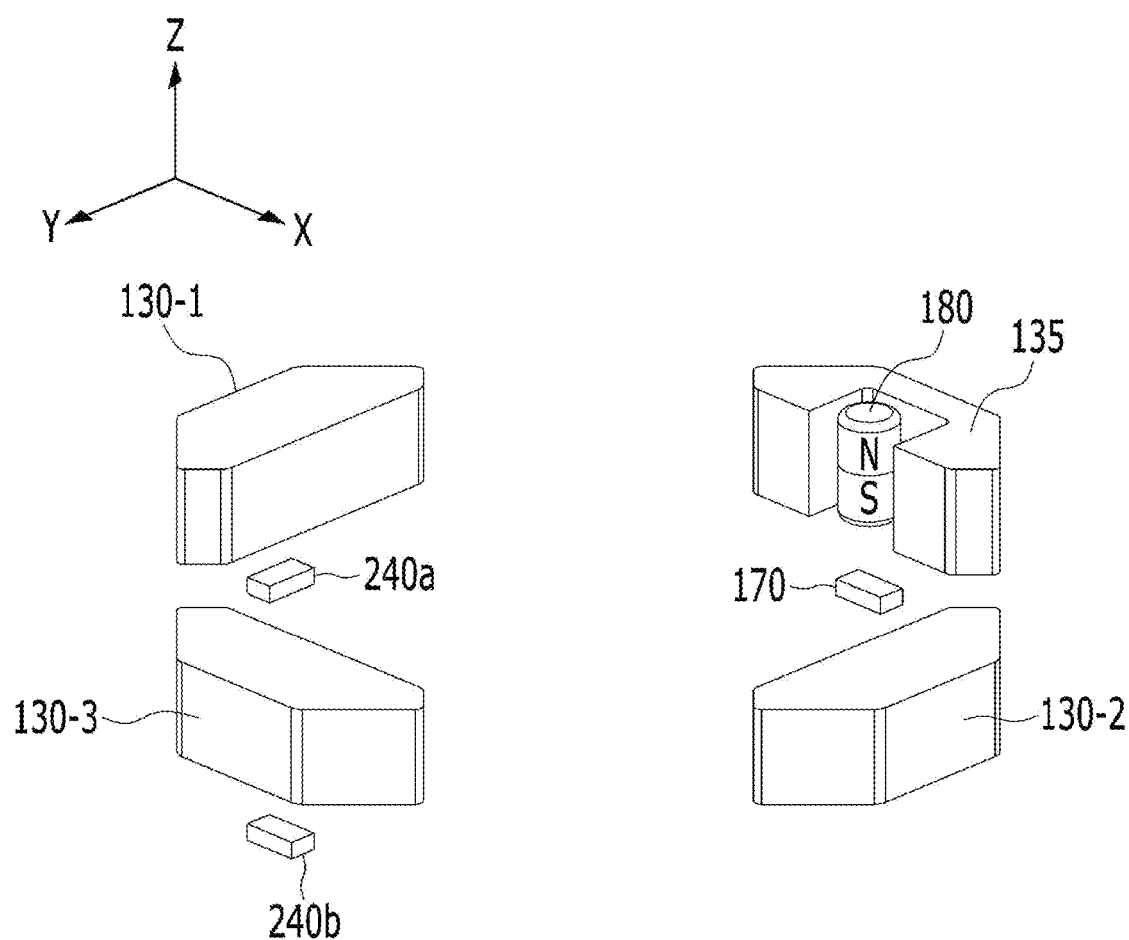
FIG. 21 is a view illustrating disposition of the first to third magnet units, the dummy member, the sensing magnet, a first position sensor, a first sensor, and a second sensor.

FIG. 20 illustrates disposition of the first to third magnet units 130-1 to 130-3, the dummy member 135, and the sensing magnet 180. FIG. 21 illustrates disposition of the first to third magnet units 130-1 to 130-3, the dummy member 135, the sensing magnet 180, the first position sensor 170, the first sensor 240a, and the second sensor 240b.

Referring to FIGS. 20 and 21, the groove 135a in the dummy member 135 may be formed in the first surface 12a of the dummy member 135. For example, the groove 135a may be formed in the central area of the first surface 12a of the dummy member 135. For example, the dummy member 135 may be bilaterally symmetrical based on the groove 135a.

The crosswise length D1 of the groove 135a may be greater than the crosswise length or the diameter R1 of the sensing magnet 180 (D1>R1). The orthogonal length or the diameter R1 of the sensing magnet 180 may be less than the distance between the first surface 12a and the second surface 12b or the length D4 of the dummy member 135 (R1<D4). The orthogonal length D2 of the groove 135a may be less than the length D4 between the first surface 12a and the second surface 12b of the dummy member 135 (D2<D4). For example, the length D2 may be the distance between the first surface 12a of the dummy member 135 and the bottom surface of the groove 135a. For example, in FIG. 20, the crosswise direction may be a direction parallel to the first surface 12a of the dummy member 135, and the orthogonal direction may be a direction perpendicular to the crosswise direction.

In another embodiment, for example, at least one of the first opening formed at the lower surface 12c of the dummy member 135 and the second opening formed at the upper surface 12d of the dummy member 135 may be omitted.

For example, the length H of the sensing magnet 180 in the optical-axis direction may be less than or equal to the length D3 of the dummy member 135 in the optical-axis direction (H≤D3). Alternatively, for example, the length H of the sensing magnet 180 in the optical-axis direction may be less than or equal to the length of the groove 135a in the dummy member 135 in the optical-axis direction.

In another embodiment, the length H of the sensing magnet 180 in the optical-axis direction may be greater than the length D3 of the dummy member 135 in the optical-axis direction and/or the length of the groove 135a in the dummy member 135 in the optical-axis direction. Alternatively, in another embodiment, for example, a portion of the sensing magnet 180 may project downwards from the lower surface 12c of the dummy member 135. Alternatively, another portion of the sensing magnet 180 may project upwards from the upper surface 12d of the dummy member 135.

Referring to FIG. 21, for example, the first position sensor 170 may be disposed below the sensing magnet 180, the first sensor 240a may be disposed below the first magnet unit 130-1, and the second sensor 240b may be disposed below the third magnet unit 130-3.

Figure 22:
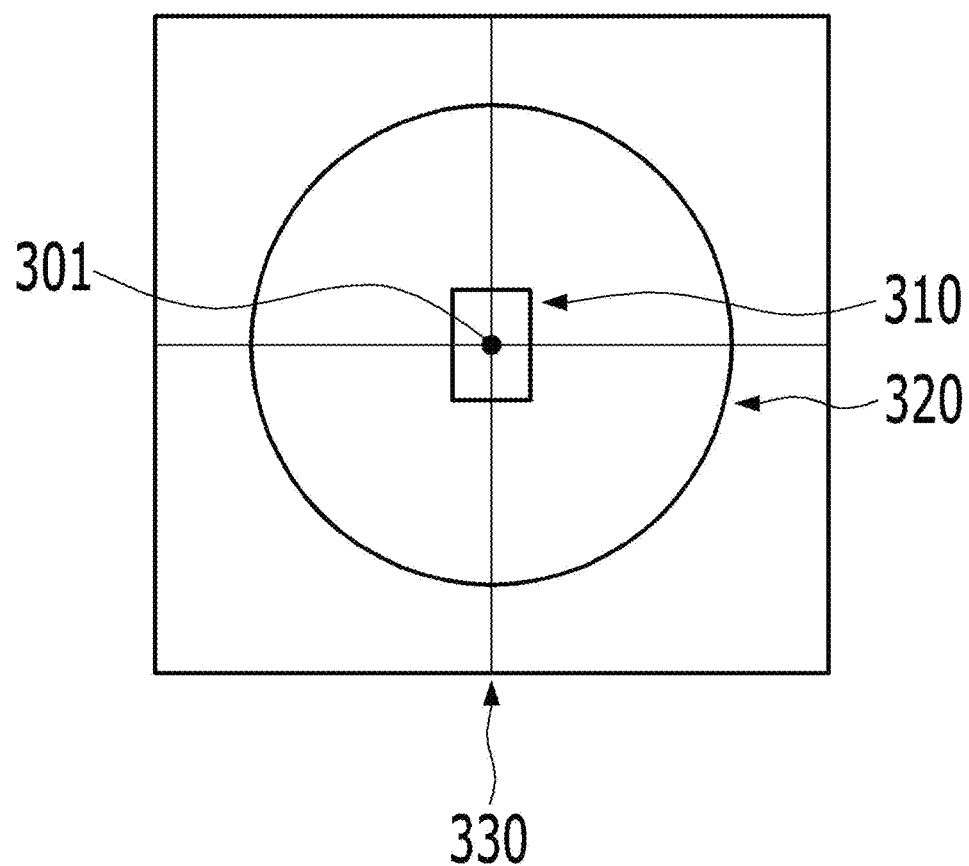
FIG. 22 is a view explaining the relationships among stroke range of the OIS operation unit in a direction perpendicular to the optical-axis direction, the size of the sensing magnet, and disposition of the first position sensor.

FIG. 22 is a view explaining relationships among stroke range of the OIS operation unit in a direction perpendicular to the optical-axis direction, the size of the sensing magnet 180, and disposition of the first position sensor 170. Reference numeral "310" denotes a sensing element or a sensing range of the first position sensor 170 configured to detect the intensity of the magnetic field of the sensing magnet 180. Reference numeral "320" denotes the stroke range of the OIS operation unit. Reference numeral "330" denotes an area in which the sensing magnet 180 is disposed. Although the range in which the sensing magnet 180 is disposed is shown as having a square shape in FIG. 22, the disclosure is not limited thereto. The range may be represented as a circular shape, a polygonal shape, an elliptical shape, or the like depending on the shape of the sensing magnet.

Referring to FIG. 22, in order to improve the sensitivity of the first position sensor 170, the sensing element 310 of the first position sensor 170 may overlap the sensing magnet 180 in the optical-axis direction. For example, FIG. 22 shows disposition of the sensing magnet 180 and the first position sensor 170 at the initial position of the OIS operation unit.

At the initial position of the OIS operation unit, the sensing element 310 of the first position sensor 170 may overlap the sensing magnet 180 in the optical-axis direction. For example, at the initial position of the OIS operation unit, although the sensing element 310 of the first position sensor 170 may overlap the center 301 or the central area of the sensing magnet 180 or may be aligned with the center 301 of the sensing magnet 180 in the optical-axis direction, the disclosure is not limited thereto.

Because the first position sensor 170 is disposed on the stationary unit (for example, the circuit board 250 and the base 210) and the sensing magnet 180 is disposed on the OIS movable unit, when the OIS movable unit is moved relative to the stationary unit in a direction perpendicular to the optical-axis direction, alignment or relative positional relationships between the sensing magnet 180 and the first position sensor 170 may change, whereby the sensitivity of the first position sensor 170 may decrease or the sensitivity of the first position sensor 170 may be affected.

The stroke range 320 of the OIS operation unit in a direction perpendicular to the optical-axis direction may overlap the sensing magnet 180. Consequently, it is possible to inhibit decrease in the sensitivity of the first position sensor 170 caused by movement of the OIS operation unit in a direction perpendicular to the optical-axis direction.

For example, the stroke range 320 of the OIS operation unit may be a circle, a radius of which is the maximum stroke of the OIS operation unit. The maximum stroke of the OIS operation unit may be the maximum stroke of the OIS operation unit in one direction perpendicular to the optical-axis direction at the initial position of the OIS operation unit (for example, in the +X-axis direction or in +Y-axis direction). For example, the one direction may be the first diagonal direction or the second diagonal direction.

In other words, even when the OIS movable unit is moved in a direction perpendicular to the optical-axis direction, the first position sensor 170 and the sensing magnet 180 may be maintained in the state of overlapping each other in at least a portion thereof. For example, the sensing element 310 of the first position sensor 170 and the sensing magnet 180 may be maintained in the state of overlapping each other in the optical-axis direction within the stroke range of the OIS operation unit in a direction perpendicular to the optical-axis direction.

The sensing magnet 180 may have such a size as to cover the stroke range 320 of the OIS movable unit. The cross-sectional area of the sensing magnet 180 in a direction perpendicular to the optical-axis direction may be larger than the area of the stroke range 320 of the OIS operation unit. In another embodiment, the cross-sectional area of the sensing magnet 180 in a direction perpendicular to the optical-axis direction may be equal to the area of the stroke range 320 of the OIS operation unit.

Figure 23A:
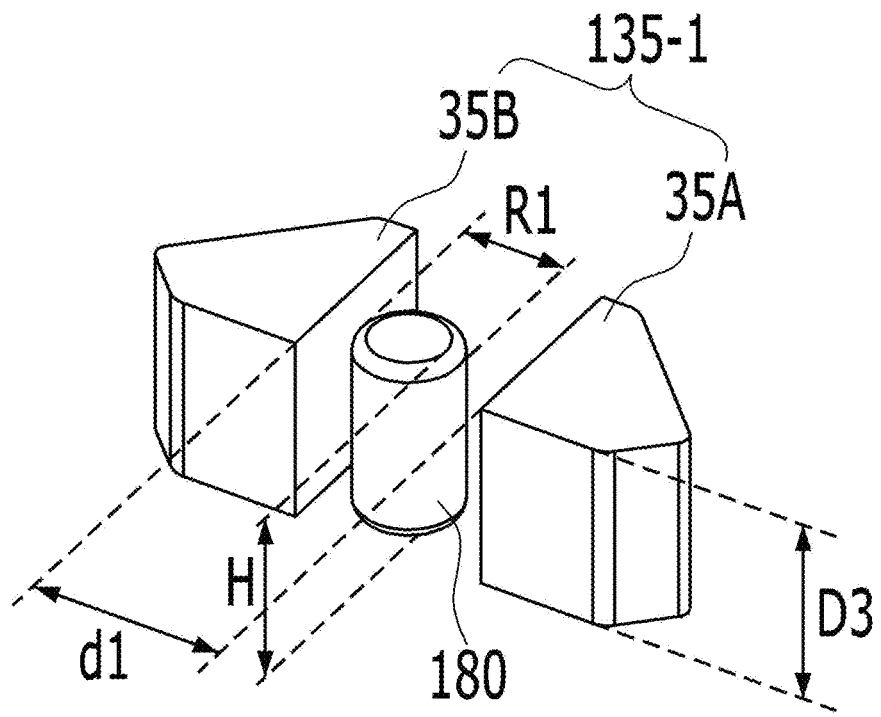
FIG. 23A is a view of a dummy member according to another embodiment.

FIG. 23A illustrates a dummy member 135-1 according to another embodiment.

Referring to FIG. 23A, the dummy member 135-1 may be a modification of the dummy member 135, and may have a structure which is divided into two parts without having the groove.

For example, the dummy member 135-1 may include a first dummy 35A and a second dummy 35B, which are spaced apart from each other. For example, the projection 116 of the bobbin 110 may be disposed between the first dummy 35A and the second dummy 35B. Furthermore, for example, the sensing magnet 180 may be disposed between the first dummy 35A and the second dummy 35B.

For example, the crosswise length or the diameter R1 of the sensing magnet 180 may be less than the distance d1 between the first dummy 35A and the second dummy 35B (R1<d1). Furthermore, for example, the orthogonal length or the diameter R1 of the sensing magnet 180 may be less than or equal to the distance or length between the first surface 12a and the second surface 12b of the first dummy 35A (or the second dummy 35B).

Furthermore, for example, the length H of the sensing magnet 180 in the optical-axis direction may be less than or equal to the length D3 of the first dummy 35A (or the second dummy 35B) in the optical-axis direction (H≤ D3). For example, although the first dummy 35A and the second dummy 35B may have shapes symmetrical with each other and may be disposed symmetrically based on the sensing magnet 180, the disclosure is not limited thereto. In another embodiment, the dummy member may include only one of the first dummy 35A and the second dummy 35B.

Figure 23B:
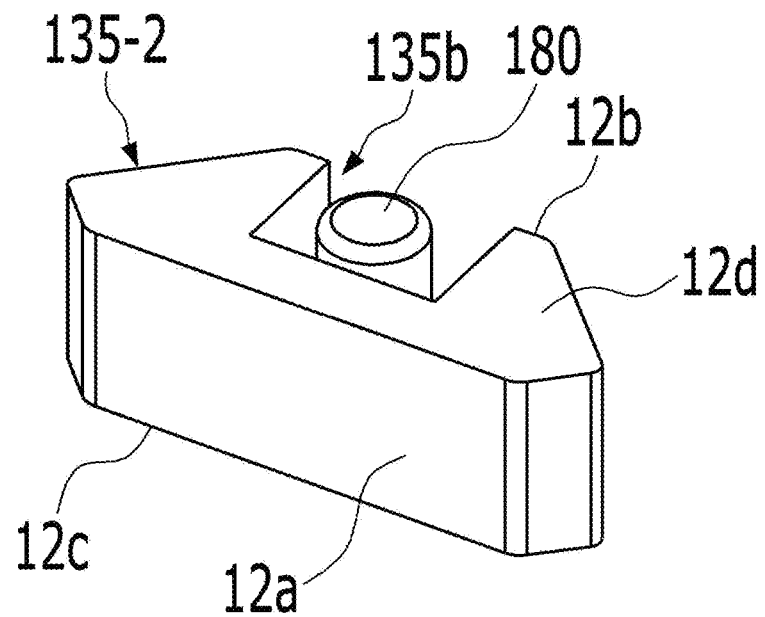
FIG. 23B is a view of a dummy member according to a further embodiment.

FIG. 23B illustrates a dummy member 135-2 according to a further embodiment.

Referring to FIG. 23B, the dummy member 135-2 may be a modification of the dummy member 135, and may differ from the dummy member 135 in a location at which the groove is formed.

For example, the dummy member 135-2 may have a groove 135b formed in the second surface 12b. Because the dummy member 135-2 is substantially identical to the dummy member 135 shown in FIG. 20 except the position of the groove 135b, the description of the relationships between the dummy member 135 and the sensing magnet 180 shown in FIG. 20 may be applied to the dummy member 135-2 with or without modification.

In dual cameras or triple or more cameras, which are mounted on cellular phones having functions of zooming, wide vision and the like, two or more lens moving apparatuses are disposed close to each other due to spatial restriction of the cellular phones. Owing to the close disposition, magnetic field interference between magnet units included in the two or more lens moving apparatuses may occur, and the magnetic field interference may interfere with functions of camera modules, such as AF operation, OIS operation and the like.

Furthermore, the OIS operation unit may droop (or move) in the direction of gravity due to the influence of gravity, and thus the resolution of the camera module may be deteriorated due to the drooping of the OIS operation unit.

In order to realize a high resolution, there is a need to increase the size of the lens and the size of the image sensor of the camera module but the weight of the AF movable unit and the OIS movable unit may increase. By the increase in the weight of the OIS movable unit, the drooping of the OIS movable unit in the direction of gravity due to the influence of gravity may further increase, and thus the resolution may be further deteriorated.

By the influence of gravity, movement (or drooping) of the AF movable unit in the direction of gravity and movement (or drooping) of the OIS movable unit in the direction of gravity may occur, and the drooping may cause errors in AF operation of the camera module 200.

In general, when the AF position sensor is disposed on the OIS movable unit (for example, the housing or the bobbin), it is possible to automatically correct or compensate for the drooping of the AF movable unit caused by the influence of gravity because the AF position sensor is capable of detecting displacement of the AF movable unit in the optical-axis direction by feedback motion.

However, because the AF position sensor disposed on the OIS movable unit is incapable of detecting displacement of the OIS movable unit in the optical-axis direction relative to the stationary unit, it is impossible to automatically correct or compensate for the drooping or movement of the OIS movable unit caused by the influence of gravity using the AF position sensor.

In the embodiment, because the first position sensor 170 is disposed on the stationary unit, it is possible to automatically correct or compensate for the movement (or the drooping) of the AF movable unit attributable to the movement (or the drooping) of the OIS movable unit caused by the influence of gravity.

Figure 24:
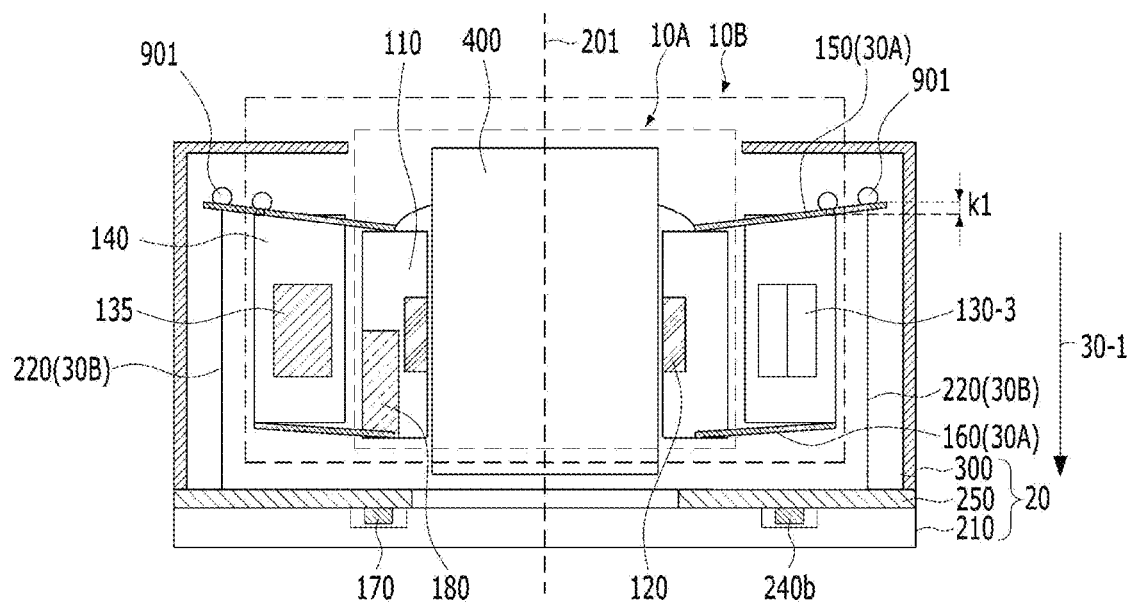
FIG. 24 is a view explaining sensing operation of the first position sensor for compensating for drooping of the OIS operation unit caused by the influence of gravity.

FIG. 24 is a view explaining sensing operation of the first position sensor 170 for compensating for drooping of the OIS movable unit caused by the influence of gravity.

Referring to FIG. 24, the AF movable unit 10A and the OIS movable unit 10B of the lens moving apparatus 100 may be supported by an elastic unit. For example, the elastic unit may include at least one of the upper elastic member 150, the lower elastic member 160, and the polymer actuator 220.

For example, the elastic unit may include a first elastic unit 30A configured to elastically support the AF movable unit 10A with respect to the housing 140, and a second elastic unit 30B configured to elastically support the OIS movable unit 10B with respect to the stationary unit 20.

For example, the first elastic unit 30A may include the upper elastic member 150 and the lower elastic member 160, and the second elastic unit 30B may include the polymer actuator 220. By virtue of the first and second elastic units 30A and 30B, the OIS operation unit 10B, which is supported by the stationary unit 20, may droop or move in the direction of gravity by the influence of gravity.

An amount of drooping k1 (or an amount of movement) of the OIS movable unit caused by the influence of gravity may be affected by the position difference of the OIS movable unit. In FIG. 24, for example, the position difference of the OIS movable unit may correspond to a top view, and may be 0 degrees. The position difference of the OIS movable unit 10B may be the gradient or the angle between the optical axis OA (or the reference axis 201) of the OIS movable unit 10B at the reference position and the optical axis OA (or the reference axis 201) of the OIS movable unit 10B at a current position. For example, the reference axis 201 may be a straight axis perpendicular to the sensor surface (for example, the active area or the effective area) of the image sensor 810.

In the embodiment, the first position sensor 170 may be disposed on the stationary unit 20. Because the distance between the first position sensor 170 and the sensing magnet 180 may increase, compared to the case in which the first position sensor is disposed on the OIS movable unit, the first position sensor 170 may be embodied as a highly-sensitive Hall sensor or a TMR (tunnel magnetoresistance) sensor. For example, when power (or a constituent signal) supplied to the first position sensor 170 is 1 mA, the sensitivity of the first position sensor 170 may be 0.3 mV/mT or more.

Because it is possible to obtain information about a current displacement of the AF operation unit 10A in the optical-axis direction using the calibration between the output value of the AF position sensor 170 disposed on the stationary unit 20 and the displacement of the AF operation unit 10A even when the OIS movable unit 10B droops or moves in the direction of gravity by the influence of gravity, it is possible to automatically compensate for the drooping or movement of the AF movable unit 10A in the optical-axis direction attributable to the drooping of the OIS operation unit 10B caused by the influence of gravity.

Figure 25:
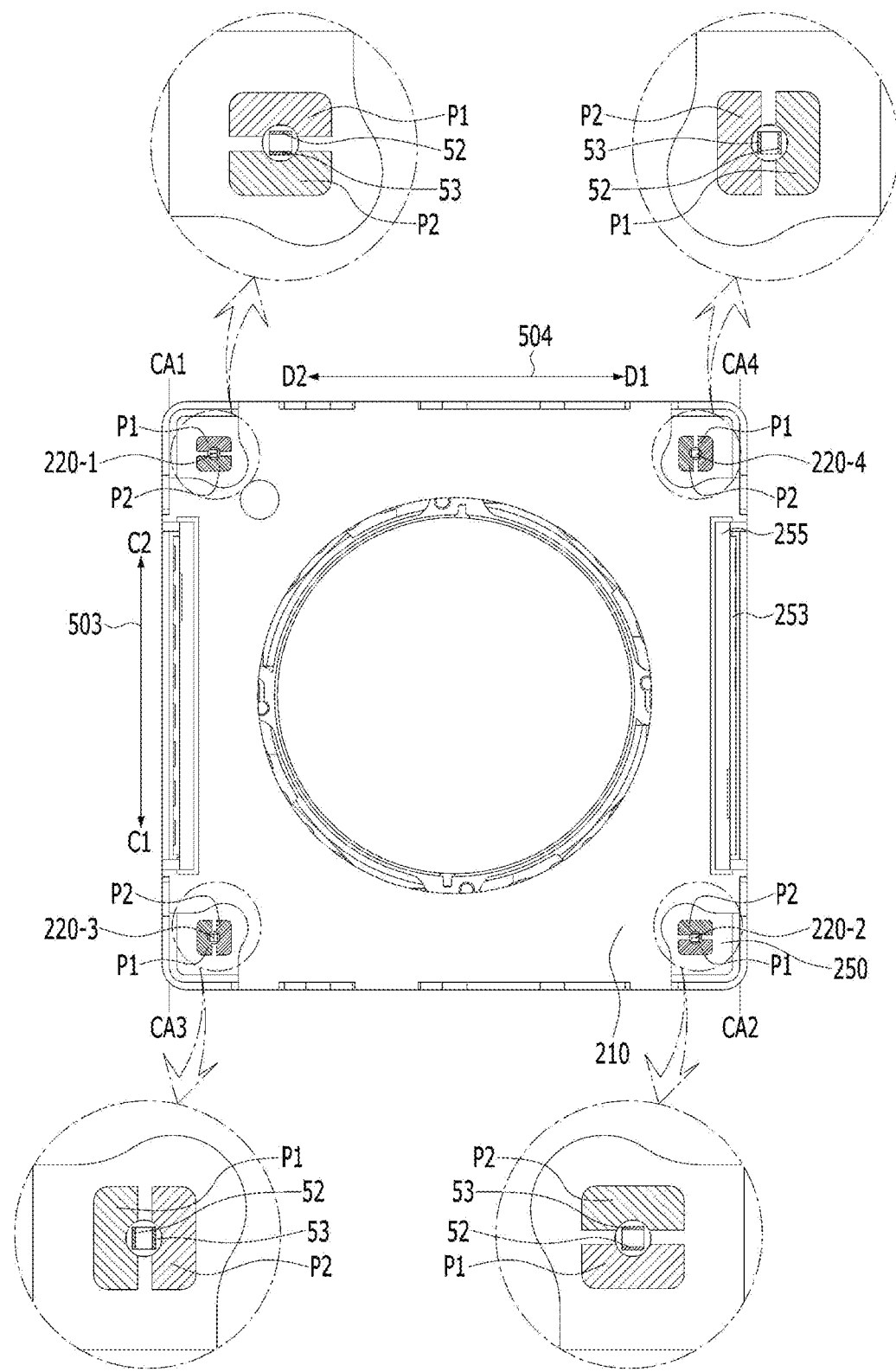
FIG. 25 is a view illustrating disposition of first and second electrodes of each of the first to fourth polymer actuators according to another embodiment.

FIG. 25 illustrates disposition of first and second electrodes 52-1 and 52-2 of each of the first to fourth polymer actuators 220-1 to 220-4 according to another embodiment.

Referring to FIG. 25, the first and second electrodes 52-1 and 52-2 shown in FIG. 25 are different from the first and second electrodes 52 and 53 shown in FIG. 14 in orientation.

For example, the first and second electrodes 52-1 and 52-2 of each of the first and second polymer actuators 220-1 and 220-2 may be disposed so as to be opposed to or face each other in the first horizontal direction 503.

Furthermore, the first and second electrodes 52-1 and 52-2 of each of the third and fourth polymer actuators 220-3 and 220-4 may be disposed so as to be opposed to or face each other in the second horizontal direction 504. For example, the first horizontal direction 503 may be a direction parallel to one side portion (for example, 141-1) of the housing 140. The description of the first horizontal direction and the second horizontal direction shown in FIG. 17 may also be applied to the first horizontal direction and the second horizontal direction shown in FIG. 25 with or without modification.

For example, when drive signals are supplied to the first and second electrodes 52-1 and 52-2 of each of the first and second polymer actuators 220-1 and 220-2 so as to have the polarities as shown in FIG. 18A, the OIS movable unit may be moved in the first horizontal direction 503.

For example, when drive signals are supplied to the first and second electrodes 52-1 and 52-2 of each of the first and second polymer actuators 220-1 and 220-2 so as to have the polarities as shown in FIG. 18B, the OIS movable unit may be moved in the second horizontal direction 504.

Because the first and second electrodes 52-1 and 52-2 shown in FIG. 25 are different from the first and second electrodes 52 and 52 shown in FIG. 14 only in orientation, the description of the first and second electrodes 52 and 53 shown in FIG. 14 may be applied to the embodiment shown in FIG. 25 with or without modification, except orientation thereof.

Because the OIS coil configured to perform OIS operation by interaction with the magnet 130 is omitted in this embodiment, it is possible reduce the lengths or the heights of the lens moving apparatus and the camera module in the optical-axis direction.

Because the OIS coil, which is typically disposed on the circuit board, is omitted in this embodiment, the magnet 130 and the circuit board 250 may serve as a stopper for the AF movable unit in the optical-axis direction.

As illustrated in FIG. 18A to 19B, the embodiment enables operation in the diagonal directions 501 and 502 and/or the horizontal directions 503 and 504 using the first to fourth polymer actuators 220-1 to 220-4.

Furthermore, according to embodiment, because the OIS movable unit is supported by the polymer actuator 220, it is possible to support the OIS movable unit including a bigger and heavier lens, compared to a comparative example in which the OIS movable unit is supported by a suspension wire.

In the embodiment shown FIGS. 1 to 25, it is possible to perform OIS operation using the polymer actuator and to perform AF operation using the electromagnetic interaction between the magnet 130 and the coil 120.

In another embodiment, it is also possible to perform AF operation using the polymer actuator. For example, at least one of the upper elastic member or the lower elastic member may be replaced with a polymer actuator for AF operation, and the polymer actuator for AF operation may include a polymer portion, and first and second electrodes, which are disposed so as to face each other in the optical-axis direction. It is also possible to move the AF movable unit in the optical-axis direction by applying a drive signal to the first and second electrodes of the polymer actuator for AF operation.

Figure 26:
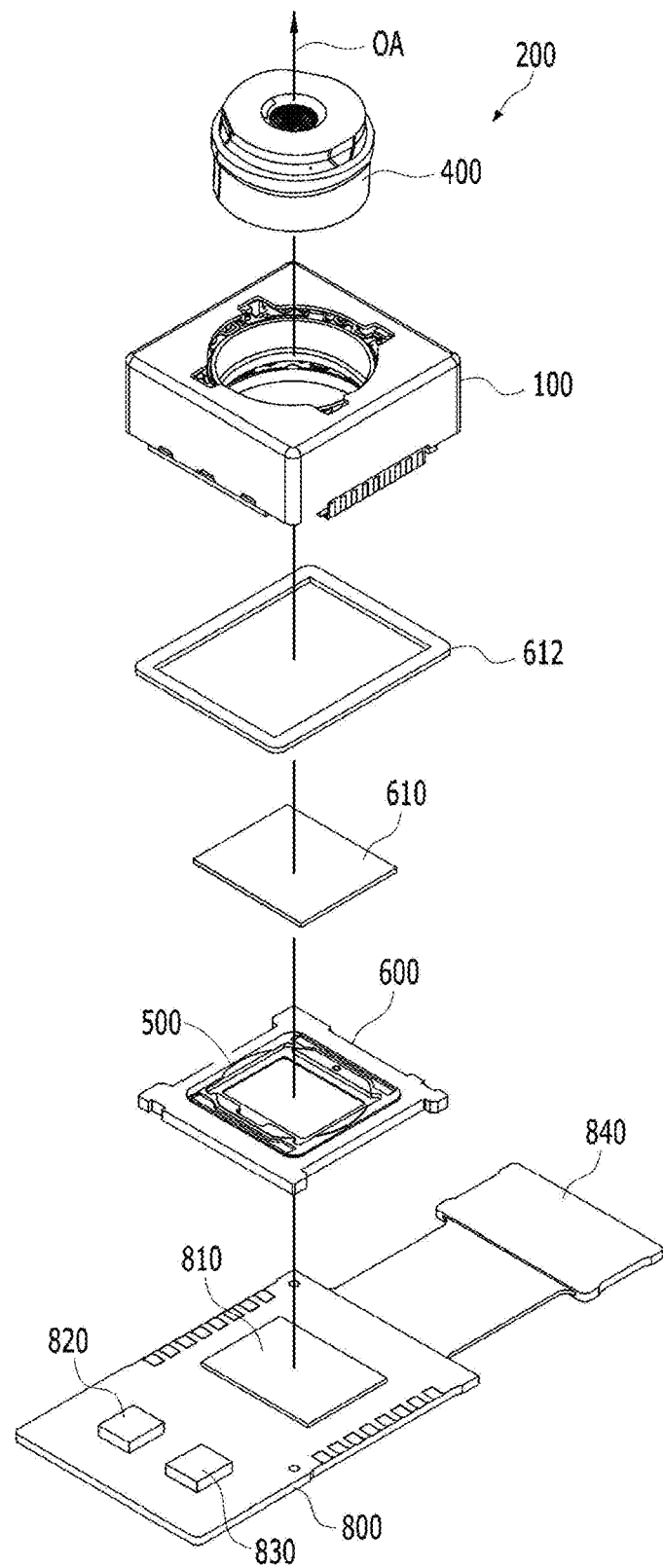
FIG. 26 is an exploded perspective view of the camera module according to the embodiment.

FIG. 26 is an exploded perspective view of the camera module 200 according to the embodiment.

Referring to FIG. 26, the camera module 200 may include the lens moving apparatus 100 and the image sensor 810. The camera module 200 may include the lens module 400.

The camera module according to another embodiment may include a lens moving apparatus 1010 shown in FIG. 31 to be described later, in place of the lens moving apparatus 100.

The camera module 200 may include at least one of an adhesive member 612, a filter 610, a first holder 600, a second holder 800, a motion sensor 820, a controller 830, or a connector 840.

The lens module 400 may be mounted in the bobbin 110 of the lens moving apparatus 100 or 1000. The lens module 400 may include at least one of a lens or a lens barrel. For example, the lens module 400 may include a lens barrel and at least one lens coupled or mounted to the lens barrel. The lens module 400 may be moved together with the bobbin 110.

The first holder 600 may be disposed under the base 210 of the lens moving apparatus 100. The filter 610 may be mounted on the first holder 600, and the first holder 600 may include a projection 500 on which the filter 610 is seated.

The adhesive member 612 may couple or attach the base 210 of the lens moving apparatus 100 to the first holder 600. In addition to the attachment function described above, the adhesive member 612 may serve to inhibit contaminants from entering the lens moving apparatus 100. For example, the adhesive member 612 may be, for example, epoxy, thermohardening adhesive, or ultraviolet hardening adhesive.

The filter 610 may serve to inhibit light within a specific frequency band that passes through the lens module 400 from being introduced into the image sensor 810. The filter 610 may be an infrared-light-blocking filter or an infrared-absorbing filter, without being limited thereto. Here, the filter 610 may be oriented parallel to the X-Y plane.

The region of the first holder 600 in which the filter 610 is mounted may be provided with a bore in order to allow the light that passes through the filter 610 to be introduced into the image sensor 810.

The second holder 800 may be disposed under the first holder 600, and the image sensor 810 may be mounted on the second holder 600. The image sensor 810 may be the region, on which an image included in the light that passes through the filter 610 and is incident thereon is formed. The second holder 800 may include, for example, various circuits, devices, and a controller in order to convert the image, formed on the image sensor 810, into electrical signals and to transmit the electrical signals to an external component. The second holder 800 may be embodied as a circuit board on which the image sensor 810 may be mounted, on which a circuit pattern may be formed, and to which various devices may be coupled.

The first holder 600 may be alternatively referred to as a "holder" or a "sensor base", and the second holder 800 may be alternatively referred to as a "board", a "printed circuit board", or a "circuit board".

The image sensor 810 may receive an image included in the light introduced through the lens moving apparatus 100, and may convert the received image into an electrical signal. The filter 610 and the image sensor 810 may be disposed so as to be spaced apart from each other and to face each other in the first direction.

The image sensor 810 may be disposed on or mounted to the second holder 800. The image sensor 810 may be conductively connected to the second holder 800. For example, the image sensor 810 may be coupled to the second holder 800 using Surface Mount Technology (SMT). Alternatively, the image sensor 810 may be coupled to the second holder 800 using flip-chip technology. The image sensor 810 may be disposed such that the lens coincides with the optical axis. In other words, the optical axis of the image sensor 810 may be aligned with the optical axis of the lens. The image sensor 810 may convert light, incident on the effective image region (or the active region) of the image sensor 60, into an electric signal. The image sensor 810 may be any one of a charge-coupled device (CCD), a metal oxide semiconductor (MOS), a CPD and a CID.

The motion sensor may be mounted on the second holder 800, and may be conductively connected to the controller 830 through the circuit pattern provided at the second holder 800. The motion sensor 820 may output information about a rotational angular speed of motion of the camera module 200. The motion sensor 820 may be embodied as a dual-axis, triple-axis or five-axis gyro sensor or an angular speed sensor.

The controller 830 may be disposed on or mounted to the second holder 800, and may be conductively connected to the first position sensor 170 and the second position sensor 240 of the lens moving apparatus 100. Furthermore, the controller 830 may be conductively connected to the coil 170 and the polymer actuator 220.

The controller 830 may be conductively connected to an actuation unit 1500 to be described later. The controller may individually control the direction, the intensity, the amplitude and the like of the current supplied to the plurality of polymer actuators of the actuation unit 1500. The controller 830 may control the lens moving apparatus 1010 to perform a handshake correction function. The controller 830 may perform autofocus function by controlling the lens moving apparatus 1010. The controller 830 may be conductively connected to a driver IC 1240.

For example, the second holder 800 may be conductively connected to the circuit board 250 of the lens moving apparatus 100, and the controller 830 mounted to the second holder 800 may be conductively connected to the first position sensor 170 and the second position sensor 240 via the circuit board 250. Furthermore, the controller 830 may be conductively connected to the coil 120 and the polymer actuator 220 via the circuit board 250.

For example, the controller 830 may supply a drive signal to each of the first position sensor 170, the first sensor 240a, and the second sensor 240b, and may receive an output from each of the sensors.

Alternatively, for example, the controller 830 may supply a drive signal or a power signal to at least one of the first position sensor 170, the first sensor 240a, and the second sensor 240b, and may transmit and receive a clock signal and a data signal with respect to the first position sensor 170, the first sensor 240a, and the second sensor 240b for I2C communication.

Furthermore, the controller 830 may perform feedback autofocus operation for the AF movable unit of the lens moving apparatus based on the output from the first position sensor 170.

Furthermore, the controller 830 may perform OIS operation for the OIS movable unit of the lens moving apparatus 100 based on the output from the first sensor 240a and the output from the second sensor 240b.

The connector 840 may be conductively connected to the second holder 800, and may include a port for conductive connection to an external apparatus.

The lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 27:
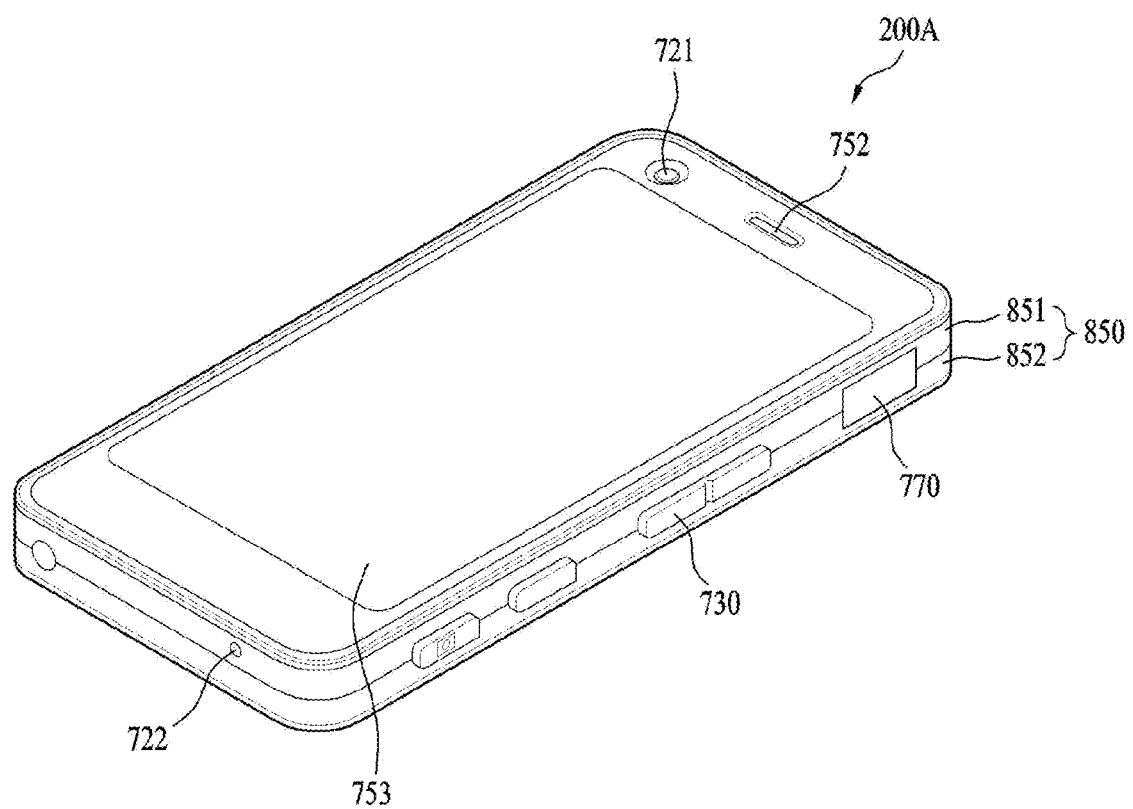
FIG. 27 is a perspective view illustrating an optical device according to an embodiment.
Figure 28:
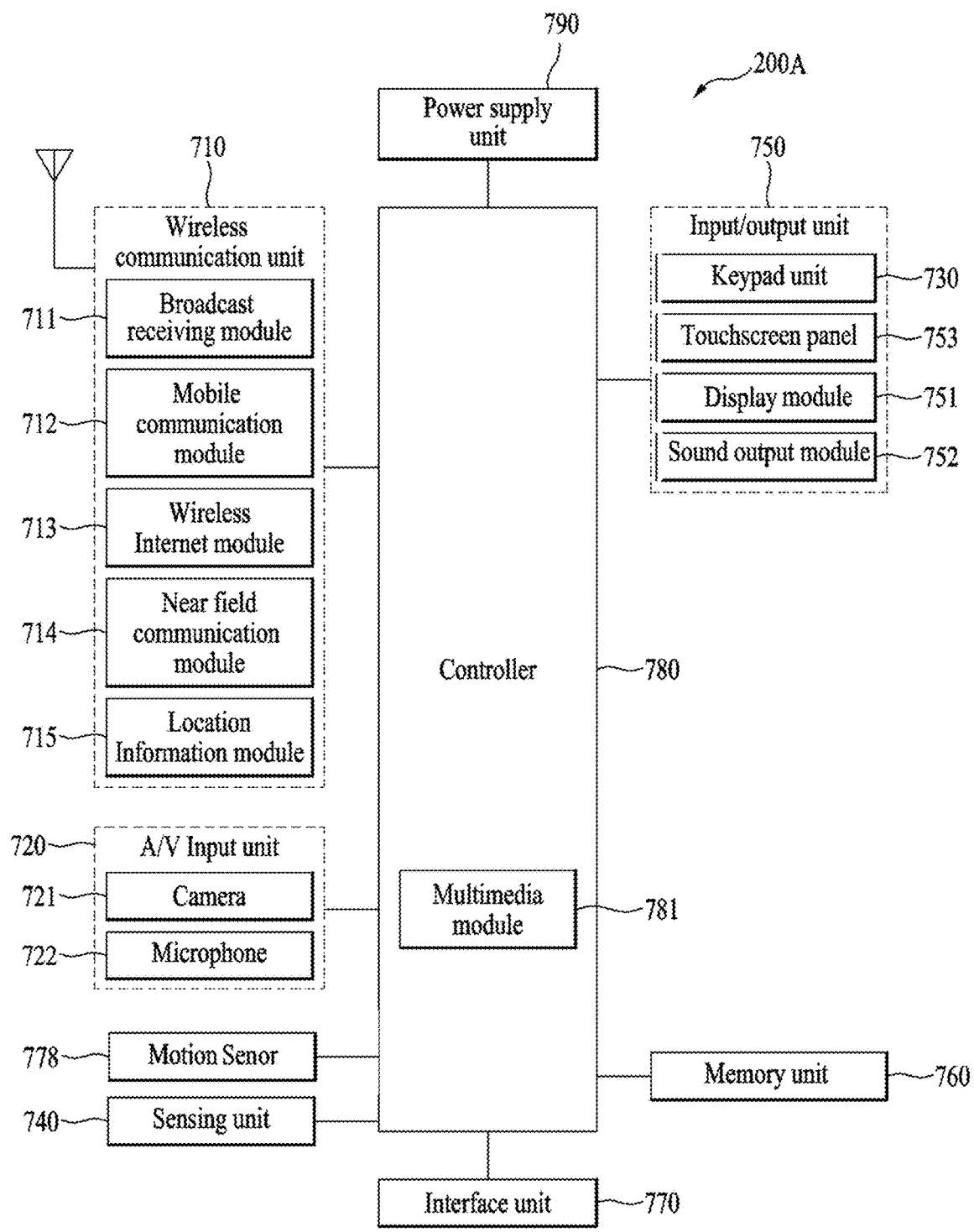
FIG. 28 is a view illustrating the configuration of the optical device shown in FIG. 27.

FIG. 27 is a perspective view illustrating an optical device 200A according to an embodiment. FIG. 28 is a view illustrating the configuration of the optical device 200A illustrated in FIG. 27.

Referring to FIGS. 27 and 28, the optical device 200A, for example, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 28 may have a bar shape, without being limited thereto, and may be any of various types, such as, for example, a slide type, a folder type, a swing type, or a swivel type, in which two or more sub-bodies are coupled so as to be movable relative to each other.

The body 850 may include a case (a casing, housing, cover or the like) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722. The camera 721 may include the camera module 200 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 180.

The controller 780 may perform a pattern recognition process capable of recognizing writing input or drawing input carried out on a touch screen as a character and an image, respectively.

Furthermore, in place of the controller 830 of the camera module 200, the controller 780 may perform feedback autofocus operation for the AF movable unit of the lens moving apparatus 100 based on the output from the first position sensor 170. Furthermore, the controller 780 may perform OIS operation for the OIS movable unit of the lens moving apparatus 100 based on the output of the first sensor 240a and the output of the second sensor 240b.

Figure 29:
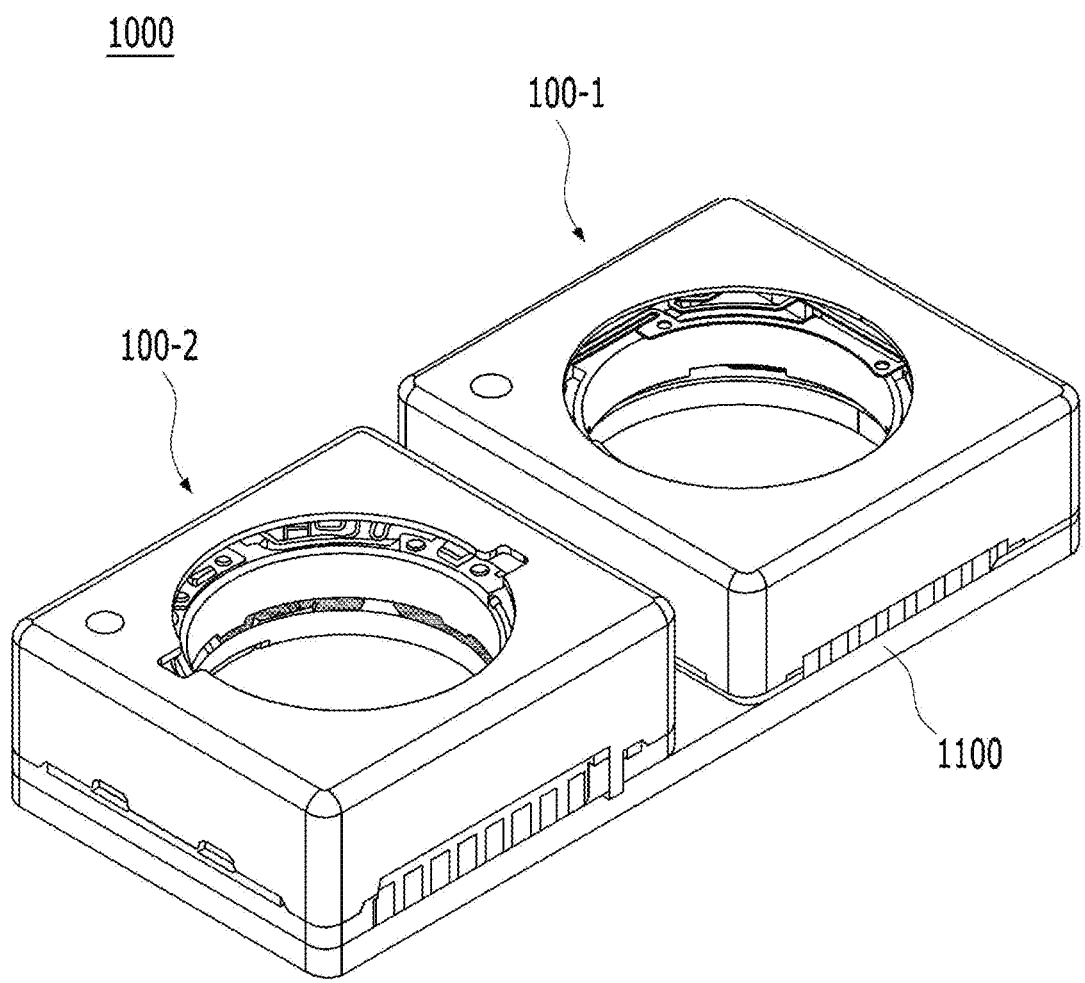
FIG. 29 is a perspective view of a camera module according to another embodiment.

FIG. 29 is a perspective view of a camera module 1000 according to another embodiment.

Referring to FIG. 29, the camera module 1000 may be a dual camera including a first camera module 100-1 including a first lens moving apparatus and a second camera module 100-2 including a second lens moving apparatus.

For example, each of the first camera module 100-1 and the second camera module 100-2 may be one of an AF (autofocus) camera module and an OIS (optical image stabilizer) camera module.

The AF camera module may be a camera module capable of only an autofocus function, and the OIS camera module may be a camera module capable of both an autofocus function and an OIS function.

For example, the first lens moving apparatus may be the lens moving apparatus 100 according to the embodiment shown in FIG. 1, and the second lens moving apparatus may be the lens moving apparatus 100 or an AF lens moving apparatus.

The camera module 1000 may further include a circuit board 1100 on which the first camera module 100-1 and the second camera module 100-2 are mounted. Although the first camera module 100-1 and the second camera module 100-2 are disposed side by side on a single circuit board 1100, the disclosure is not limited thereto. In another embodiment, the first camera module 100-1 may be disposed on a first circuit board, and the second camera module 100-2 may be disposed on a second circuit board.

Figure 30A:
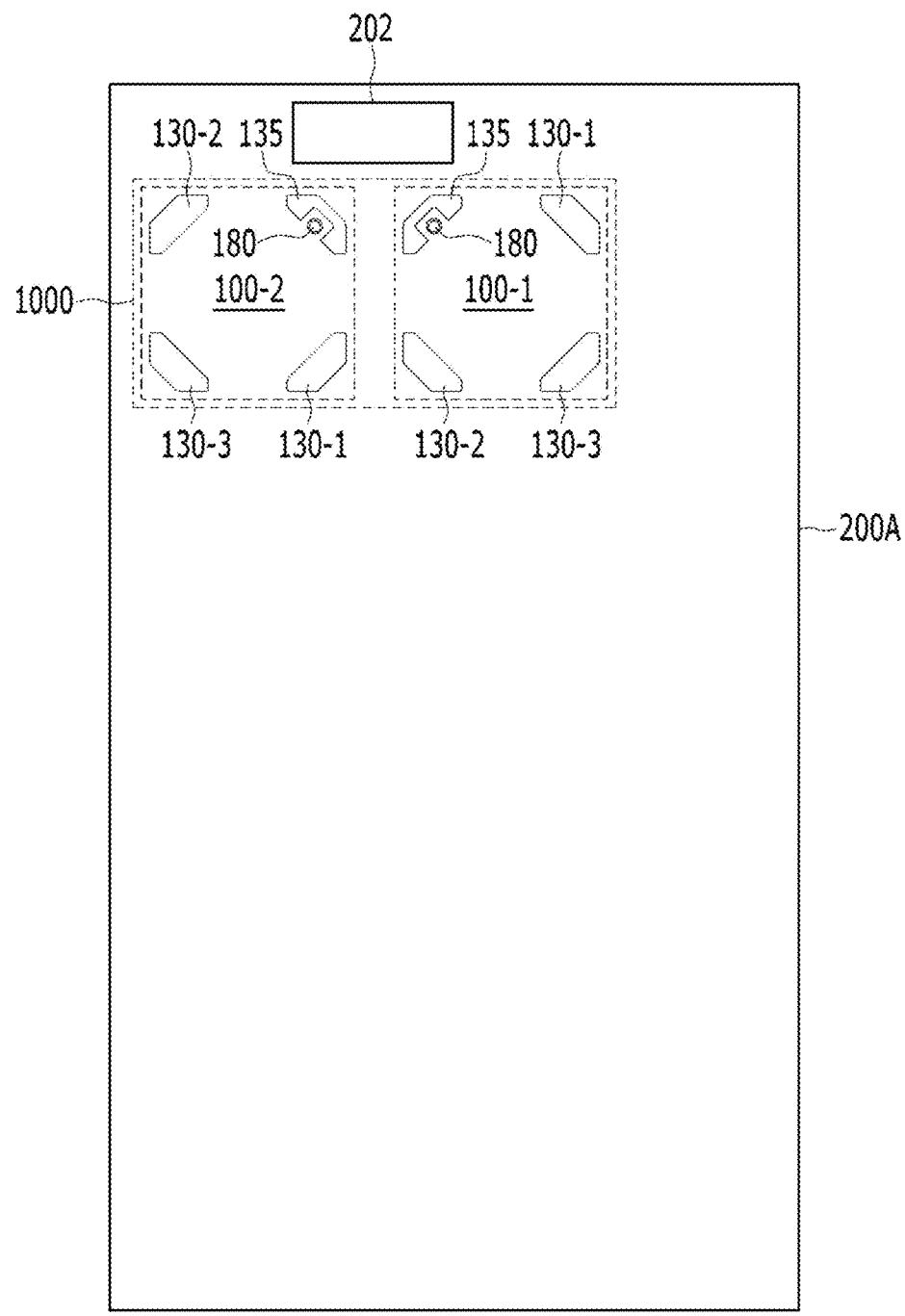
FIG. 30A is a view illustrating an embodiment of a dual camera module mounted on a terminal.

FIG. 30A is a view illustrating an embodiment of a dual camera module mounted on a terminal 200A.

Referring to FIG. 30A, each of the first lens moving apparatus 100-1 and the second lens moving apparatus 100-2 of the dual camera module 1000 may be the lens moving apparatus 100 according to the embodiment.

The dummy member 135 of the first lens moving apparatus 100-1 and the dummy member 135 of the second lens moving apparatus 100-2 may be disposed adjacent to each other.

For example, when the front surface or the rear surface of the terminal 200A is viewed, the dummy member 135 of the first lens moving apparatus 100-1 and the dummy member of the second lens moving apparatus 100-2 may be disposed so as to be bilaterally symmetrical with each other.

A speaker 202 or a receiver may be disposed on one end (for example, the upper end) of the front surface or the rear surface of the terminal. Here, when the first to third magnet units 130-1 to 130-3 of each of the first and second lens moving apparatuses 100-1 and 100-2 are disposed close to the speaker 202, the first to third magnet units 130-1 to 130-3 may be strongly affected by the influence of a magnetic field of a magnet included in the speaker 202 (or the receiver), thereby deteriorating accuracy of AF operation and OIS operation.

In order to reduce the influence of magnetic field interference caused by a magnet included in the speaker 202, according to the embodiment, each of the dummy member 135 of the first lens moving apparatus 100-1 and the dummy member 135 of the second lens moving apparatus 100-2 may be disposed closer than the first to third magnet units 130-1 to 130-3 to the speaker 202. Consequently, since it is possible to reduce the influence of a magnetic field caused by the speaker 202, the embodiment is able to improve design freedom with respect to disposition of the speaker 201 or the receiver.

Figure 30B:
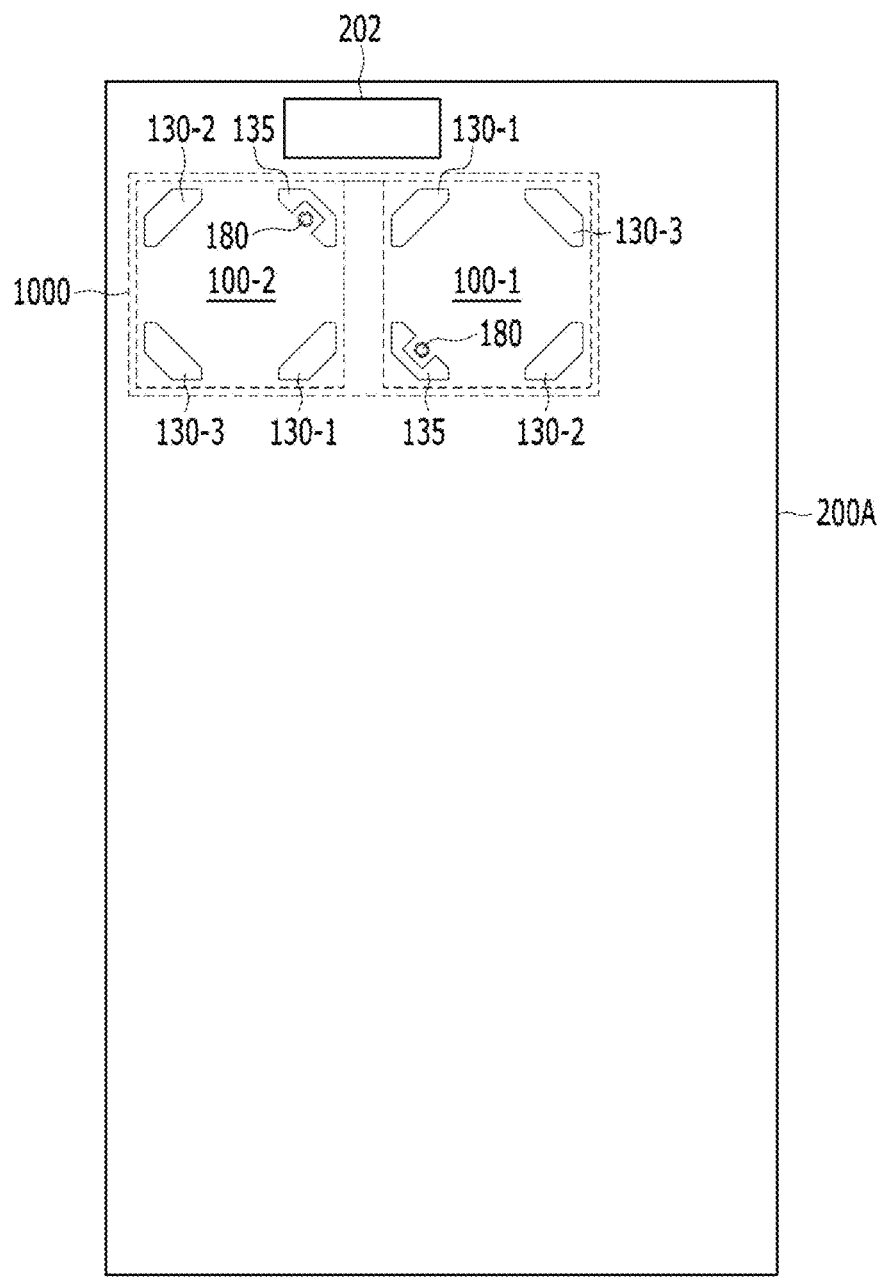
FIG. 30B is a view illustrating another embodiment of a dual camera mounted on the terminal.

FIG. 30B is a view illustrating another embodiment of a dual camera mounted on the terminal.

Referring to FIG. 30B, when the front surface or the rear surface of the terminal 200A is viewed, the dummy member 135 of the first lens moving apparatus 100-1 and the dummy member of the second lens moving apparatus 100-2 may be disposed so as to be symmetrical with respect to a point.

For example, the dummy member 135 of one (for example, 100-2) of the first and second lens moving apparatuses 100-1 and 100-2 may be disposed closer than the dummy member 135 of the other of the first and second lens moving apparatuses 100-1 and 100-2 to the speaker 202. By virtue of the disposition, it is possible to reduce the influence of the electromagnetic interference between the magnet units 130-1 to 130-3 of the first lens moving apparatus 100-1 and the magnet units 130-1 to 130-3 of the second lens moving apparatus 100-2.

Figure 31:
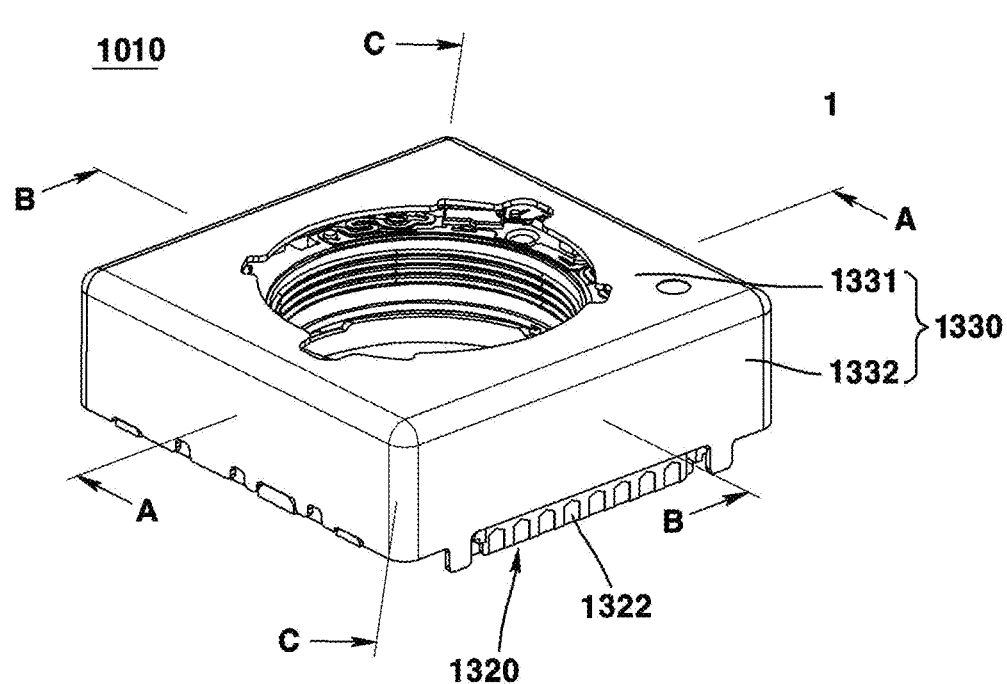
FIG. 31 is a perspective view of a lens moving apparatus according to a further embodiment.
Figure 32:
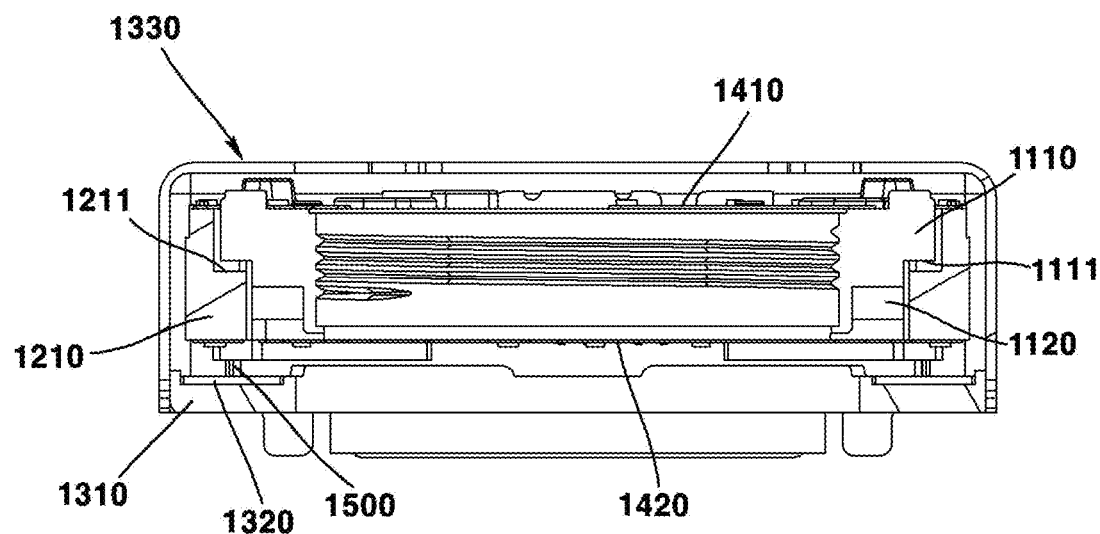
FIG. 32 is a cross-sectional view taken along line A-A in FIG. 31.
Figure 33:
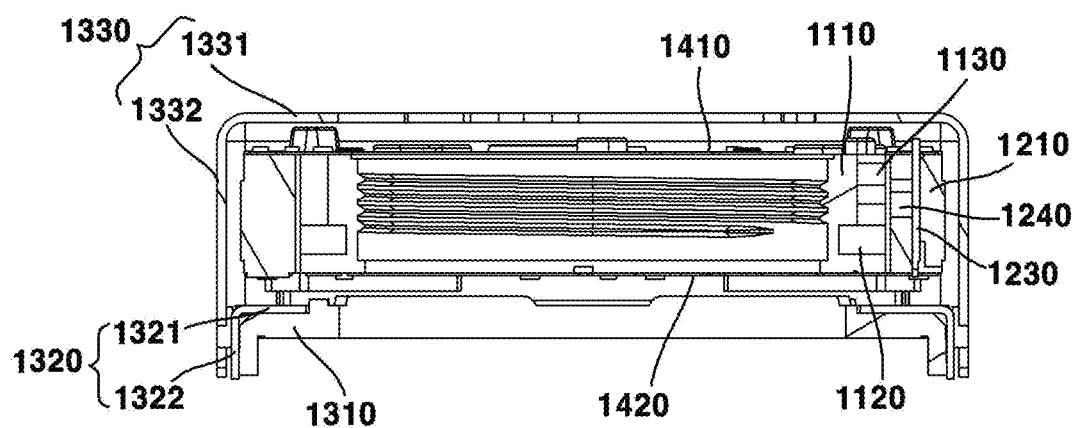
FIG. 33 is a cross-sectional view taken along line B-B in FIG. 31.
Figure 34:
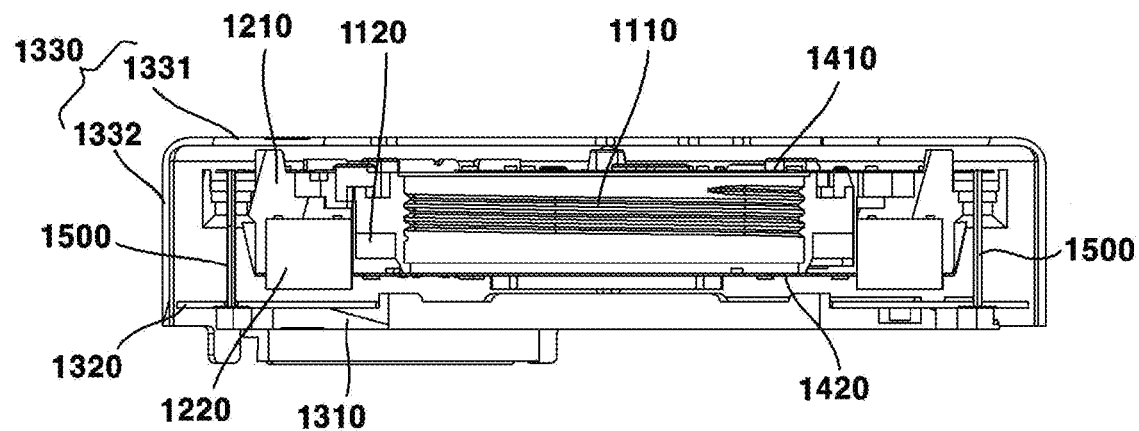
FIG. 34 is a cross-sectional view taken along line C-C in FIG. 31.
Figure 35:
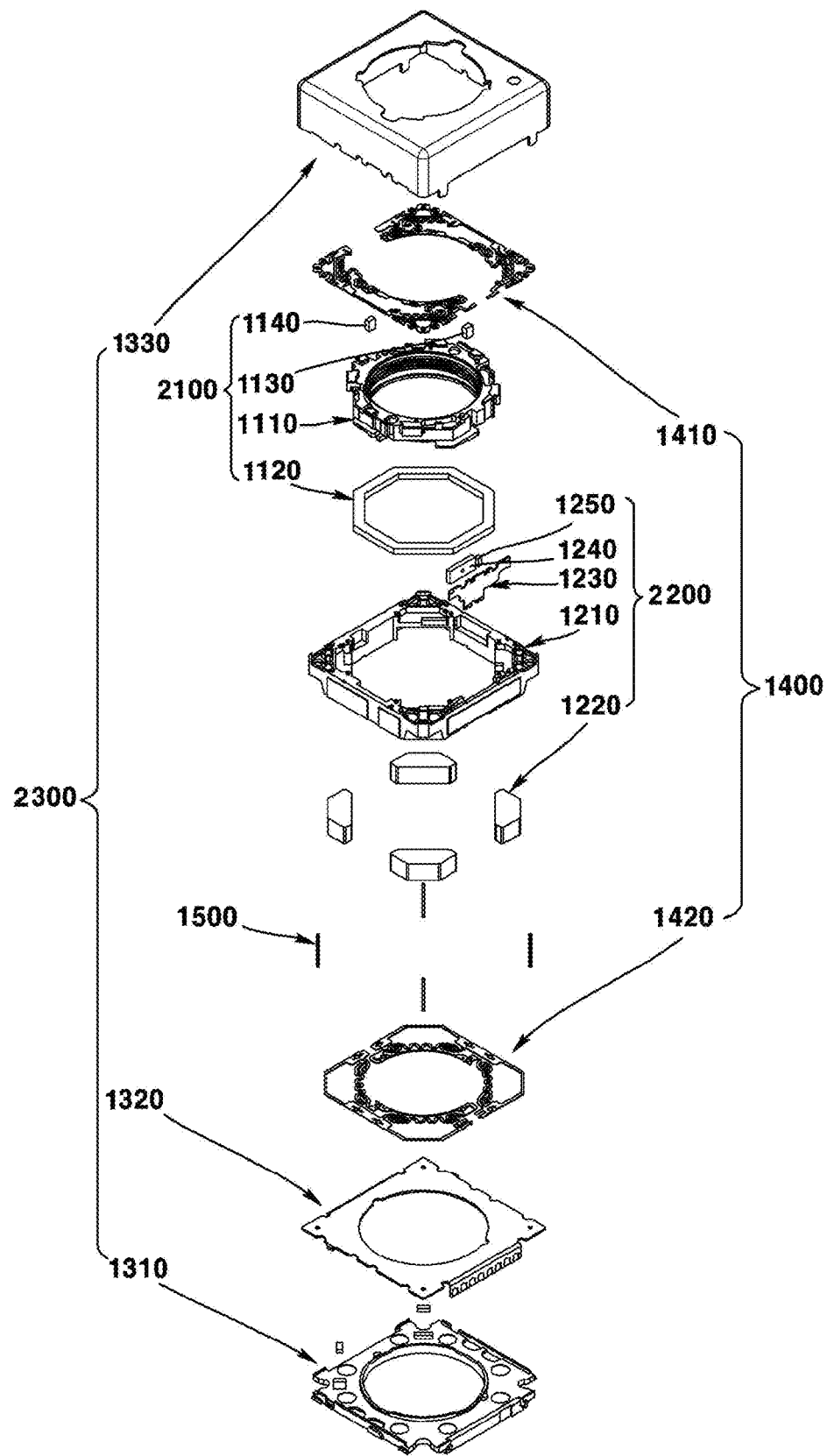
FIG. 35 is an exploded perspective view of the lens moving apparatus shown in FIG. 31.
Figure 36:
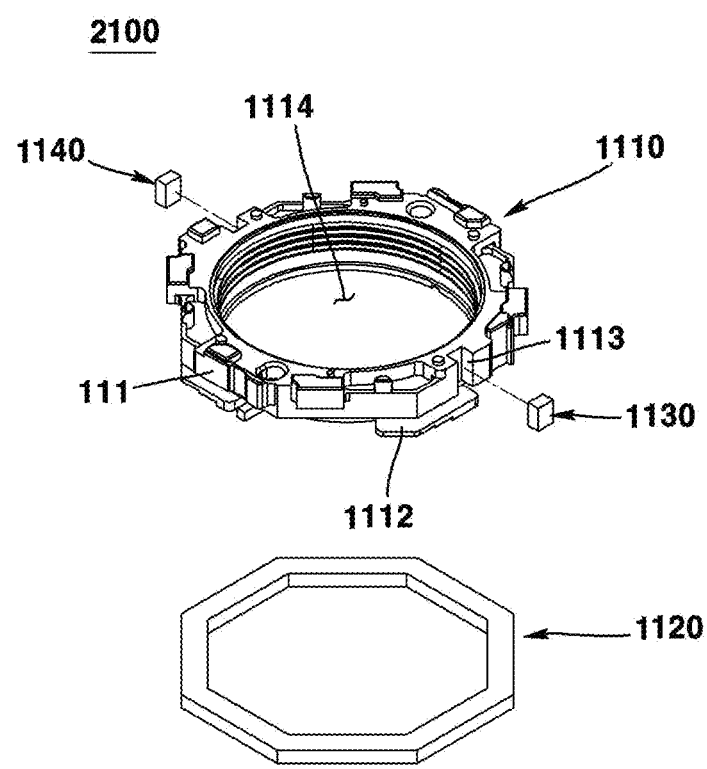
FIG. 36 is an exploded perspective view of a first operator of the lens moving apparatus shown in FIG. 31.
Figure 37:
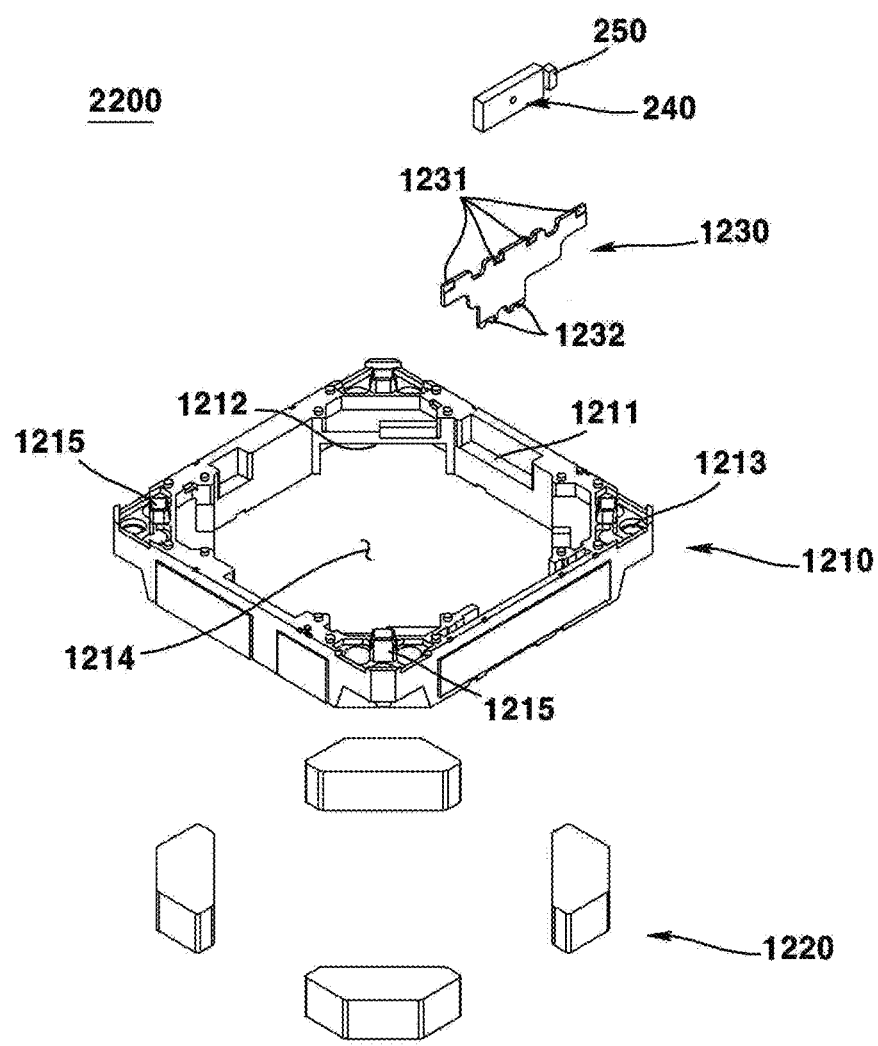
FIG. 37 is an exploded perspective view of a second operator of the lens moving apparatus shown in FIG. 31.
Figure 38:
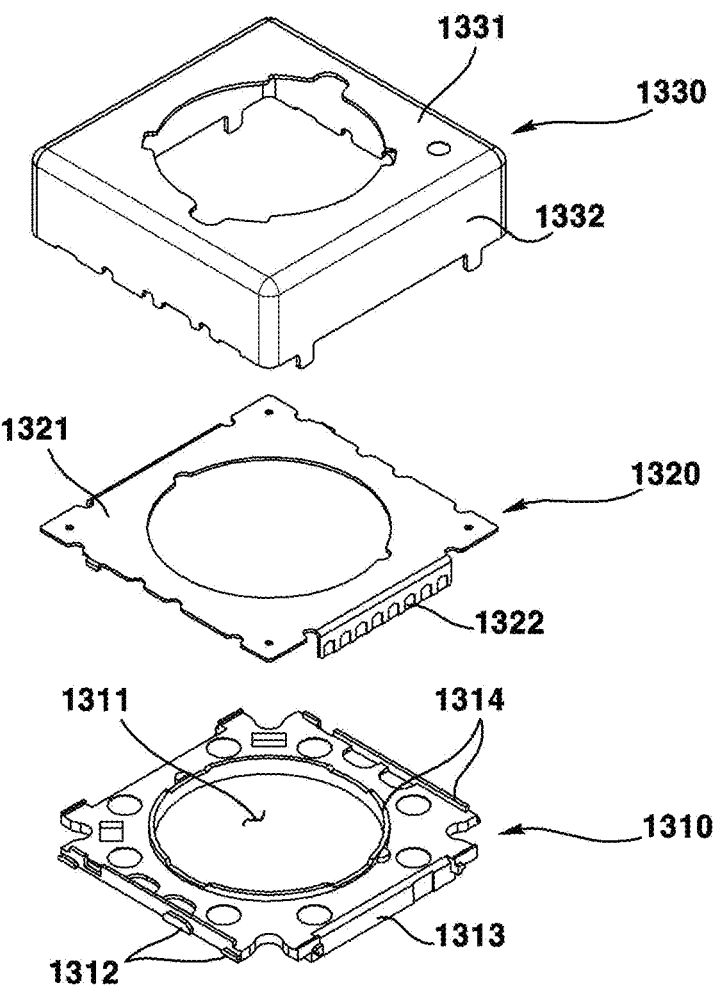
FIG. 38 is an exploded perspective view of a stator of the lens moving apparatus shown in FIG. 31.
Figure 39:
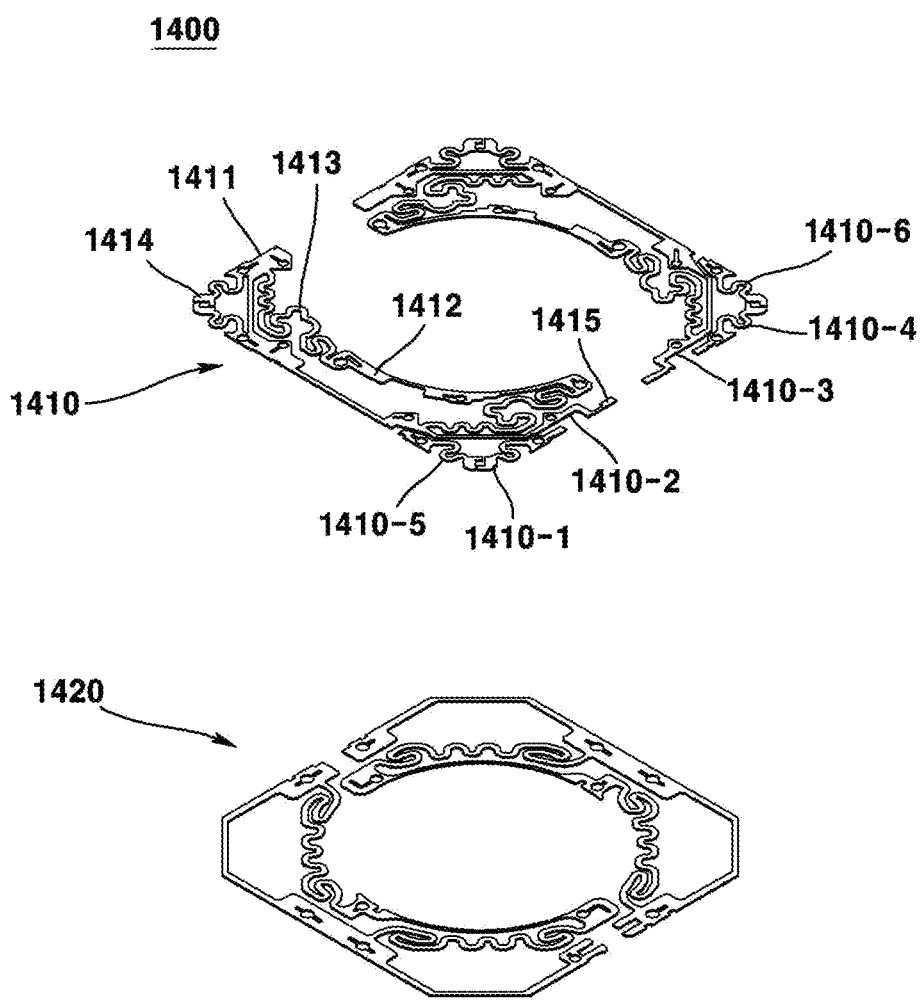
FIG. 39 is an exploded perspective view of an elastic member of the lens moving apparatus shown in FIG. 31.
Figure 40:
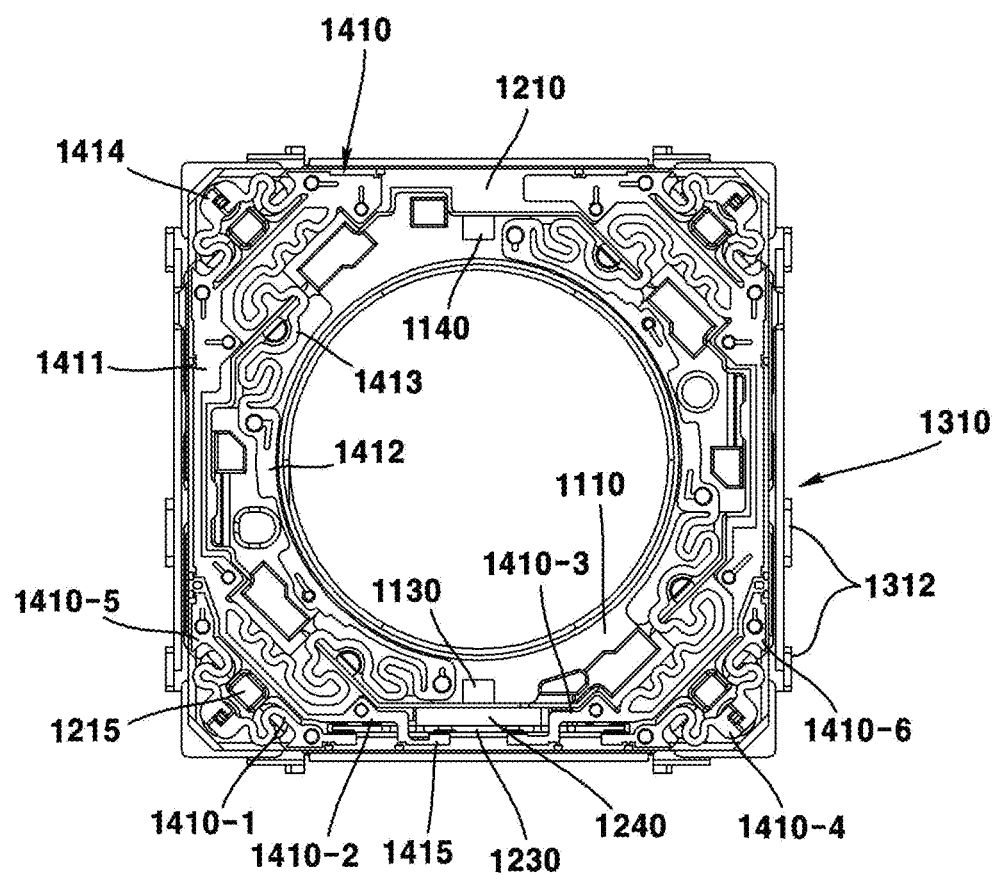
FIG. 40 is a plan view of the lens moving apparatus shown in FIG. 31, from which a cover member is removed.
Figure 41:
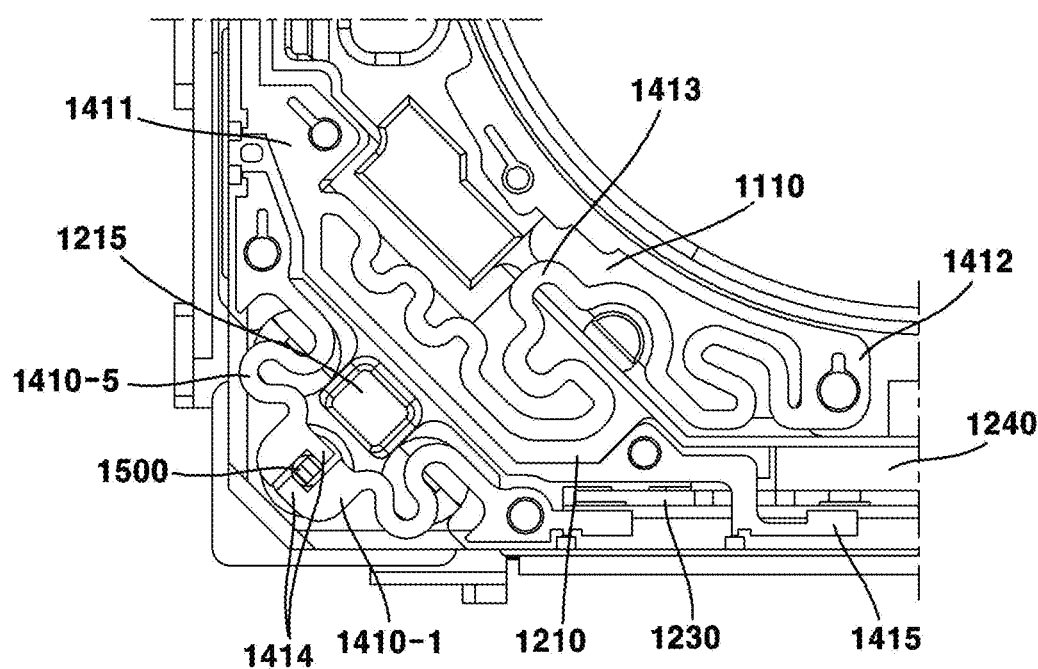
FIG. 41 is a fragmentary enlarged view of a portion of FIG. 40.
Figure 42:
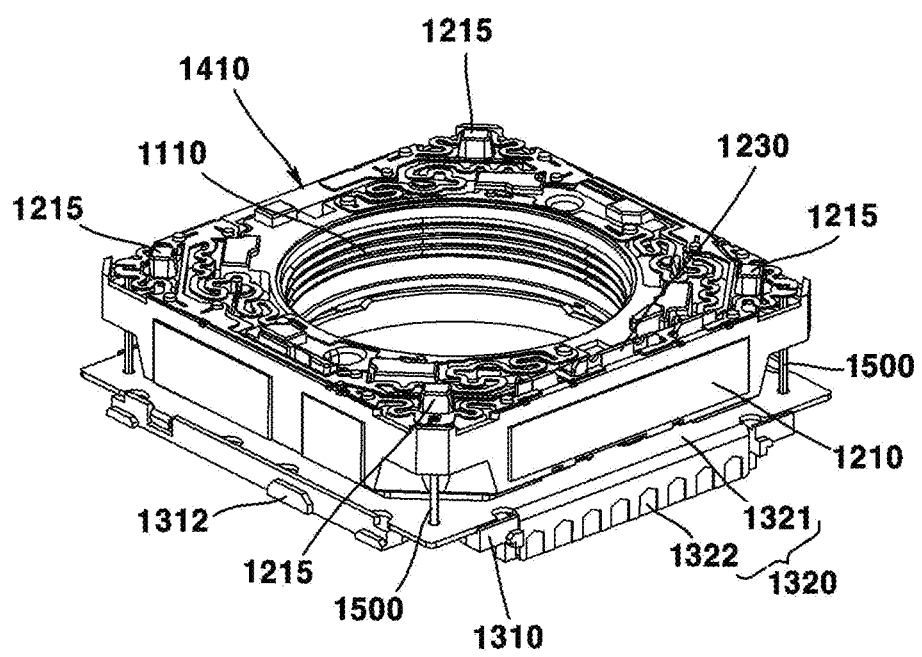
FIG. 42 is a perspective view of the lens moving apparatus shown in FIG. 31, from which the cover member is removed
Figure 43:
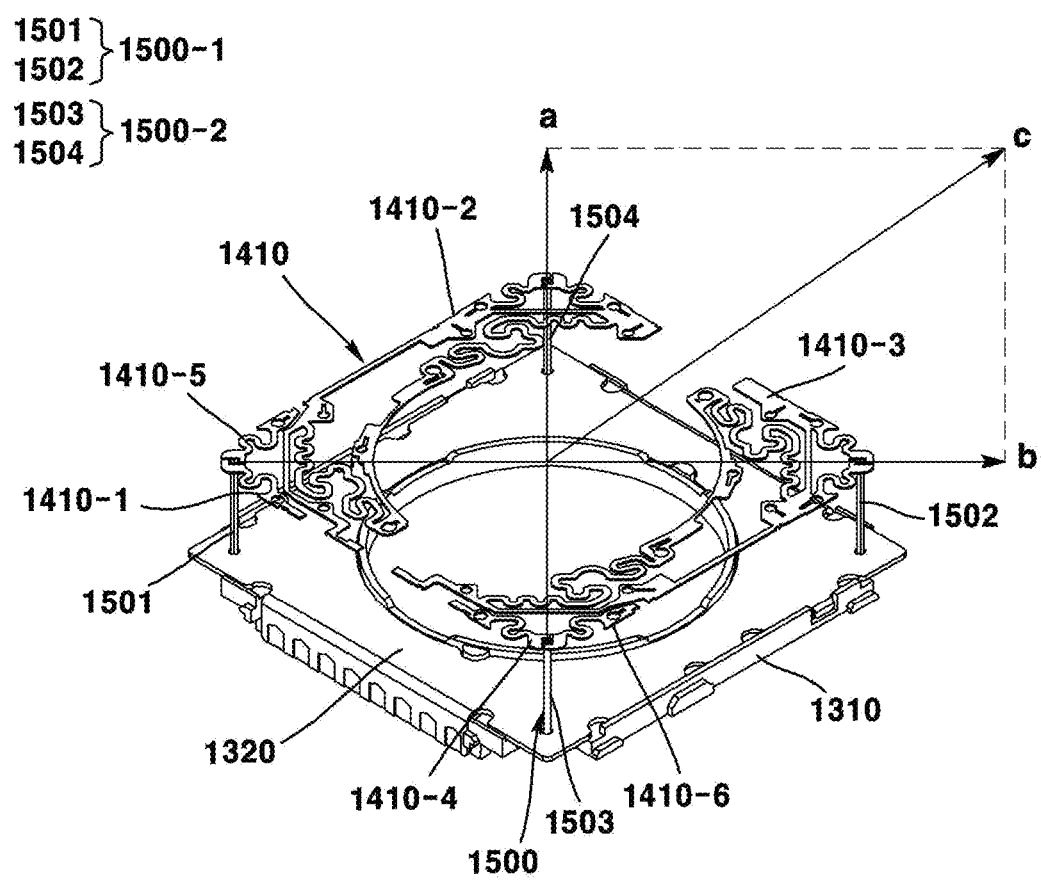
FIG. 43 is a view explaining operation of a polymer actuator of the lens moving apparatus shown in FIG. 31.
Figure 44:
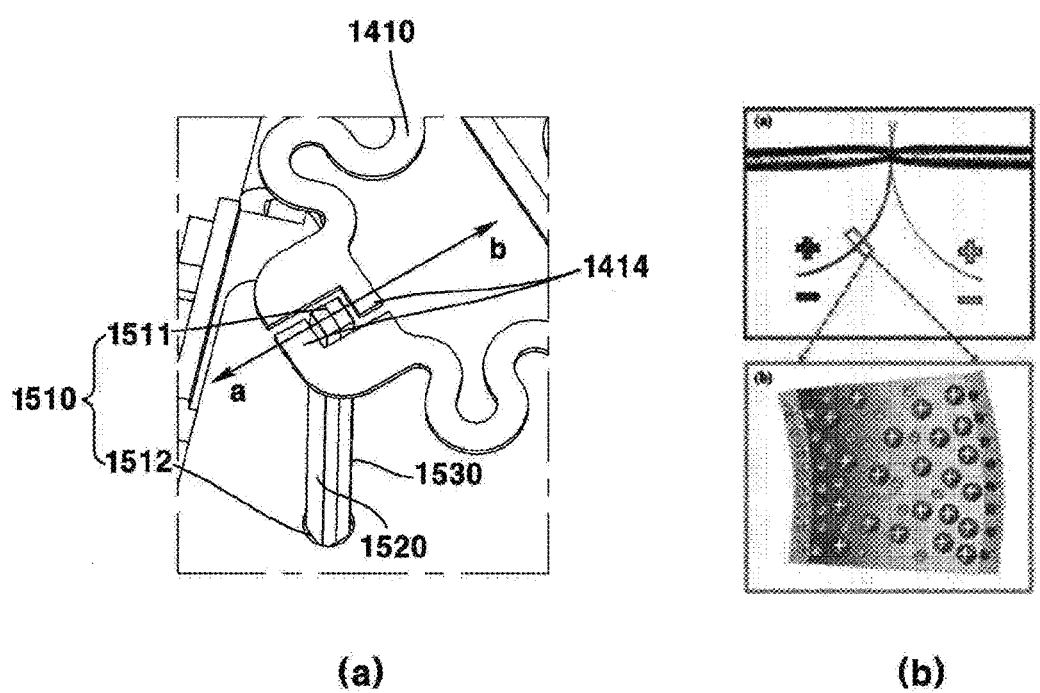
FIG. 44 is a view explaining operation and operating principle of the polymer actuator of the lens moving apparatus shown in FIG. 31.
Figure 45:
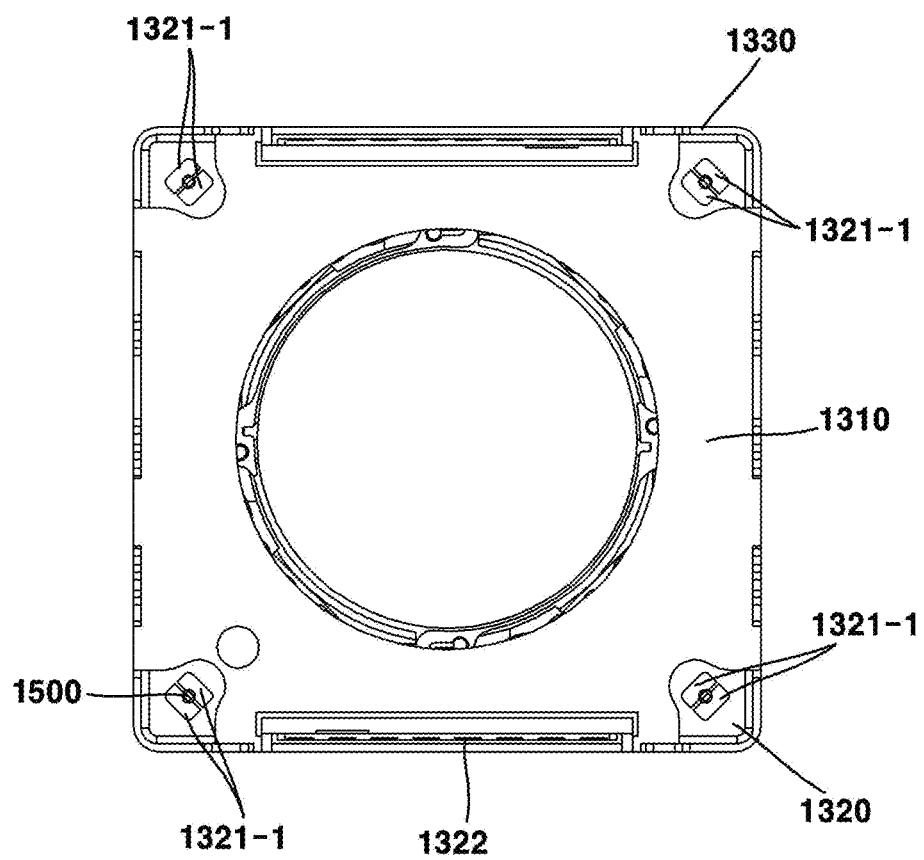
FIG. 45 is a bottom view of the lens moving apparatus shown in FIG. 31.
Figure 46:
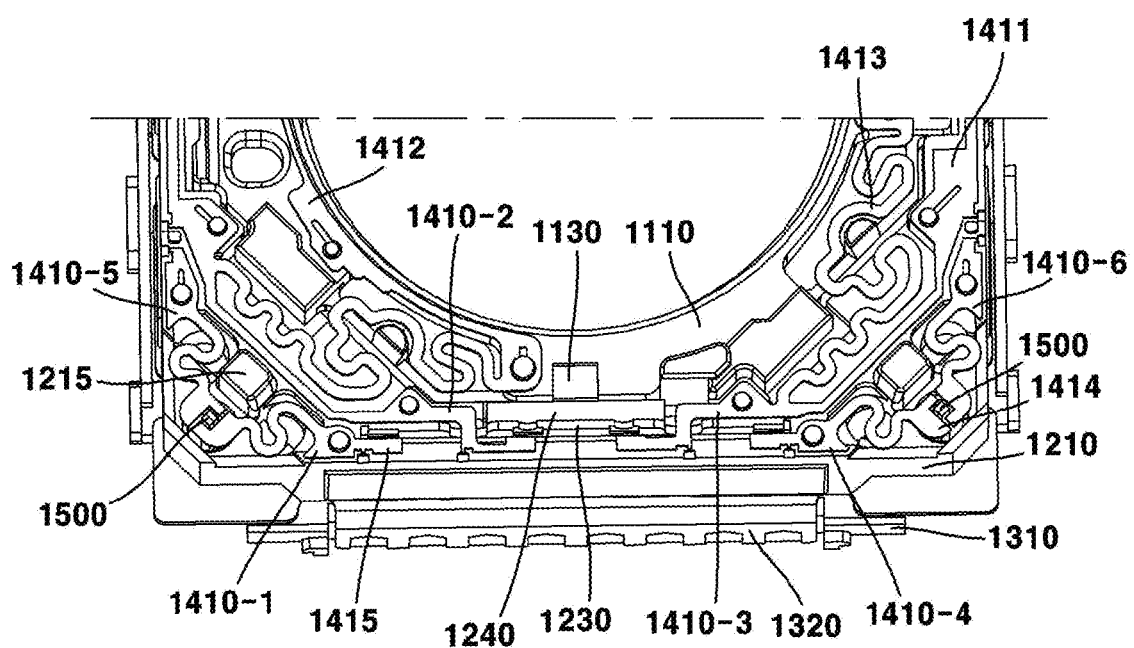
FIG. 46 is a fragmentary perspective view of the lens moving apparatus shown in FIG. 31, from which the cover member is removed.

FIG. 31 is a perspective view of a lens moving apparatus according to a further embodiment. FIG. 32 is a cross-sectional view taken along line A-A in FIG. 31. FIG. 33 is a cross-sectional view taken along line B-B in FIG. 31. FIG. 34 is a cross-sectional view taken along line C-C in FIG. 31. FIG. 35 is an exploded perspective view of the lens moving apparatus shown in FIG. 31. FIG. 36 is an exploded perspective view of a first operator of the lens moving apparatus shown in FIG. 31. FIG. 37 is an exploded perspective view of a second operator of the lens moving apparatus shown in FIG. 31. FIG. 38 is an exploded perspective view of a stator of the lens moving apparatus shown in FIG. 31. FIG. 39 is an exploded perspective view of an elastic member of the lens moving apparatus shown in FIG. 31. FIG. 40 is a plan view of the lens moving apparatus shown in FIG. 31, from which a cover member is removed. FIG. 41 is a fragmentary enlarged view of a portion of FIG. 40. FIG. 42 is a perspective view of the lens moving apparatus shown in FIG. 31, from which the cover member is removed. FIG. 43 is a view explaining operation of a polymer actuator of the lens moving apparatus shown in FIG. 31. FIG. 44 is a view explaining operation and operating principle of the polymer actuator of the lens moving apparatus shown in FIG. 31. FIG. 45 is a bottom view of the lens moving apparatus shown in FIG. 31. FIG. 46 is a fragmentary perspective view of the lens moving apparatus shown in FIG. 31, from which the cover member is removed.

The lens moving apparatus 1010 may be a voice coil motor (VCM). The lens moving apparatus 1010 may be a lens moving motor. The lens moving apparatus 1010 may be a lens moving actuator. The lens moving apparatus 1010 may include an AF module. The lens moving apparatus 1010 may include an OIS module.

The lens moving apparatus 1010 may include a first operator 2100. The first operator 2100 may be coupled to a lens. The first operator 2100 may be connected to a second operator 2200 via a first elastic member 1410 and/or a second elastic member 1420. The first operator 2100 may be moved by the interaction with the second operator 2200. Here, the first operator 2100 may be moved together with the lens. The first operator 2100 may be moved during AF operation. The first operator 2100 may be referred to as an "AF operator". The first operator 2100 may be moved together with the second operator 2200 also during OIS operation.

The lens moving apparatus 1010 may include a bobbin 1110. The first operator 2100 may include the bobbin 1110. The bobbin 1110 may be disposed in a housing 1210. The bobbin 1110 may be disposed in the bore 1214 in the housing 1210. The bobbin 1110 may be movably coupled to the housing 1210. The bobbin 1110 may be movable relative to the housing 1210 in the optical-axis direction. A lens may be coupled to the bobbin 1110. The bobbin 1110 and the lens may be coupled to each other by means of a screw and/or an adhesive. A coil 1120 may be coupled to the bobbin 1110. The first elastic member 1410 may be coupled to the upper portion or the upper surface of the bobbin 1110. The second elastic member 1420 may be coupled to the lower portion or the lower surface of the bobbin 1110. The bobbin 1110 may be coupled to the first elastic member 1410 and/or the second elastic member 1420 by means of heat fusion and/or an adhesive. The adhesive for coupling the bobbin 1110 to the lens and the bobbin 1110 to the elastic member 1400 may be epoxy, which is hardened by at least one of ultraviolet, heat, and laser.

The bobbin 1110 may include a lower stopper 1111. The downward stroke of the bobbin 1110 may be restricted by the lower stopper 1111. The lower stopper 1111 may be formed on the outer peripheral surface of the bobbin 1110. The lower stopper 1111 may come into contact with the housing 1210 when the bobbin 1110 moves downwards.

The bobbin 1110 may include a rib 1112. The rib 1112 may support the coil 1120 from beneath. The rib 1112 may project from the outer peripheral surface of the bobbin 1110 and may be disposed below the coil 1120. The bobbin 1110 may have a coil-receiving groove. The coil 1120 may be received in the coil-receiving groove. The coil-receiving groove may be formed in the outer peripheral surface of the bobbin 1110. The coil-receiving groove may include a groove which is formed as a result of depression of a portion of the outer lateral surface of the bobbin 1110. The coil-receiving groove may include the rib 1112 configured to support the lower surface of the coil 1120.

The bobbin 1110 may have a groove 1113. The groove 1113 may be a sensing-magnet-receiving groove. The groove 1113 may be a recess. A second magnet 1130 may be disposed in the groove 1113. The groove 1113 in the bobbin 1110 may be formed in the outer peripheral surface of the bobbin 1110. At least a portion of the groove 1113 in the bobbin 1110 may be formed so as to correspond to the shape and the size of the second magnet 1130. The groove 1113 may be open outwards.

The bobbin 1110 may have a bore 1114. The bore 1114 may be a cavity. The bore 1114 may be formed through the bobbin in the optical-axis direction. The bore 1114 may receive a lens module 1020 therein. For example, the inner peripheral surface of the bobbin 1110 may be provided with a thread corresponding to the thread formed on the outer peripheral surface of the lens module 1020.

The lens moving apparatus 1010 may include the coil 1120. The first operator 2100 may include the coil 1120. The coil 1120 may be an "AF operation coil" which is used for AF operation. The coil 1120 may be disposed between the bobbin 1110 and the housing 1210. The coil 1120 may be disposed on the outer lateral surface or the outer peripheral surface of the bobbin 1110. The coil 1120 may be directly wound around the bobbin 1110. Alternatively, the coil 1120 may be coupled to the bobbin 1110 in the state of being directly wound. The coil 1120 may be opposed to a first magnet 1220. The coil 1120 may be disposed so as to face the first magnet. The coil 1120 may electromagnetically interact with the first magnet 1220. Here, when current is supplied to the coil 1120 and thus an electromagnetic field is formed around the coil 1120, the coil 1120 may be moved relative to the first magnet 1220 by the electromagnetic interaction between the coil 1120 and the first magnet 1220. The coil 1120 may be composed of a single coil. Alternatively, the coil 1120 may include a plurality of coils, which are spaced apart from each other.

The coil 1120 may include a pair of lead wires for power supply. Here, the coil 1120 may be coupled at one end thereof to a first elastic unit 1410-1 and at the other end thereof to a second elastic unit 1410-2. In other words, the coil 1120 may be conductively connected to the second elastic member 1420. The coil 1120 may be conductively connected to a second board 1230 and the driver IC 1240 via the second elastic member 1420. The coil 1120 may receive current from the driver IC 1240.

In the embodiment, the coil 1120 and the first magnet 1220 may move the bobbin 1110 in the optical-axis direction with respect to the housing 1210. The coil 1120 and the first magnet 1220 may move the bobbin 1110 in the optical-axis direction by the electromagnetic interaction therebetween. The coil 1120 and the first magnet 1220 may be used for AF operation.

The lens moving apparatus 1010 may include the second magnet 1130. The first operator 2100 may include the second magnet 1130. The second magnet 1130 may be a sensing magnet. The second magnet 1130 may be disposed on the bobbin 1110. The second magnet 1130 may be detected by the Hall element of the driver IC 1240.

The lens moving apparatus 1010 may include a third magnet 1140. The first operator 2100 may include the third magnet 1140. The third magnet 1140 may be a compensation magnet. The third magnet 1140 may be disposed so as to maintain magnetic equilibrium with the second magnet 1130. The third magnet 1140 may have a weight corresponding to the second magnet 1130. The third magnet 1140 may be disposed so as to be symmetrical with the second magnet 1130 based on the optical axis.

The lens moving apparatus 1010 may include the second operator 2200. The second operator 2200 may be movably coupled to the stator 2300 via the actuation unit. The second operator 2200 may support the first operator 2100 via the first and second elastic members 410 and 420. The second operator 2200 may move the first operator 2100 or may be moved together with the first operator 2100. The second operator 2200 may be moved by the interaction with the stator 2300. The second operator 2200 may be moved upon OIS operation. Here, the second operator 2200 may be referred to as an "OIS operator". The second operator 2200 may be moved together with the first operator 2100 upon OIS operation.

The lens moving apparatus 1010 may include the housing 1210. The second operator 2200 may include the housing 1210. The housing 1210 may be spaced apart from a base 1310. The housing 1210 may receive at least a portion of the bobbin 1110 therein. The housing 1210 may be disposed between a cover member 1330 and the bobbin 1110. The housing 1210 may be made of a material different from the cover member 1330. The housing 1210 may be made of an insulation material. The housing 1210 may be made of an injection-molded body. The outer lateral surface of the housing 1210 may be spaced apart from the inner surface of a side plate 1332 of the cover member 1330. The housing 1210 may be moved for OIS operation through the space between the housing 1210 and the cover member 1330. The first magnet 1220 may be disposed on the housing 1210. The housing 1210 and the first magnet 1220 may be coupled to each other using an adhesive. The first elastic member 1410 may be coupled to the upper portion or the upper surface of the housing 1210. The second elastic member 1420 may be coupled to the lower portion or the lower surface of the housing 1210. The housing 1210 may be coupled to the first and second elastic members 1410 and 1420 using heat fusion and/or an adhesive. The adhesive, which is used to couple the housing 1210 to the first magnet 1220 and the housing 1210 to the elastic member 1400, may be epoxy, which is hardened by at least one of ultraviolet, heat, or laser.

The housing 1210 may include four side portions and four corner portions disposed between the four side portions. The side portions of the housing 1210 may include a first side portion, a second side portion disposed opposite the first side portion, and third and fourth side portions, which are disposed opposite each other between the first and second side portions. The corner portions of the housing 1210 may include a first corner portion disposed between the first and third side portions, a second corner portion disposed between the first and fourth side portions, a third corner portion disposed between the second and third side portions, and a fourth corner portion disposed between the second and fourth side portions. The side portions of the housing 1210 may include a lateral wall.

The housing 1210 may have a groove 1211. The groove 1211 may receive at least a portion of the lower stopper 1111 of the bobbin 1110. The bottom surface of the groove 1211 may overlap the lower stopper 1111 in the optical-axis direction. When the bobbin 1110 is moved downwards, the lower stopper 1111 of the bobbin 1110 may come into contact with the bottom surface of the groove 1211 in the housing 1210.

The housing 1210 may have a groove 1212. The groove 1212 may be a first-magnet-receiving groove. The first magnet 1220 may be coupled in the groove 1212. The groove 1212 may be formed as a result of depression of a portion of the inner peripheral surface and/or the lower surface of the housing 1210. The groove 1212 may be formed in each of the four corner portions of the housing 1210. In a modification, the groove 1212 may be formed in each of the four side portions of the housing 1210.

The housing 1210 may have a hole 1213. The hole 1213 may be a hole through which the actuation unit extends. The hole 1213 may be formed in each of the corner portions of the housing 1210. The hole 1213 may be formed through the housing 1210 in the optical-axis direction. The actuation unit 1500 may be disposed in the hole 1213. The actuation unit 1500 may extend through the hole 1213.

The housing 1210 may have the bore 1214. The bore 1214 may be a cavity. The bore 1214 may be formed in the housing 1210. The bore 1214 may be formed through the housing 1210 in the optical-axis direction. The bobbin 1110 may be disposed in the bore 1214. At least a portion of the bore 1214 may be formed so as to have a shape corresponding to the bobbin 1110. The inner peripheral surface or the inner lateral surface, which defines the bore 1214, may be positioned so as to be spaced apart from the outer peripheral surface of the bobbin 1110. Here, the housing 1210 and the bobbin 1110 may overlap each other at at least a portion thereof to limit the stroke distance of the bobbin 1110 in the optical-axis direction.

The housing 1210 may include a protrusion 1215. The protrusion 1215 may be an upper stopper. The protrusion 1215 may project from the upper surface of the housing 1210. The protrusion 1215 may be formed on the upper surface of the housing 1210. The protrusion 1215 may be formed in the corner area of the upper surface of the housing 1210. The protrusion 1215 may overlap the upper plate 1331 of the cover member 1330 in the optical-axis direction. The protrusion 1215 may form the uppermost end of the housing 1210. Accordingly, when the housing 1210 is moved upwards, the protrusion 1215 may come into contact with the upper 1331 of the cover member 1330. In other words, the protrusion 1215 may limit upward movement of the housing 1210.

The second operator 2200 may include the first magnet 1220. The first magnet 1220 may be disposed on the housing 1210. The first magnet 1220 may be fixed to the housing 1210 using an adhesive. The first magnet 1220 may be disposed between the bobbin 1110 and the housing 1210. The first magnet 1220 may be opposed to the coil 1120. The first magnet 1220 may perform electromagnetic interaction with the coil 1120. The first magnet 1220 may move the bobbin 1110 in the optical-axis direction by the interaction with the coil 1120. The first magnet 1220 may be used for AF operation. The first magnet 1220 may be disposed on each of the plurality of corner portions of the housing 1210. Here, the first magnet 1220 may be a corner magnet having the form of a hexahedron in which the inner lateral surface is larger than the outer lateral surface. In a modification, the first magnet 1220 may be disposed on the side portion of the housing 1210. Here, the first magnet 1220 may be a flat magnet having the shape of a flat plate.

The first magnet 1220 may include a plurality of magnets. The first magnet 1220 may include four magnets. The first magnet 1220 may include first to fourth driving magnets, which are respectively disposed on the first to fourth corners.

In another embodiment, the first magnet may be disposed on or coupled to the bobbin 1110, and the first coil 1120 may be disposed on or coupled to the housing 1210.

The lens moving apparatus 1010 may include the second board 1230. The second operator 2200 may include the second board 1230. The second board 1230 may be disposed on the housing 1210. The driver IC 1240 and a capacitor 1250 may be disposed on the second board 1230. The second board 1230 may be an FPCB.

The second board 1230 may include a terminal. The second board 1230 may include a plurality of terminals. The second board 1230 may include an upper terminal 1231 and a lower terminal 1232. The upper terminal 1231 may be conductively connected to the first elastic member 1410. The lower terminal 1232 may be conductively connected to the second elastic member 1420.

The lens moving apparatus 1010 may include the driver IC 1240. The second operator 2200 may include the driver IC 1240. The driver IC 1240 may be disposed on the second board 1230. The driver IC 1240 may include a sensor configured to detect the second magnet 1130. The driver IC 1240 may include a Hall element. The driver IC 1240 may include a plurality of terminals. The driver IC 1240 may include a power terminal and a communication terminal. The power terminal may include VDD and VSS. The communication terminal may include a data terminal and a clock terminal. A power supply may apply a certain power, and the data terminal and the clock terminal may use separate signal lines. An electrode surface of a polymer may be used. Here, the polymer may be driven with DC, and the data terminal may be driven with AC, so as to obviate a problem with operation of the polymer. In general, it is possible to utilize the characteristic in that I2C receive data at 1.5 V or higher. In order to more easily operate the polymer, a circuit, which is increased in voltage at the outside (a camera module board) may be provided.

The lens moving apparatus 1010 may include a sensor. The second operator 2200 may include the sensor. The sensor may be a Hall sensor. The sensor may be disposed on the second board 1230. The sensor may detect the second magnet 1130.

In another embodiment, the driver IC 1240 may be disposed on or coupled to the bobbin 1110, and the second magnet 1130 may be disposed on or coupled to the housing 1210.

The lens moving apparatus 1010 may include the capacitor 1250. The second operator 220 may include the capacitor 1250. The capacitor 1250 may be provided for stable operation of the driver IC 1240. The capacitor 1250 may be used for removal of noise of the driver IC 1240 and the like.

The lens moving apparatus 1010 may include the stator 2300. The stator 2300 may be disposed below the first and second operators 2100 and 2200. The stator 2300 may movably support the second operator 2200. The stator 2300 may move the second operator 220. Here, the first operator 2100 may be moved together with the second operator 2200.

The lens moving apparatus 1010 may include the base 1310. The stator 2300 may include the base 1310. The base 1310 may be disposed below the housing 1210. The base 1310 may be disposed below the first board 1320. The first board 1320 may be disposed on the upper surface of the base 1310. The base 1310 may be coupled to the cover member 1330. The base 1310 may be disposed on the circuit board 1100.

The base 1310 may have a bore 1311. The bore 1311 may be a cavity. The hole 1311 may be formed through the base 1310 in the optical-axis direction. The light, which has passed through the bore 1311 and the lens module 1020, may be incident on the image sensor 810.

The base 1310 may include a step 1312. The step 1312 may be formed on the side surface of the base 1310. The step 1312 may be formed throughout the entire outer peripheral surface of the base 1310. The step 1312 may be formed as a result of projection or depression of a portion of the side surface of the base 1310. The lower end of the side plate 1332 of the cover member 1330 may be disposed on the step 1312.

The base 1310 may have a groove 1313. A terminal member 1322 of the first board 1320 may be disposed in the groove 1313. The groove 1313 may be formed as a result of depression of a portion of the side surface of the base 1310. The width of the groove 1313 may correspond to the width of the terminal member 1322. The length of the groove 1313 may correspond to the length of the terminal member 1322 of the first board 1320. Alternatively, the length of the terminal member 1322 of the first board 1320 may be greater than the length of the groove 1313 such that a portion of the terminal member 1322 projects downwards from the base 1310.

The base 1310 may include a rib 1314. The rib 1314 may be formed on the upper surface of the base 1310. The rib 1314 may project from the upper surface of the base 1310. The rib 1314 may be formed on at least one of the outer peripheral surface or the inner peripheral surface of the base 1310. The rib 1314 may be formed on at least one of the outer side or the inner side of the first board 1320. The rib 1314 may guide positioning of the first board 1320.

The lens moving apparatus 1010 may include the first board 1320. The stator 2300 may include the first board 1320. The first board 1320 may be disposed on one side of the housing 1210. The first board 1320 may be disposed between the base 1310 and the housing 1210. The first board 1320 may be disposed on the upper surface of the base 1310. The actuation unit 1500 may be coupled to the first board 1320. The first board 1320 may be conductively connected to the actuation unit 1500. One end of the actuation unit 1500 may be fixed to the first board 1320. The first board 1320 may be coupled to the circuit board 1100 using solder. The first board 1320 may include a flexible printed circuit board (FPCB). The first board 1320 may be bent at a portion thereof.

The first board 1320 may include first and second corner regions, which are disposed opposite each other, and third and fourth corner regions, which are disposed opposite each other. The body 1321 of the first board 1320 may include the first and second corner regions, which are disposed opposite each other, and the third and fourth corner regions, which are disposed opposite each other.

The first board 1320 may include the body 1321. A bore may be formed in the body 1321. The bore may be a cavity, which is formed through the first board 1320 in the optical-axis direction. The first board 1320 may have the bore. The actuation unit 1500 may be disposed in the bore in the first board 1320. The actuation unit 1500 may be disposed in the state of extending through the bore in the first board 1320.

The first board 1320 may include a terminal 1321-1. As illustrated in FIG. 45, the terminal 1321-1 may be disposed on the lower surface of the body 1321 of the first board 1320. The terminal 1321-1 may be composed of 4 pairs of terminals. The terminal 1321-1 may be conductively connected to the actuation unit 1500. The terminal 1321-1 may be connected to the actuation unit 1500. Two terminals 1321-1 may be connected to one polymer actuator.

The first board 1320 may include the terminal member 1322. The terminal member 1322 may extend downwards from the body 1321 of the first board 1320. The terminal member 1322 may be formed as a result of bending of a portion of the first board 1320. At least a portion of the terminal member 1322 may be exposed to the outside. The terminal member 1322 may be coupled to the circuit board 1100, disposed below the base 1310, through soldering. The terminal member 1322 may be disposed in the groove 131 in the base 1310. The terminal member 1322 may include a plurality of terminals.

The lens moving apparatus 1010 may include the cover member 1330. The stator 2300 may include the cover member 1330. The cover member 1330 may include a "cover can". The cover member 1330 may include a yoke. The cover member 1330 may be disposed outside the housing 1210. The cover member 1330 may be coupled to the base 1310. The cover member 1330 may accommodate the housing 1330 therein. The cover member 1330 may define the appearance of the lens moving apparatus 1010. The cover member 1330 may have the form of a hexahedron, which is open at the lower surface thereof. The cover member 1330 may be a non-conductive body. The cover member 1330 may be made of metal. The cover member 1330 may be made of a metal plate. The cover member 1330 may be connected to the ground portion of the circuit board 1100. Consequently, the cover member 1330 may be grounded. The cover member 1330 may shield electromagnetic interference (EMI). Here, the cover member 1330 may be referred to an "EMI shield can".

The cover member 1330 may include the upper plate 1331 and the side plate 1332. The cover member 1330 may include the upper plate 1331 having a bore, and a side plate 1332 extending downwards from the outer periphery or the edge of the upper plate 1331. The lower end of the side plate 1332 of the cover member 1330 may be disposed on the step 1312 of the base 1310. The inner surface of the side plate 1332 of the cover member 1330 may be fixed to the base 1310 using an adhesive.

The upper plate 1331 of the cover member 1330 may have the bore. The bore may include an "opening". The bore may be formed in the upper plate 1331 of the cover member 1330. When viewed from above, the lens may be seen through the bore. The bore may be formed so as to have a size and a shape corresponding to the lens. The size of the bore may be greater than the diameter of the lens module 1020 such that the lens module 1020 is inserted through the bore and is assembled therein. Light, which is introduced through the bore, may pass through the lens. Here, the light, which has passed through the lens, may be converted into an electrical signal so as to be obtained as an image.

The lens moving apparatus 1010 may include the elastic member 1400. The elastic member 1400 may be an "AF support member". At least a portion of the elastic member 1400 may be elastic. The elastic member 1400 may be made of metal. The elastic member 1400 may be made of a conductive material. The elastic member 1400 may connect the bobbin 1110 to the housing 1210. The elastic member 1400 may elastically connect the bobbin 1110 to the housing 1210. The elastic member 1400 may be coupled both to the bobbin 1110 and to the housing 1210. The elastic member 1400 may elastically support the bobbin 1110. The elastic member 1400 may movably support the bobbin 1110. The elastic member 1400 may support movement of the bobbin 1110 during AF operation.

The elastic member 1400 may include the first elastic member 1410. The first elastic member 1410 may be an "upper elastic member". The first elastic member 1410 may connect the housing 1210 to the bobbin 1110. The first elastic member 1410 may be coupled both to the upper portion of the bobbin 1110 and to the upper portion of the housing 1210. The first elastic member 1410 may be coupled to the upper surface of the bobbin 1110. The first elastic member 1410 may be coupled to the upper surface of the housing 1210. The first elastic member 1410 may be coupled to the actuation unit 1500. The first elastic member 1410 may be made of a leaf spring. The first elastic member 1410 may be divided so as to be used as an electrical signal line, a communication line, or a power line.

The first elastic member 1410 may include a plurality of elastic units. The first elastic member 1410 may include six elastic units. The first elastic member 1410 may include first to sixth elastic units 1410-1, 1410-2, 1410-3, 141-4, 1410-3, and 1410-6.

As illustrated in FIG. 43, the first elastic member 1410 may include the first elastic unit 1410-1 conductively connected to a first surface of a first polymer actuator 1501, a fifth elastic unit 1410-5 connectively connected to a second surface of the first polymer actuator 1501 opposite the first surface, a third elastic unit 1410-3 conductively connected both to a first surface of a second polymer actuator 1502 and to a second surface of the second polymer actuator 1502 opposite the first surface, a fourth elastic unit 1410-4 conductively connected to a first surface of a third polymer actuator 1503, a sixth elastic unit 1410-6 conductively connected to a second surface of the third polymer actuator 1503 opposite the first surface, and a second elastic unit 1410-2 conductively connected both to a first surface of a fourth polymer actuator 1504 and to a second surface of the fourth polymer actuator 1504 opposite the first surface. Here, the terms "first to fourth" in the first to fourth polymer actuators 1501, 1502, 1503, and 1504 are intended to distinguish the polymer actuators from each other. Any one of the first to fourth polymer actuators 1501, 1502, 1503, and 1504 may be referred to as a first polymer actuator, another of the first to fourth polymer actuators 1501, 1502, 1503, and 1504 may be referred to as a second polymer actuator, still another of the first to fourth polymer actuators 1501, 1502, 1503, and 1504 may be referred to as a third polymer actuator, and the remaining one of the first to fourth polymer actuators 1501, 1502, 1503, and 1504 may be referred to as a fourth polymer actuator. For example, the fourth polymer actuator 1504 may be referred to as the third polymer actuator, and the third polymer actuator 1503 may be referred to as the fourth polymer actuator. This description may also be applied to the first to sixth elastic units 1410-1, 1410-2, 1410-3, 1410-4, 1410-5, 1410-6 with or without modification.

The first elastic member 1410 may include the first elastic unit conductively connected to a first surface of a first actuation unit 1500-1, the second elastic unit conductively connected to a second surface of the first actuation unit 1500-1 opposite the first surface, the third elastic unit conductively connected to a first surface of a second actuation unit 1500-2, and the fourth elastic unit conductively connected to a second surface of the second actuation unit 1500-2 opposite the first surface. Alternatively, the first elastic member 1410 may include the first elastic unit conductively connected both to the first surface of the first actuation unit 1500-1 and to the second surface of the first actuation unit 1500-1 opposite the first surface, and the second elastic unit conductively connected both to the first surface of the second actuation unit 1500-2 and to the second surface of the second actuation unit 1500-2 opposite the first surface.

The first elastic member 1410 may include an outer portion 1411. The outer portion 1411 may be coupled to the housing 1210. The outer portion 1411 may be coupled to the upper surface of the housing 1210. The outer portion 1411 may have a hole or a groove coupled to the protrusion of the housing 1210. The outer portion 1411 may be fixed to the housing using an adhesive.

The first elastic member 1410 may include an inner portion 1412. The inner portion 1412 may be coupled to bobbin 1110. The inner portion 1412 may be coupled to the upper surface of the bobbin 1110. The inner portion 1412 may have a hole or a groove coupled to the protrusion of the bobbin 1110. The inner portion 1412 may be fixed to the bobbin 1110 using an adhesive.

The first elastic member 1410 may include a connector 1413. The connector 1413 may connect the inner portion 1412 to the outer portion 1411. The connector 1413 may be elastic. Here, the connector 1413 may be referred to as an "elastic portion". The connector 1413 may have a shape which is bent twice or more.

The first elastic member 1410 may include a coupler 1414. The coupler 1414 may extend from the outer portion 1411. The coupler 1414 may be coupled to the actuation unit 1500. The coupler 1414 and the actuation unit 1500 may be coupled to each other using solder.

The first elastic member 1410 may include a terminal portion 1415. The terminal portion 1415 may extend from the outer portion 1411. The terminal portion 1415 may be conductively connected to the second board 1230. The terminal portion 1415 may be coupled to the upper terminal 1231 of the second board 1230.

The elastic member 1400 may include the second elastic member 1420. The second elastic member 1420 may be a "lower elastic member". The second elastic member 1420 may be disposed below the first elastic member 1410. The second elastic member 1420 may be disposed at one side of the first elastic member 1410. The second elastic member 1420 may connect the housing 1210 to the bobbin 1110. The second elastic member 1420 may be disposed below the bobbin 1110. The second elastic member 1420 may be coupled both to the bobbin 1110 and to the housing 1210. The second elastic member 1420 may be coupled to the lower surface of the bobbin 1210. The second elastic member 1420 may be coupled to the lower surface of the housing 1210. The second elastic member 1420 may be made of a leaf spring.

The second elastic member 1420 may include the first elastic unit 1420-1 and the second elastic unit 1420-2, which are spaced apart from each other and which conductively connect the coil 1120 to the drive IC 1240. The second elastic member 1420 may include a plurality of elastic units. The second elastic member 1420 may conductively connect the coil 1120 to the driver IC 1240.

The second elastic member 1420 may include an outer portion. The outer portion may be coupled to the housing 1210. The outer portion may be coupled to the lower surface of the housing 1210. The outer portion may have a hole or a groove coupled to the protrusion of the housing 1210. The outer portion may be fixed to the housing 1210 using an adhesive.

The second elastic member 1420 may include an inner portion. The inner portion may be coupled to the bobbin 1110. The inner portion may be coupled to the lower surface of the bobbin 1110. The inner portion may have a hole or a groove coupled to the protrusion of the bobbin 1110. The inner portion may be fixed to the bobbin 1110 using an adhesive.

The second elastic member 1420 may include a connector. The connector may connect the inner portion to the outer portion. The connector may be elastic. Here, the connector may be referred to as an "elastic portion". The connector may have a shape which is bent twice or more.

The second elastic member 1420 may include a terminal member. The terminal member may extend from the outer portion. The terminal portion may be conductively connected to the second board 1230. The terminal member may be coupled to the lower terminal 1232 of the second board 1230.

The lens moving apparatus 1010 may include the actuation unit 1500. The actuation unit 1500 may include a "polymer actuator". The actuation unit 1500 may connect the first board 1320 to the first elastic member 1410. The actuation unit 1500 may be coupled both to the first elastic member 1410 and to the first board 1320 using solder. The actuation unit may move the bobbin 1110 in a direction perpendicular to the optical-axis direction. The actuation unit 1500 may move the housing 1210 in a direction perpendicular to the optical-axis direction. The actuation unit 1500 may movably support the housing 1210. At least a portion of the actuation unit 1500 may be elastic. The actuation unit 1500 may support movement of the housing 1210 and the bobbin 1110 during OIS operation.

The coil 1120 and the first magnet 1220, which move the bobbin 1110 in the optical-axis direction, may be referred to as an actuation unit. Here, the actuation unit, which moves the bobbin 1110 in the optical-axis direction, may be referred to as an "AF actuation unit". The actuation unit 1500, which moves the bobbin 1110 in a direction perpendicular to the optical-axis direction, may be referred to as an "OIS actuation unit". One of the AF actuation unit and the actuation unit 1500 may be referred to as a "first actuation unit", and the other of the AF actuation unit and the actuation unit 1500 may be referred to as a "second actuation unit". The AF actuation unit may include at least one of a liquid lens, a MEMS actuator, an SMA actuator or a polymer actuator.

The actuation unit 1500 may conductively connect the first board 1320 to the first elastic member 1410. The actuation unit 1500 may move the bobbin 1110 relative to the first board 1320 in a direction perpendicular to the optical-axis direction. When current is applied to the polymer actuator, the polymer actuator may move the bobbin 1110 relative to the base 1310 in a direction perpendicular to the optical-axis direction. The actuation unit 1500 may be disposed parallel to the optical-axis direction. The actuation unit 1500 may be spaced apart from the coil 1120. The actuation unit 1500 may be spaced apart from the first magnet 1220. The actuation unit 1500 may overlap the coil 1120 in a direction perpendicular to the optical-axis direction. The actuation unit 1500 may overlap the first magnet 1220 in a direction perpendicular to the optical-axis direction. The actuation unit 1500 may be disposed in a diagonal direction. Alternatively, the actuation unit 1500 may be disposed such that one surface thereof faces laterally.

As illustrated in FIG. 43, the actuation unit 1500 may move the first and second operators 2100 and 2200 in a first direction (see a in FIG. 43) perpendicular to the optical-axis direction. Furthermore, the actuation unit 1500 may move the first and second operators 2100 and 220 in a second direction (see b in FIG. 43) perpendicular to the optical-axis direction and the first direction. Furthermore, the actuation unit 1500 may move the first and second operators 2100 and 2200 in a third direction (see c in FIG. 43) between the first direction and the second direction. In order to move the first and second operators 2100 and 2200 in the third direction, the first actuation unit 1500-1 and the second actuation unit 1500-2 may be simultaneously operated.

In a modification, the coil 1120 and the first magnet 1220, which are intended for autofocus operation, may be omitted, and the polymer actuator may also perform autofocus operation. In this case, the elastic member 1400 may be replaced with the polymer actuator.

As illustrated in (a) of FIG. 44, a first portion 1511, which is the upper end of the actuation unit 1500, may be moved in a direction of a first axis perpendicular to the optical axis. The first portion 1511 of the actuation unit 1500 may be selectively moved in an outward direction (see a in FIG. 44) on the first axis and in an inward direction (see b in FIG. 44) on the first axis. As illustrated (b) of FIG. 44, when positive (+) current is applied to the first electrode 1520 of the actuation unit 1500 and negative (−) current is applied to the second electrode 1530, the actuation unit 1500 may be bent in a direction such that the length of the first electrode 1520 is reduced. When positive (+) current is applied to the first electrode 1520 of the actuation unit 1500 and negative (−) current is applied to the second electrode 1530, the actuation unit 1500 may be bent in a direction such that the length of the second electrode 1530 is increased. Meanwhile, negative (−) current may be applied to the first electrode 1520 while positive (+) current may be applied to the second electrode 1530. In this case, the first elastic member 1410 may be divided into two members such that current is supplied to the first electrode 1520 and the second electrode 1530.

The actuation unit 1500 may be conductively connected to the driver IC 1240. The actuation unit 1500 may supply current to the drive IC 1240. Here, the actuation unit may use DC, and may supply AC to the driver IC 1240. Meanwhile, when both the actuation unit 1500 and the driver IC 1240 use DC, the driver IC 1240 may be provided with a voltage regulator in order to maintain the voltage supplied to the driver IC 1240 constant.

The lens moving apparatus 1010 may include the first actuation unit 1500-1. The first actuation unit 1500-1 may move the bobbin 1110 in a first direction perpendicular to the optical-axis direction. Here, the optical-axis direction may be the z-axis direction, and the first direction may be the x-axis direction. The first actuation unit 1500-1 may move the bobbin 1110 relative to the first board 1320 in the first direction perpendicular to the optical-axis direction. The first actuation unit 1500-1 may include the first polymer actuator 1501 disposed in the first corner region of the first board 1320, and the second polymer actuator 1502 disposed in the second corner region of the first board 1320.

The lens moving apparatus 1010 may include the second actuation unit 1500-2. The second actuation unit 1500-2 may move the bobbin 1110 in a second direction perpendicular to the optical-axis direction and the first direction. Here, the optical-axis direction may be the z-axis direction, the first direction may be the x-axis direction, and the second direction may be the y-axis direction. The second actuation unit 1500-2 may move the bobbin 1110 relative to the first board 1320 in the second direction perpendicular to the optical-axis direction and the first direction. The second actuation unit 1500-2 may include the third polymer actuator 1503 disposed in the third corner region of the first board 1320, and the fourth polymer actuator 1504 disposed in the fourth corner region of the first board 1320.

The actuation unit 1500 may include the polymer 1510. The polymer 1510 may be bent upon application of current.

The polymer 1510 may be curved upon application of current. The polymer 1510 may be folded upon application of current. The polymer 1510 may be deformed upon application of current.

The polymer 1510 may include an ionic EAP, which is subjected to contraction and expansion deformation by movement and diffusion of ions upon application of external voltage, and an electronic EAP, which is deformed by electron polarization phenomenon upon application of external voltage. The ionic EAP may include at least one of electrorheological fluids (ERP), carbon nanotubes (CNT), conductive polymers (CP), ionic polymer-metal composites (IPMC), or ionic polymer gels (IPG). The electronic EAP may include at least one of liquid crystal elastomers (LCE), electro-viscoelastic elastomers, electrostrictive paper, electrostrictive graft elastomers, dielectric elastomers, or ferroelectric polymers.

The polymer 1510 may include the first portion 1511 and the second portion 1512. The polymer 1510 may include the first portion 1511 coupled to the first board 1320, and the second portion 1512 coupled to the first elastic member 1410. When current is applied to the polymer 1510, the second portion 522 may be moved relative to the first portion 1511 in a direction perpendicular to the optical-axis direction.

The actuation unit 1500 may include the first electrode 1520. The first electrode 1520 may be disposed on the first surface of the polymer 1510. The first electrode may be made of an elastic metal. The first electrode 1520 may be made of a spring material. The first electrode 1520 may generate OIS elastic force. The first electrode 1520 may include at least one of a copper alloy or SUS.

The actuation unit 1500 may include the second electrode 1530. The second electrode 1530 may be disposed on the second surface of the polymer 1510 opposite the first surface. The second electrode 1530 may be made of an elastic metal. The second electrode 1530 may be made of a spring material. The second electrode 1530 may generate OIS elastic force. The second electrode 1530 may include at least one of a copper alloy or SUS.

The lens moving apparatus 1010 may include a damper. The damper may connect the actuation unit 1500 to the housing 1210. The damper may connect the actuation unit 1500 to the first elastic member 1410. The damper may connect the second operator 2200 to the stator 2300.

The lens moving apparatus according to an embodiment may be directed to a structure of a camera OIS actuator using a polymer and a method of controlling the camera OIS actuator. Since the OIS coil is omitted in the lens moving apparatus according to the embodiment, there is an effect of reducing the thickness of the lens moving apparatus in the optical-axis direction. In the embodiment, the lower stopper may be composed of the first board 1320 and the first magnet 1220 rather than an FP coil. Here, a slight gap for movement of the second operator 2200 may be present between the first board 1320 and the first magnet 1220.

Unlike the embodiment, the lens moving apparatus according to a modification may further include a wire. Description of the wire may also be applied to the embodiment shown in FIGS. 1 to 25 with or without modification.

The lens moving apparatus according to a first modification may include four wires. The four wires may conductively connect the first board 1320 to the second board 1230. The four wires may conductively connect the first board 1320 to the drive IC 1240. The four wires may be spaced apart from the actuation unit 1500. The four wires may be made of a member independent of the actuation unit 1500. Four terminals of the driver IC 1240 may be conductively connected to the first board 1320 via the four wires. Accordingly, in this case, the actuation unit 1500 may be conductively separated from the driver IC 1240.

The lens moving apparatus according to a second modification may include two wires. The two wires may conductively connect the first board 1320 to the second board 1230. The two wires may conductively connect the first board 1320 to the driver IC 1240. The two wires may be spaced apart from the actuation unit 1500. The two wires may be made of a member independent of the actuation unit 1500.

Two terminals among the four terminals of the driver IC 1240 may be conductively connected to the first board 1320 via the two wires. The remaining two terminals among the four terminals of the driver IC 1240 may be conductively connected to the first board 1320 via a plurality of polymer actuators. At least some of the plurality of polymer actuators may be conductively connected to the driver IC 1240. Here, the driver IC 1240 may be operated by AC. Alternatively, the driver IC 1240 may be operated by AC and DC. In this case, the DC may be supplied to the driver IC 1240 via the wires while the AC may be supplied to the driver IC 1240 via the actuation unit 1500. Here, the polymer actuator may be operated by DC. Accordingly, the polymer actuator may be used as a conductive line for supplying current to the driver IC 1240.

The lens moving apparatus shown in FIGS. 1 to 25 may include three actuation magnets 130-1 to 130-3 and the dummy member 135 while the lens moving apparatus 1010 according to the embodiment shown in FIG. 31 may include four actuation magnets 1220. In the embodiment shown in FIG. 31, in place of the four actuation magnets 1220, the three actuation magnets 130-1 to 130-3 and the dummy member 135 according to the embodiment shown in FIGS. 1 to 25 may be applied with or without modification.

Furthermore, the component (for example, the polymer actuator 220) according to the embodiment shown in FIG. 1 and the component (for example, the actuation unit 1500) shown in FIG. 31 corresponding to the component shown in FIG. 1 may be replaced with each other, and the descriptions of both components may be applied to each other with or without modification. The polymer actuator 220 and the actuation unit 1500 are merely examples, the components of the polymer actuator 220 and the components of the actuation unit 1500 may be interchanged or the descriptions thereof may be applied to each other with or without modification.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus, and a camera module and an optical device each including the lens moving apparatus, which are capable of reducing the length or the height thereof in the optical-axis direction and of performing OIS operation using a polymer actuator.

The invention claimed is:

1. A lens moving apparatus comprising:
a circuit board;
a housing disposed on the circuit board;
a bobbin disposed in the housing;
a magnet disposed on the housing;
a coil disposed on the bobbin and configured to move the bobbin in an optical-axis direction by interaction with the magnet;
an upper elastic member coupled to the bobbin and the housing; and
a polymer actuator comprising one end coupled to the upper elastic member,
wherein the circuit board is conductively connected to the polymer actuator and configured to supply a first drive signal to the polymer actuator, and the polymer actuator is configured to move the housing in a direction perpendicular to the optical-axis direction by the first drive signal,
wherein the polymer actuator comprises a polymer portion and first and second electrodes disposed opposite each other with the polymer portion interposed therebetween, and the first drive signal is input to the first and second electrodes, and
wherein the upper elastic member comprises a first upper elastic unit conductively connected to the first electrode and a second upper elastic unit conductively connected to the second electrode.

2. The lens moving apparatus according to claim 1, wherein the circuit board comprises a first pad conductively connected to the first electrode and a second pad conductively connected to the second electrode.

3. The lens moving apparatus according to claim 1, wherein the polymer actuator is bending-deformed in a direction toward the second electrode from the first electrode or in a direction toward the first electrode from the second electrode by the first drive signal.

4. The lens moving apparatus according to claim 1, wherein each of the first and second electrodes is made of elastic and conductive metal.

5. The lens moving apparatus according to claim 1, wherein the coil is conductively connected to the first upper elastic unit and the second upper elastic unit, and the circuit board is configured to supply a second drive signal to the first and second electrodes to drive the coil.

6. The lens moving apparatus according to claim 3, wherein the first and second electrodes are disposed so as to face in a diagonal direction of the housing.

7. The lens moving apparatus according to claim 3, wherein the first and second electrodes are disposed so as to face in a direction parallel to one side portion of the housing.

8. The lens moving apparatus according to claim 1, wherein one end of the first electrode is coupled to the first upper elastic unit and another end of the first electrode is coupled to the circuit board, and one end of the second electrode is coupled to the second upper elastic unit and another end of the second electrode is coupled to the circuit board.

9. The lens moving apparatus according to claim 1, wherein the first upper elastic unit comprises a first coupler coupled to the housing, a second coupler coupled to the first electrode, and a first connector connecting the first coupler to the second coupler, and
wherein the second upper elastic unit comprises a third coupler coupled to the housing, a fourth coupler coupled to the second electrode, and a second connector connecting the third coupler to the fourth coupler.

10. A lens moving apparatus comprising:
a housing;
a bobbin disposed in the housing;
a first magnet unit disposed on a first corner portion of the housing;
a second magnet unit disposed on a second corner portion of the housing that faces the first corner portion in a first diagonal direction;
a third magnet unit disposed on a third corner portion of the housing;
a dummy member disposed on a fourth corner portion of the housing that faces the third corner portion in a second direction;
a coil configured to move the bobbin in an optical-axis direction by an interaction with the magnet;
an upper elastic member coupled to the bobbin and the housing;
a polymer actuator coupled to the upper elastic member; and
a circuit board conductively connected to the polymer actuator and configured to supply a drive signal to the polymer actuator,
wherein the polymer actuator moves the housing in a direction perpendicular to the optical-axis direction in response to the drive signal.

11. The lens moving apparatus according to claim 10, comprising a sensing magnet disposed on the bobbin, and a first position sensor opposed to the sensing magnet in the optical-axis direction.

12. The lens moving apparatus according to claim 10, comprising:
a first sensor overlapping the first magnet unit in the optical-axis direction and disposed on the circuit board;
a second sensor overlapping the third magnet unit in the optical-axis direction and disposed on the circuit board.

13. The lens moving apparatus according to claim 10, wherein the polymer actuator comprises a first polymer actuator disposed on the first corner portion, a second actuator disposed on the second corner portion, a third polymer actuator disposed on the third corner portion, and a fourth polymer actuator disposed on the fourth corner portion.

14. The lens moving apparatus according to claim 13, wherein the first polymer actuator and the second polymer actuator are bending-deformed in the same direction, and the third polymer actuator and the fourth polymer actuator are bending-deformed in the same direction.

15. The lens moving apparatus according to claim 10, wherein the polymer actuator comprises:
a polymer portion; and
first and second electrodes disposed opposite each other with the polymer portion interposed therebetween, and
wherein the first and second electrodes of the polymer actuator are disposed so as to face each other in a diagonal direction of the housing.

16. The lens moving apparatus according to claim 10, wherein the polymer actuator comprises:
a polymer portion; and
first and second electrodes disposed opposite each other with the polymer portion interposed therebetween,
wherein the first and second electrodes of the polymer actuator are disposed so as to face each other in a horizontal direction, and the horizontal direction is a direction parallel to one side portion of the housing.

17. A lens moving apparatus comprising:
a stationary unit including a circuit board;
a first movable unit comprising a bobbin, a second movable unit comprising a housing configured to receive the bobbin therein;
an elastic member configured to elastically support the first movable unit relative to the housing; and
a polymer actuator configured to support the second movable unit relative to the stationary unit,
wherein the polymer actuator comprises a polymer portion, a first electrode disposed on a first surface of the polymer portion, and a second electrode disposed on a second surface of the polymer portion that is positioned opposite the first surface,
wherein the first electrode and the second electrode are conductively connected to the circuit board,
wherein the circuit board is configured to supply a drive signal to the first and second electrodes, and the polymer actuator is configured to move the second movable unit relative to the stationary unit in a direction perpendicular to the optical-axis direction in response to the drive signal,
wherein the upper elastic member comprises a first upper elastic unit conductively connected to the first electrode and a second upper elastic unit conductively connected to the second electrode, and
wherein the coil is conductively connected to the first upper elastic unit and the second upper elastic unit.

* * * * *